US011435897B2

(12) United States Patent
Lemay et al.

(10) Patent No.: US 11,435,897 B2
(45) Date of Patent: *Sep. 6, 2022

(54) CONTENT SCRUBBER BAR WITH REAL-WORLD TIME INDICATIONS

(71) Applicant: Apple Inc., Cupertino, CA (US)

(72) Inventors: Stephen O. Lemay, Palo Alto, CA (US); Graham R. Clarke, Mountain View, CA (US); Marcos Alonso Ruiz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,339

(22) Filed: Apr. 19, 2021

(65) Prior Publication Data
US 2022/0004311 A1  Jan. 6, 2022

Related U.S. Application Data

(63) Continuation of application No. 15/272,382, filed on Sep. 21, 2016, now Pat. No. 10,983,688.

(Continued)

(51) Int. Cl.
*G06F 3/0488* (2022.01)
*G06F 3/0484* (2022.01)
(Continued)

(52) U.S. Cl.
CPC ........ *G06F 3/04883* (2013.01); *G06F 3/0482* (2013.01); *G06F 3/04817* (2013.01);
(Continued)

(58) Field of Classification Search
CPC .. G06F 16/70; G06F 3/04847; G06F 3/04883; G06F 3/04817; G06F 3/0482; G06F 3/04845; G11B 27/005; G11B 27/34
See application file for complete search history.

(56) References Cited

U.S. PATENT DOCUMENTS 5,483,261 A * 1/1996 Yasutake ............... G06V 40/20
                                                345/173
5,488,204 A * 1/1996 Mead ................... G06F 3/0446
                                                345/179

(Continued)

FOREIGN PATENT DOCUMENTS

CN       1353852 A     6/2002
CN     102290082 A    12/2011
(Continued)

OTHER PUBLICATIONS

Extended European Search Report received for European Patent Application No. 17813729.5, dated Nov. 18, 2019, 8 pages.

(Continued)

*Primary Examiner* — Daeho D Song
(74) *Attorney, Agent, or Firm* — Kubota & Basol LLP

(57) ABSTRACT

In some embodiments, an electronic device displays a playback user interface that is configured to playback content on the electronic device. While displaying the playback user interface that is configured to playback the content on the electronic device, the electronic device displays a scrubber bar for navigating through the content, wherein the scrubber bar includes: a visual indication of a current playback position within the content; and one or more playback time indications that include time values based on the current playback position within the content. A respective playback time indication of the one or more playback time indications is based on a time of day at the electronic device, and an amount of time that it will take to play the content from the current playback position to an end of the content at a respective content playback speed.

39 Claims, 41 Drawing Sheets

Related U.S. Application Data

(60) Provisional application No. 62/348,966, filed on Jun. 12, 2016.

(51) Int. Cl.
*G06F 3/0481* (2022.01)
*G06F 3/0482* (2013.01)
*G06F 16/70* (2019.01)
*G11B 27/34* (2006.01)
*G11B 27/00* (2006.01)
*G06F 3/04883* (2022.01)
*G06F 3/04847* (2022.01)
*G06F 3/04817* (2022.01)
*G06F 3/04845* (2022.01)

(52) U.S. Cl.
CPC ...... *G06F 3/04845* (2013.01); *G06F 3/04847* (2013.01); *G06F 16/70* (2019.01); *G11B 27/005* (2013.01); *G11B 27/34* (2013.01)

(56) References Cited

U.S. PATENT DOCUMENTS

| | | | | |
|---|---|---|---|---|
| 5,825,352 A * | 10/1998 | Bisset | G06F 3/0488 | 345/157 |
| 5,835,079 A * | 11/1998 | Shieh | G06F 3/0488 | 345/157 |
| 5,880,411 A * | 3/1999 | Gillespie | G06V 40/20 | 345/157 |
| 6,188,391 B1 * | 2/2001 | Seely | G06F 3/0443 | 345/173 |
| 6,262,724 B1 * | 7/2001 | Crow | G06F 3/048 | 715/723 |
| 6,310,610 B1 * | 10/2001 | Beaton | G06F 3/04883 | 345/173 |
| 6,323,846 B1 * | 11/2001 | Westerman | G06K 9/6272 | 345/173 |
| 6,487,604 B1 * | 11/2002 | Rochford | H04L 45/24 | 709/224 |
| 6,570,557 B1 * | 5/2003 | Westerman | G06F 3/04883 | 400/489 |
| 6,677,932 B1 * | 1/2004 | Westerman | G06F 3/04886 | 345/173 |
| 6,690,387 B2 * | 2/2004 | Zimmerman | G06F 3/04883 | 345/682 |
| 7,015,894 B2 * | 3/2006 | Morohoshi | G06F 3/03545 | 345/172 |
| 7,184,064 B2 | 2/2007 | Zimmerman et al. | | |
| 7,614,008 B2 * | 11/2009 | Ording | G06F 3/0482 | 345/173 |
| 7,633,076 B2 * | 12/2009 | Huppi | H04W 52/027 | 345/169 |
| 7,653,883 B2 * | 1/2010 | Hotelling | G06F 3/0485 | 715/863 |
| 7,657,849 B2 * | 2/2010 | Chaudhri | G06F 3/0484 | 345/173 |
| 7,663,607 B2 * | 2/2010 | Hotelling | G06F 3/0443 | 345/173 |
| 7,716,701 B2 * | 5/2010 | Son | H04N 21/84 | 725/39 |
| 7,844,914 B2 * | 11/2010 | Andre | G06F 3/04883 | 715/773 |
| 7,957,762 B2 * | 6/2011 | Herz | G06F 1/3231 | 455/66.1 |
| 8,006,002 B2 * | 8/2011 | Kalayjian | H04M 1/605 | 710/36 |
| 8,239,784 B2 * | 8/2012 | Hotelling | G06F 3/0488 | 345/177 |
| 8,279,180 B2 * | 10/2012 | Hotelling | G06F 3/04182 | 345/173 |
| 8,381,135 B2 * | 2/2013 | Hotelling | G06F 3/0485 | 715/863 |
| 8,433,431 B1 * | 4/2013 | Master | G10H 1/0008 | 715/727 |
| 8,479,122 B2 * | 7/2013 | Hotelling | G06F 3/0488 | 715/767 |
| 9,179,116 B1 * | 11/2015 | Liao | H04N 21/47217 | |
| 9,348,458 B2 | 5/2016 | Hotelling et al. | | |
| 9,933,937 B2 * | 4/2018 | Lemay | G06F 3/04886 | |
| 10,983,688 B2 * | 4/2021 | Lemay | G06F 16/70 | |
| 2002/0015024 A1 * | 2/2002 | Westerman | G06F 3/0235 | 345/173 |
| 2002/0087983 A1 * | 7/2002 | Son | H04N 21/47 | 725/39 |
| 2003/0072556 A1 * | 4/2003 | Okujima | H04N 5/76 | 360/7 |
| 2003/0121055 A1 * | 6/2003 | Kaminski | H04N 21/4335 | 348/E7.071 |
| 2005/0190059 A1 * | 9/2005 | Wehrenberg | G08B 25/008 | 340/686.1 |
| 2005/0216839 A1 * | 9/2005 | Salvucci | G11B 27/034 | |
| 2006/0017692 A1 * | 1/2006 | Wehrenberg | G06F 1/1694 | 700/302 |
| 2006/0033724 A1 * | 2/2006 | Chaudhri | G06F 3/04886 | 345/173 |
| 2006/0197753 A1 * | 9/2006 | Hotelling | G06F 3/04883 | 345/173 |
| 2007/0183744 A1 * | 8/2007 | Koizumi | H04H 60/27 | 348/E5.007 |
| 2008/0155413 A1 * | 6/2008 | Ubillos | G11B 27/34 | 715/716 |
| 2008/0155418 A1 * | 6/2008 | Vallone | H04N 21/4112 | 715/720 |
| 2008/0240677 A1 * | 10/2008 | Watanabe | H04N 5/775 | 386/E5.001 |
| 2010/0057576 A1 * | 3/2010 | Brodersen | H04N 21/47202 | 705/14.69 |
| 2010/0231534 A1 | 9/2010 | Chaudhri et al. | | |
| 2010/0231537 A1 * | 9/2010 | Pisula | G06F 3/04855 | 345/173 |
| 2011/0019662 A1 * | 1/2011 | Katis | H04L 65/4015 | 370/352 |
| 2011/0023063 A1 * | 1/2011 | McDonough | H04N 21/44016 | 725/46 |
| 2011/0167347 A1 * | 7/2011 | Joo | G11B 27/34 | 715/716 |
| 2011/0283304 A1 * | 11/2011 | Roberts | H04H 60/46 | 725/40 |
| 2012/0011437 A1 * | 1/2012 | James | G06F 3/04883 | 715/702 |
| 2012/0050185 A1 * | 3/2012 | Davydov | G06F 3/04883 | 345/173 |
| 2012/0089665 A1 * | 4/2012 | Chung | H02J 3/14 | 709/203 |
| 2012/0192073 A1 * | 7/2012 | Vallone | H04N 21/4331 | 715/720 |
| 2013/0004138 A1 | 1/2013 | Kilar et al. | | |
| 2014/0122151 A1 * | 5/2014 | Edwards | G06Q 10/1093 | 705/7.18 |
| 2015/0089369 A1 * | 3/2015 | Ahn | G06F 3/0485 | 715/716 |
| 2015/0095937 A1 * | 4/2015 | Tobin | H04N 21/44226 | 725/32 |
| 2015/0127643 A1 * | 5/2015 | Cohen | G06F 16/447 | 707/725 |
| 2015/0286369 A1 * | 10/2015 | Pontual | H04N 21/6581 | 715/719 |
| 2015/0346984 A1 * | 12/2015 | Flint | G11B 27/102 | 715/720 |
| 2016/0182707 A1 * | 6/2016 | Gabel | G06Q 10/10 | 455/404.2 |
| 2016/0365126 A1 * | 12/2016 | Dali | H04N 21/85406 | |
| 2017/0092329 A1 * | 3/2017 | Kim | G06F 3/0482 | |

(56) References Cited

U.S. PATENT DOCUMENTS

2017/0188086 A1* 6/2017 Mardirossian ..... H04N 21/8453
2017/0357430 A1* 12/2017 Lemay ................ G06F 3/04883

FOREIGN PATENT DOCUMENTS

| CN | 103069491 A | 4/2013 |
|---|---|---|
| CN | 103748609 A | 4/2014 |
| JP | 2000-163031 A | 6/2000 |
| JP | 2002-342033 A | 11/2002 |
| WO | 2000/059214 A1 | 10/2000 |
| WO | 2013/169849 A2 | 11/2013 |
| WO | 2014/105276 A1 | 7/2014 |

OTHER PUBLICATIONS

Corrected Notice of Allowability received for U.S. Appl. No. 15/272,382, dated Mar. 19, 2021, 2 pages.
Examiner's Answer to Appeal Brief received for U.S. Appl. No. 15/272,382, mailed on Dec. 30, 2019, 10 pages.
Final Office Action received for U.S. Appl. No. 15/272,382, dated Feb. 26, 2019, 16 pages.
International Search Report and Written Opinion received for PCT Patent Application No. PCT/US2017/029454, dated Jun. 30, 2017, 3 pages.
Non-Final Office Action received for U.S. Appl. No. 15/272,382, dated Jul. 27, 2018, 15 pages.
Notice of Allowance received for U.S. Appl. No. 15/272,382, dated Dec. 14, 2020, 6 pages.
Patent Board Decision received for U.S. Appl. No. 15/272,382, mailed on Dec. 4, 2020, 10 pages.
Pre-Brief Appeal Conference Decision received for U.S. Appl. No. 15/272,382, mailed on Sep. 6, 2019, 2 pages.
Search Report received for Chinese Patent Application No. 201780034115.4, dated Jan. 22, 2021, 5 pages (2 pages of English Translation).
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

CONTENT SCRUBBER BAR WITH REAL-WORLD TIME INDICATIONS

CROSS-REFERENCE TO RELATED APPLICATIONS

This application is a continuation of U.S. application Ser. No. 15/272,382 (now U.S. Publication No. 2017-0357430), filed Sep. 21, 2016, which claims benefit of U.S. Provisional Application No. 62/348,966, filed Jun. 12, 2016, which are hereby incorporated by reference their entirety.

FIELD OF THE DISCLOSURE

This relates generally to electronic devices that allow for navigating within and playing content, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device has access to content (e.g., music, movies, etc.), and user interaction with such a device entails viewing a scrubber bar and skipping through the content using the scrubber bar. Enhancing these interactions improves the user's experience with the device and decreases user interaction time, which is particularly important where input devices are battery-operated.

SUMMARY OF THE DISCLOSURE

The embodiments described in this disclosure are directed to one or more electronic devices that display scrubber bars for skipping through content items, which include one or more indications of time that are with respect to "real world" time at the electronic devices, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
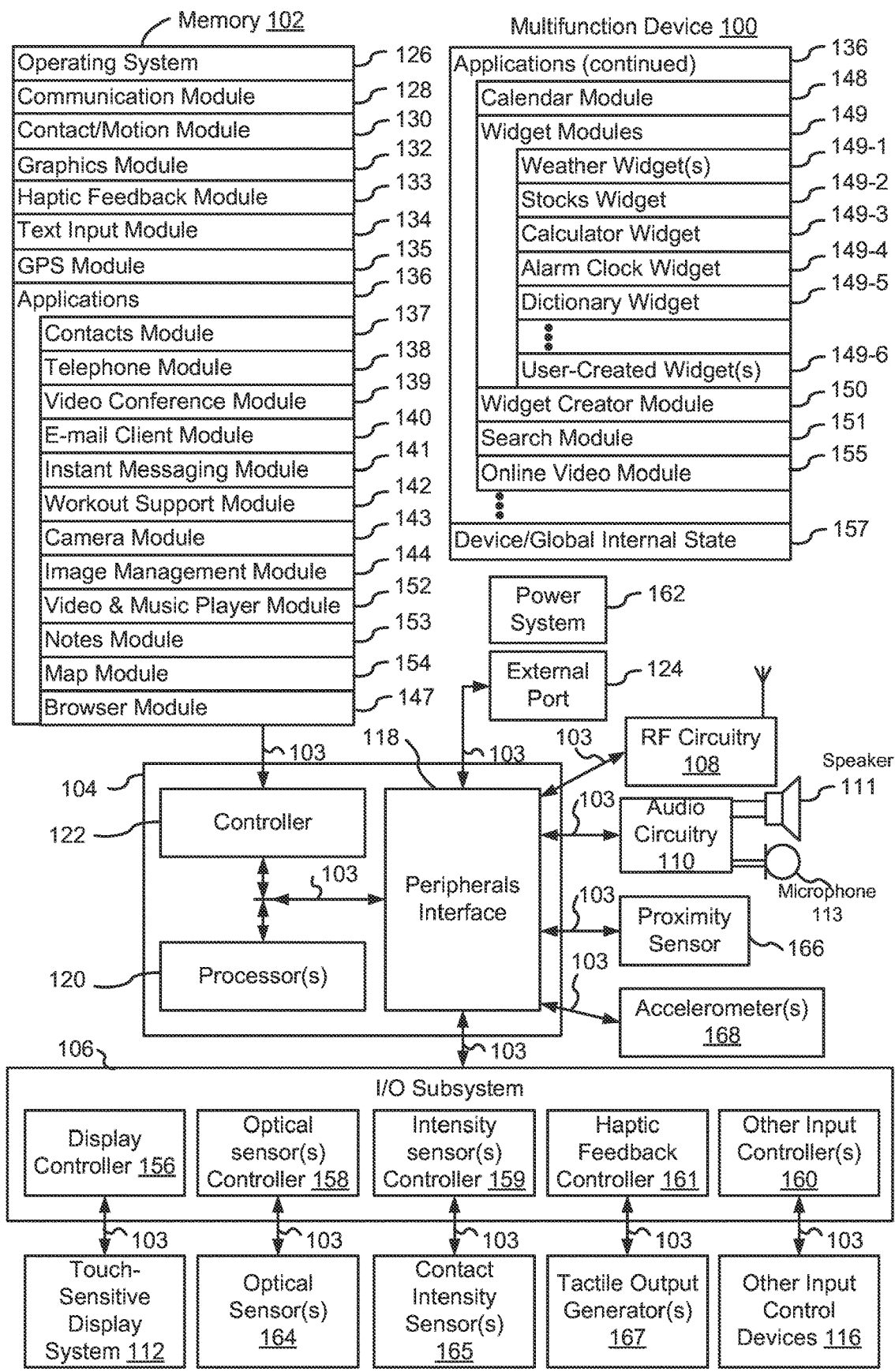
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No.: 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi.

The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
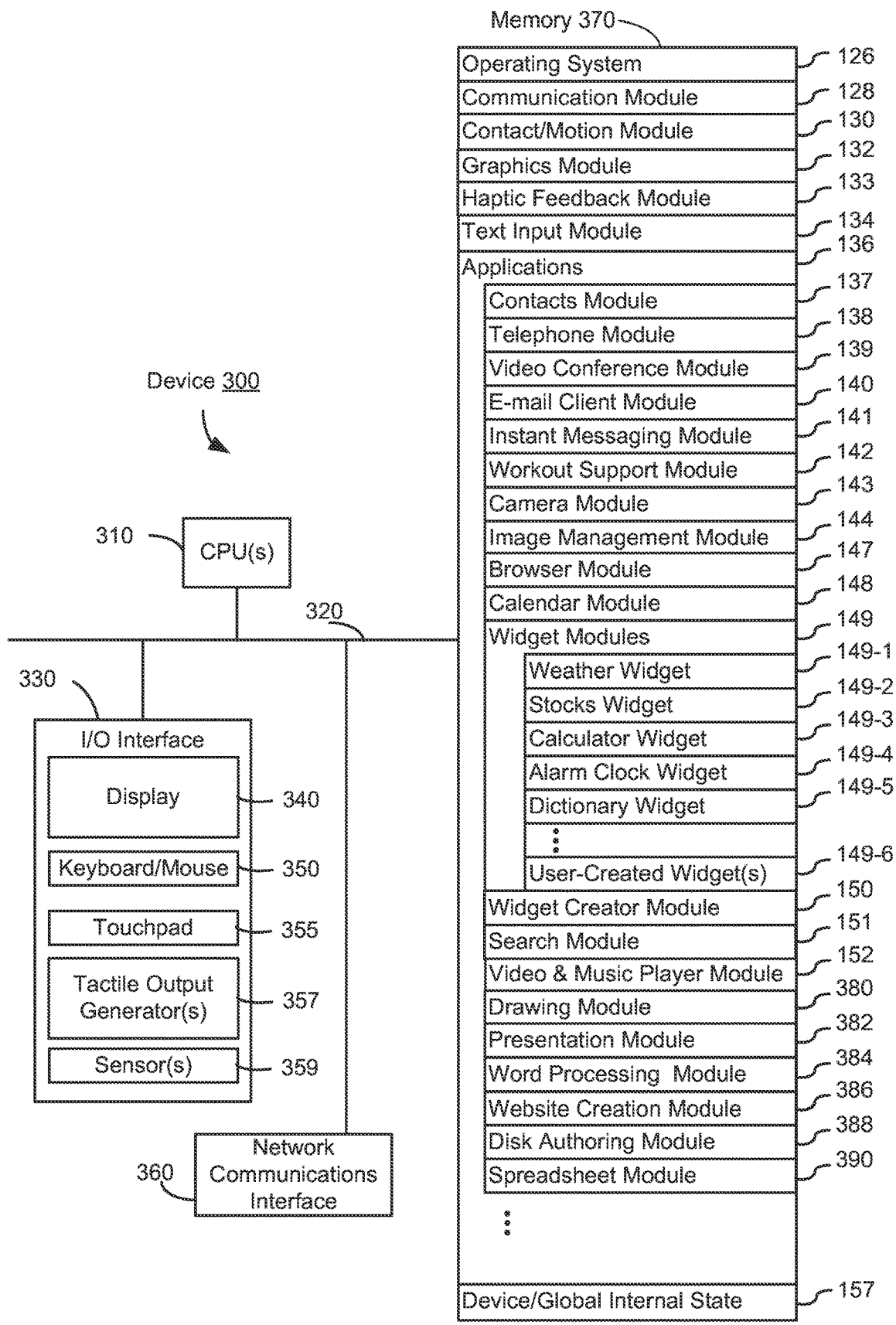
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124.

External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
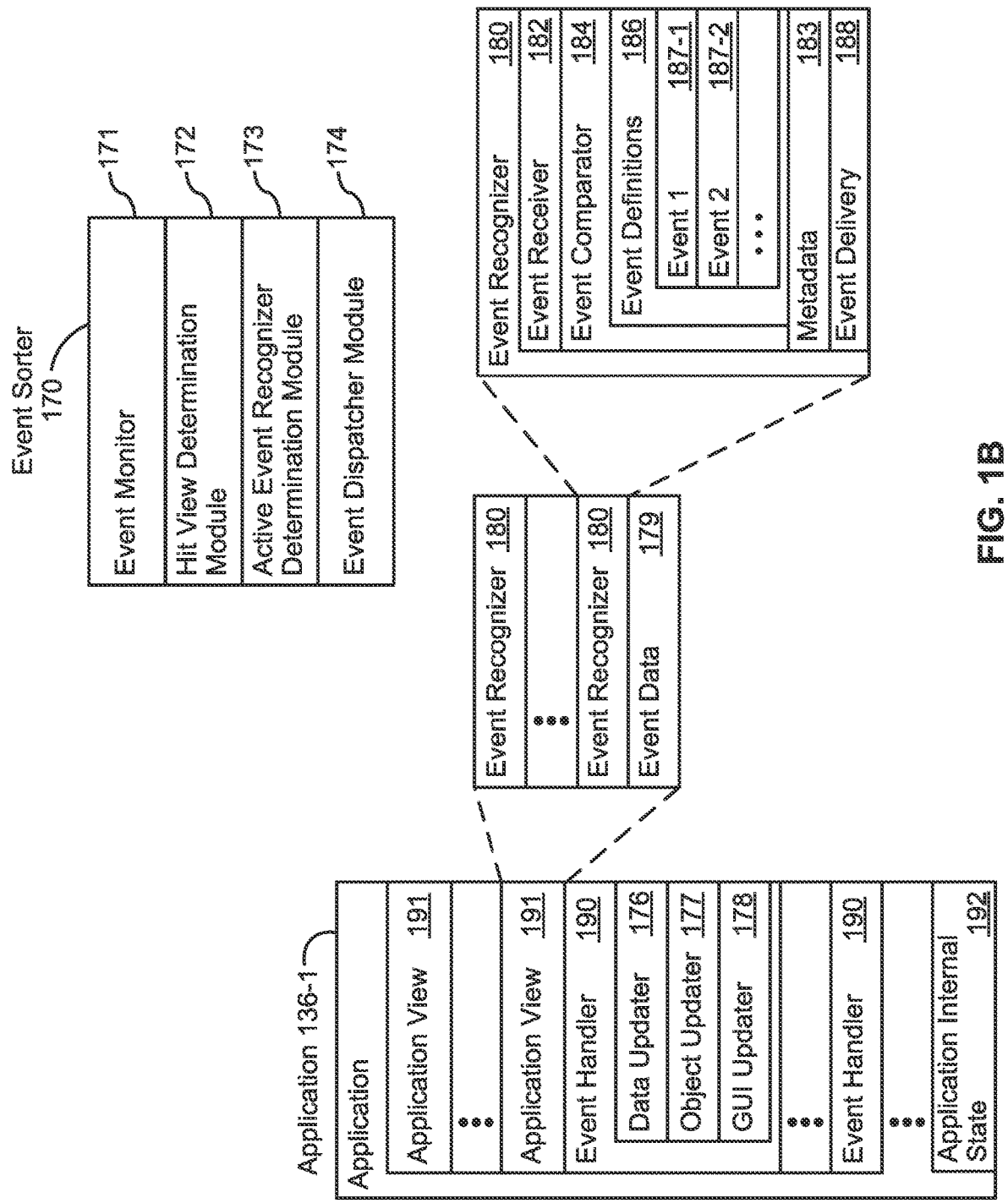
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110).

Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur.

The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
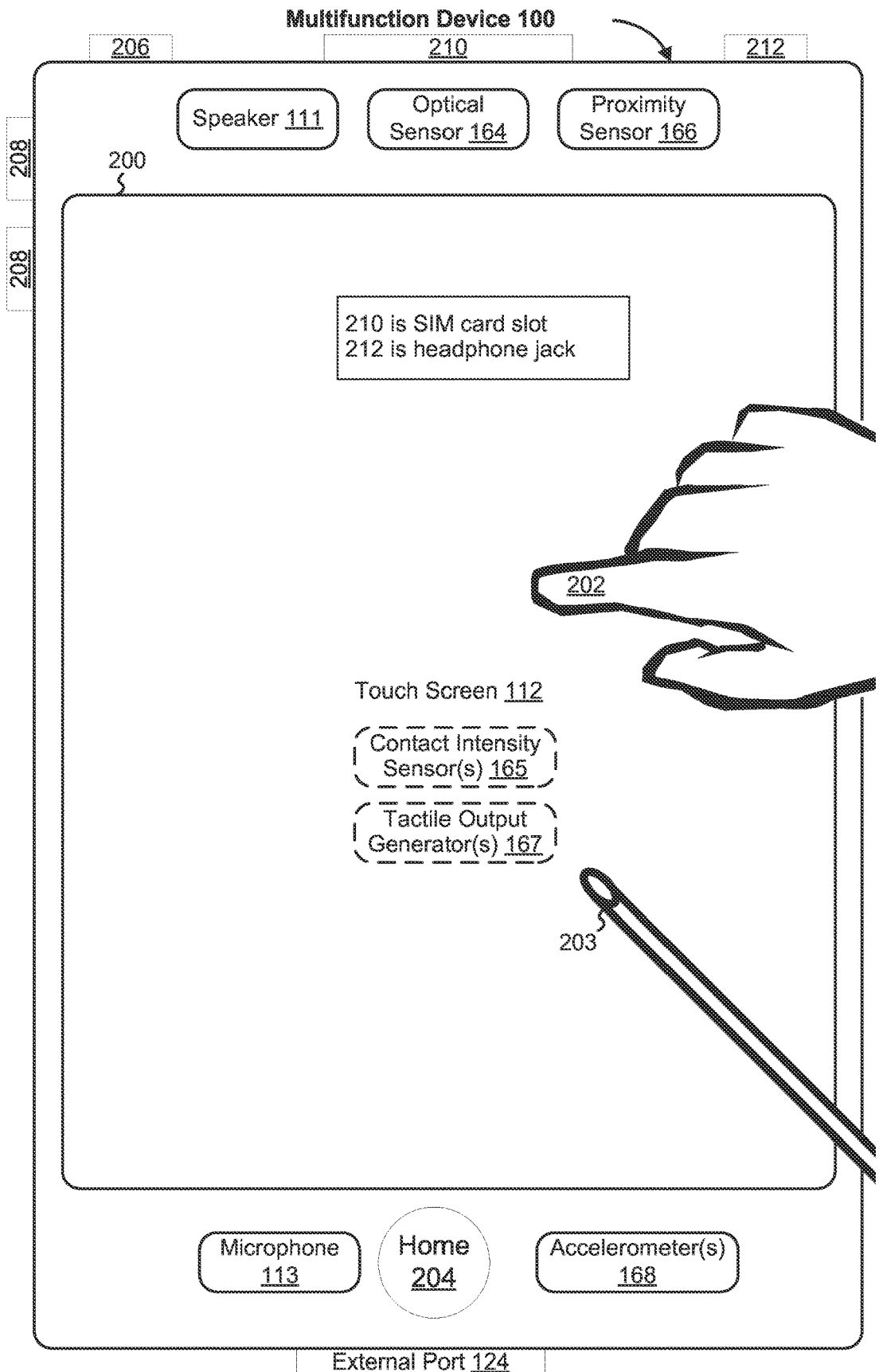
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
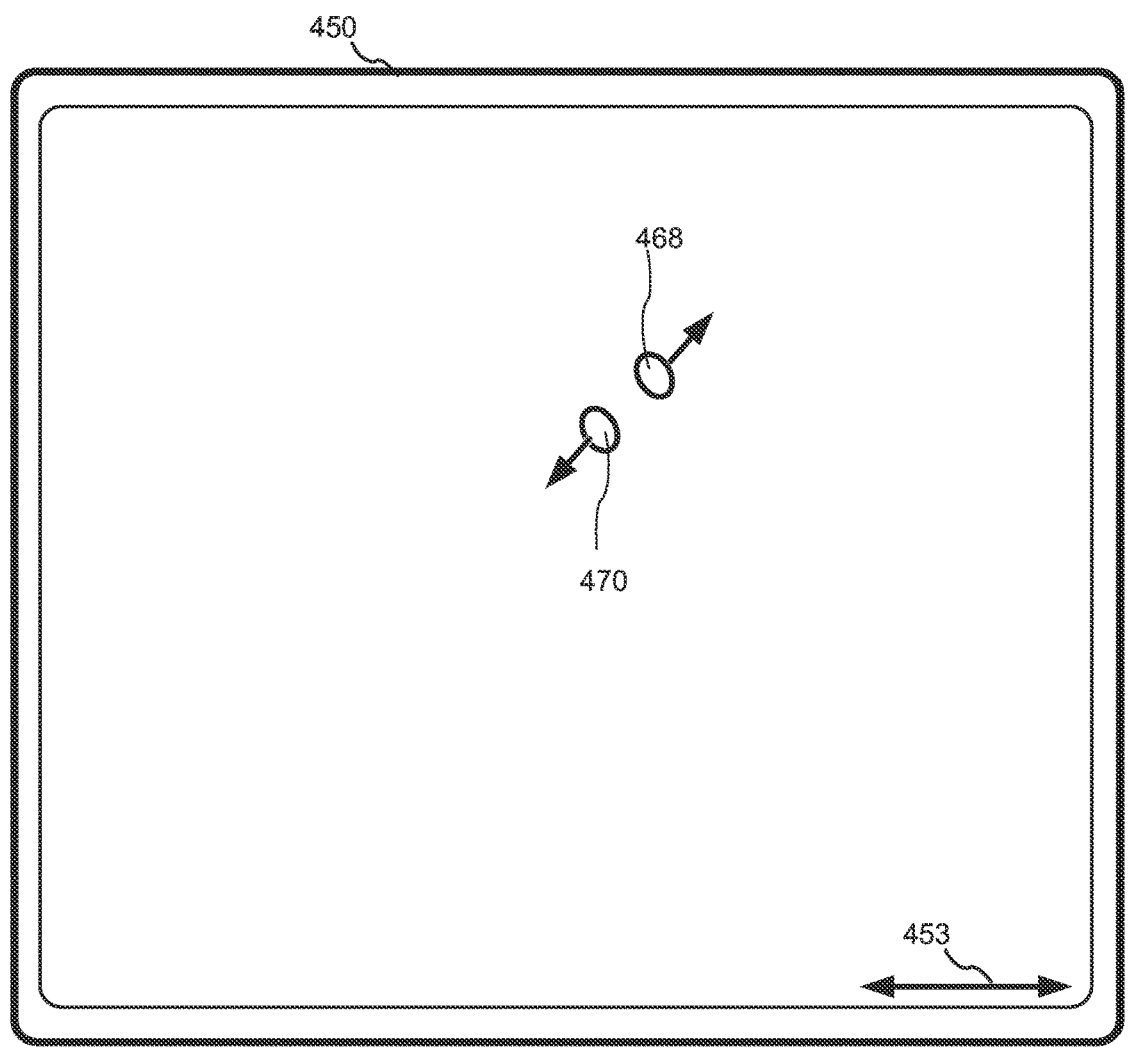
FIG. 4 illustrates an exemplary user interface for a multifunction device with a touch-sensitive surface that is separate from the display in accordance with some embodiments of the disclosure.
Figure 4:
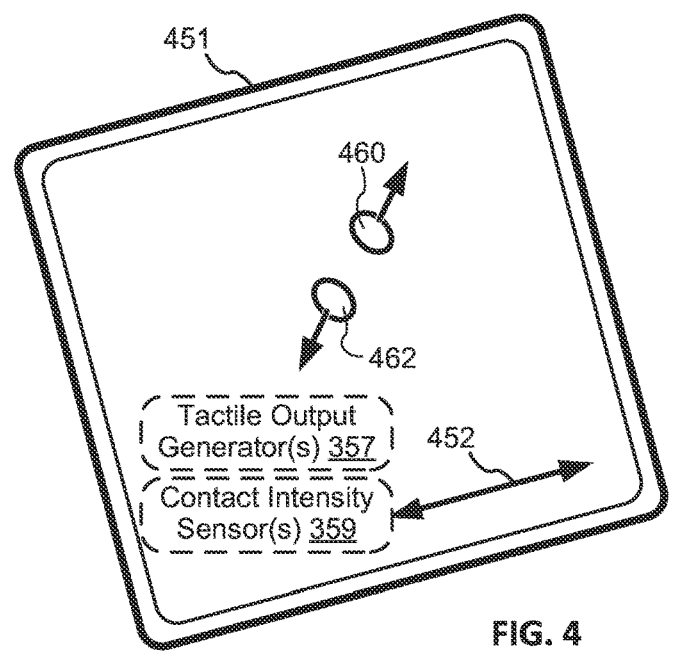

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
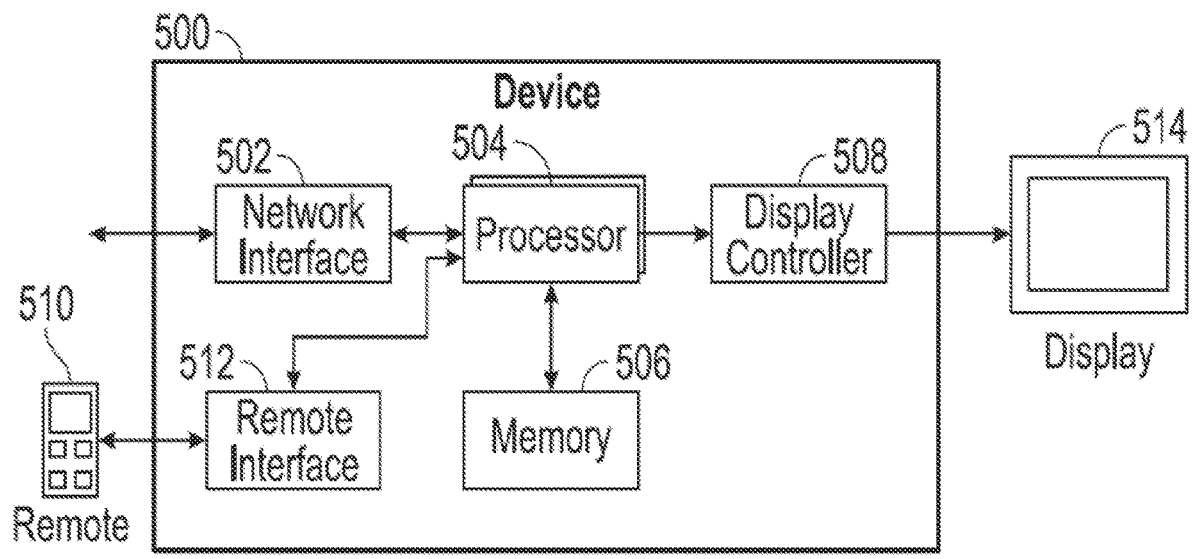
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
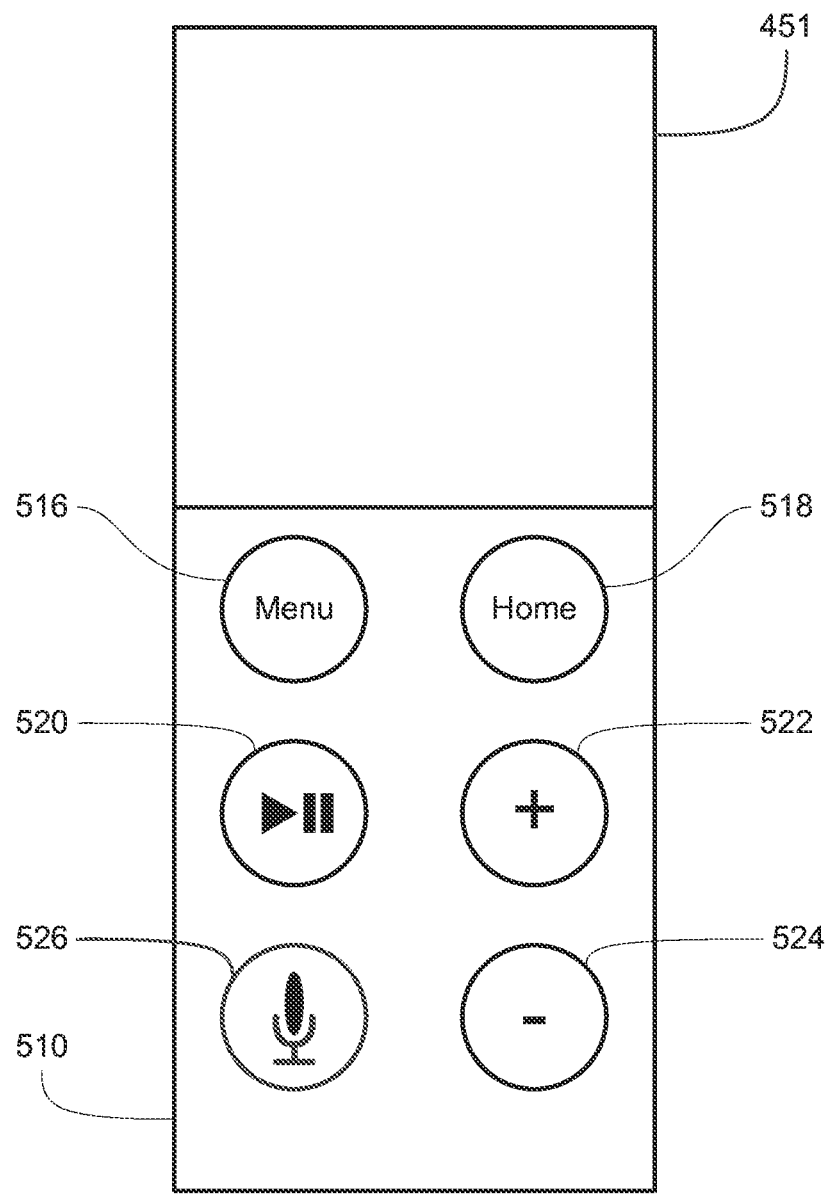

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backward in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

USER INTERFACES AND ASSOCIATED PROCESSES

Content Scrubber Bar

Users interact with electronic devices in many different manners, including interacting with content (e.g., music, movies, etc.) that may be available (e.g., stored or otherwise accessible) on the electronic devices. In some circumstances, a user desires to understand the current play position in content the user is watching, when the content will end, and/or desires to skip (e.g., fast forward, rewind, etc.) through the. A scrubber bar for skipping through the content optionally provides such information and functionality. However, scrubber bars are generally displayed with time indications that are relative to the content playing on the electronic devices (e.g., referenced with respect to the start of the content, the end of the content, the current play position in the content, etc.). Thus, a scrubber bar optionally indicates that 90 minutes remain in the content, for example. The embodiments described below provide ways in which electronic devices display a scrubber bar with one or more time indications that are relative to real world time at the electronic devices, rather than being relative to the content playing on the electronic devices, making it easier for a user to determine how various positions in the content relate to the time of day at the electronic device, thereby enhancing users' interactions with the electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
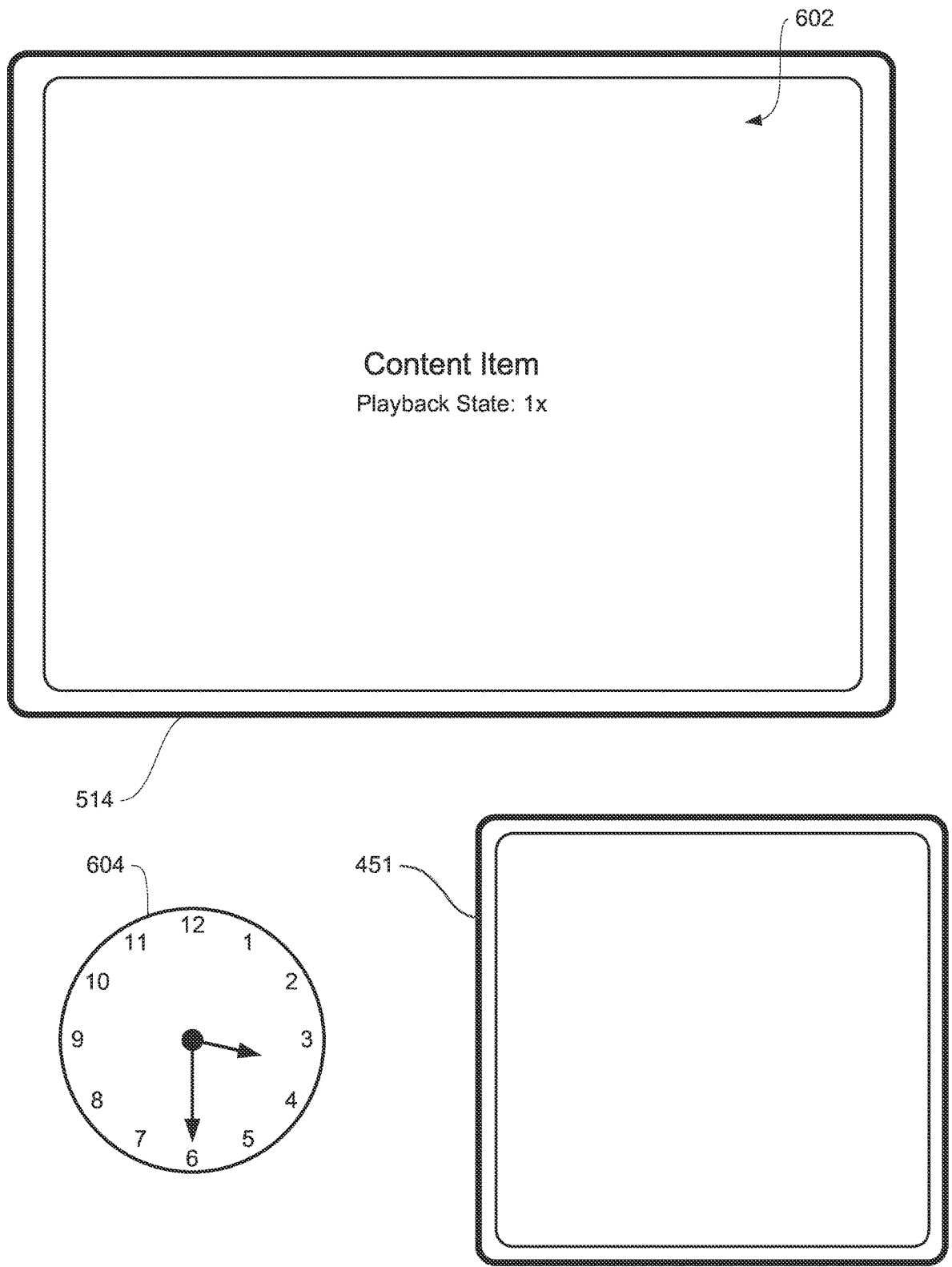
FIGS. 6A-6Z illustrate exemplary ways in which a scrubber bar is presented with "real world" playback time indications in accordance with some embodiments of the disclosure.
Figure 6B:
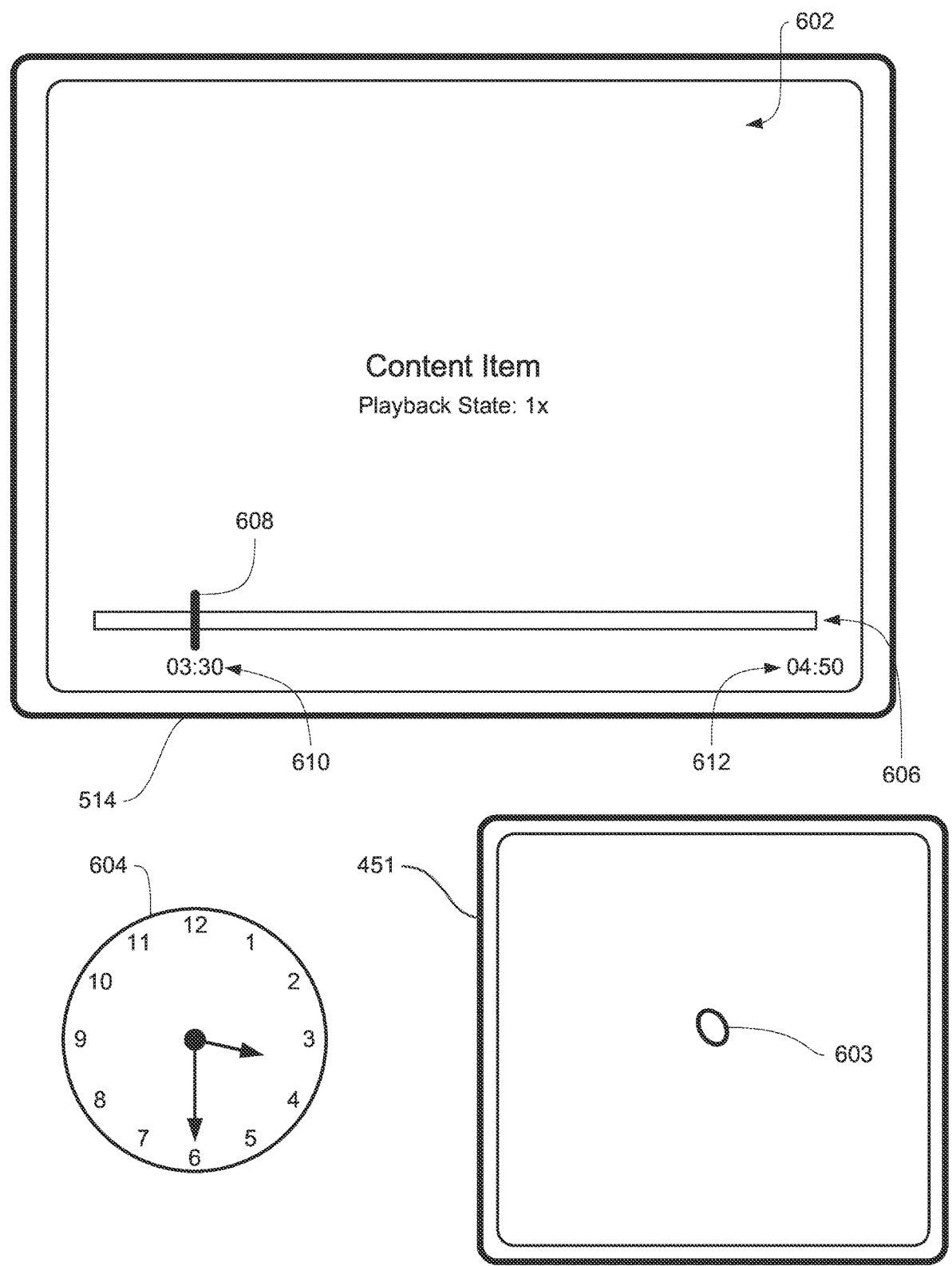
Figure 6C:
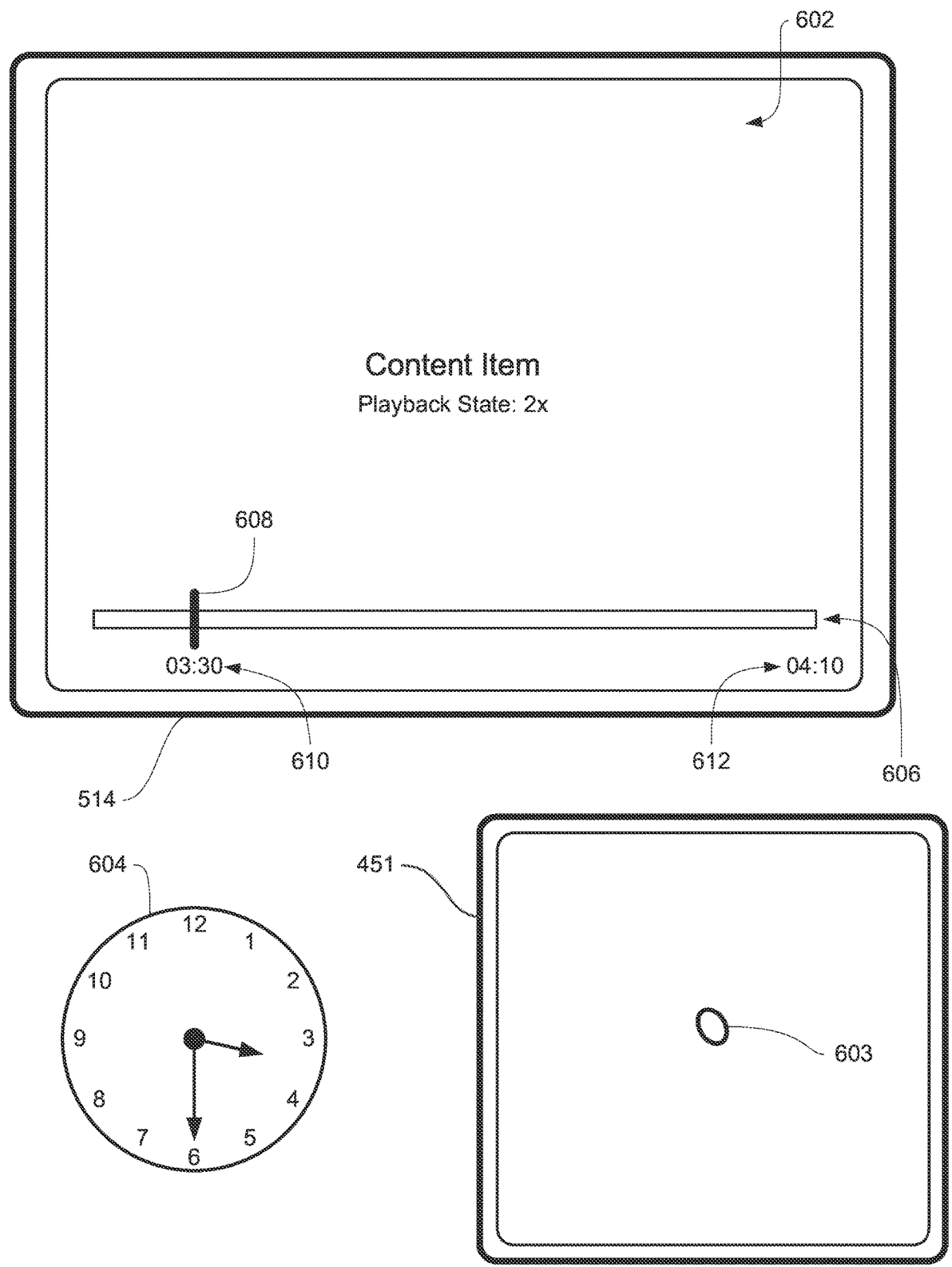
Figure 6D:
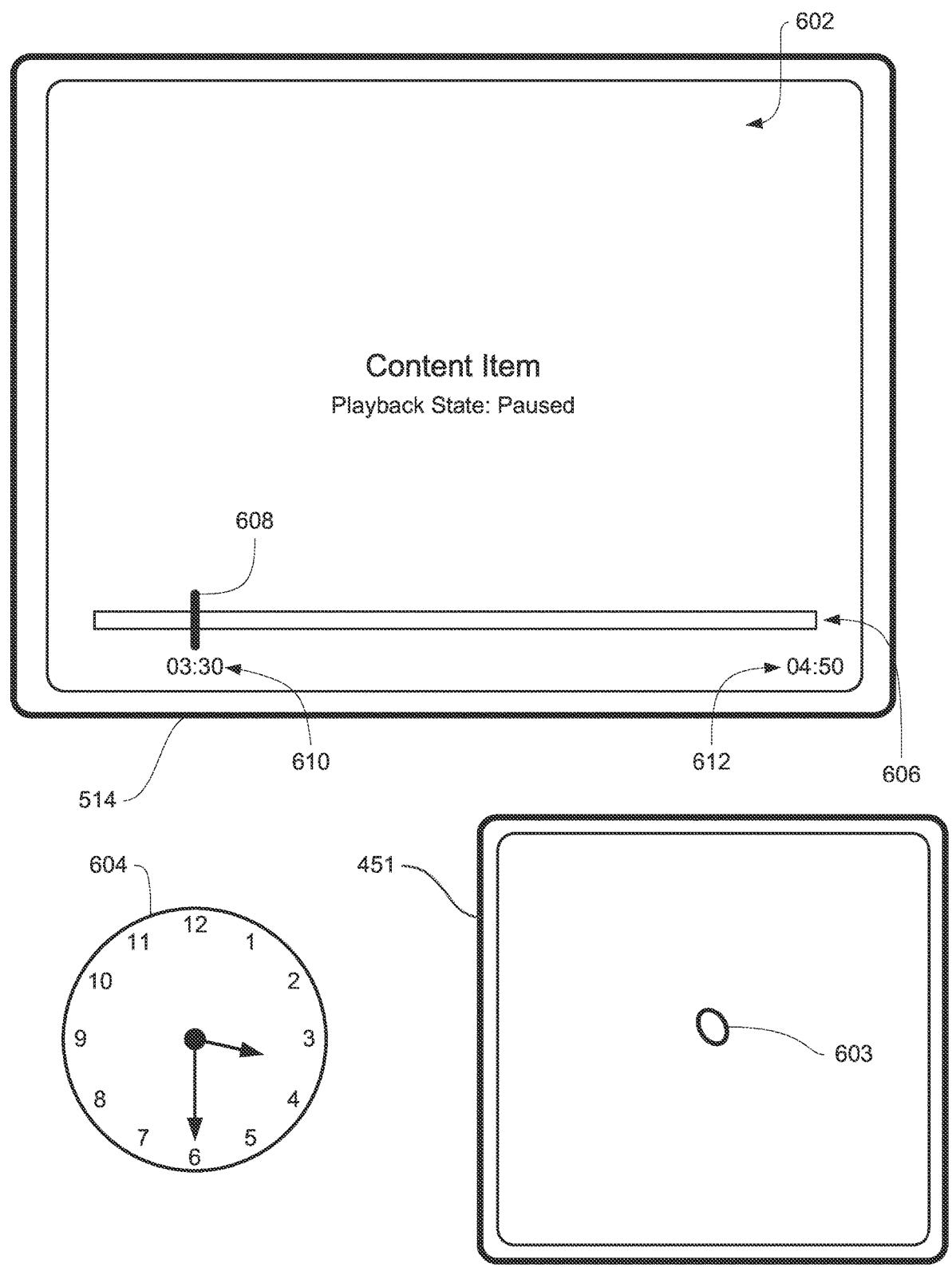
Figure 6E:
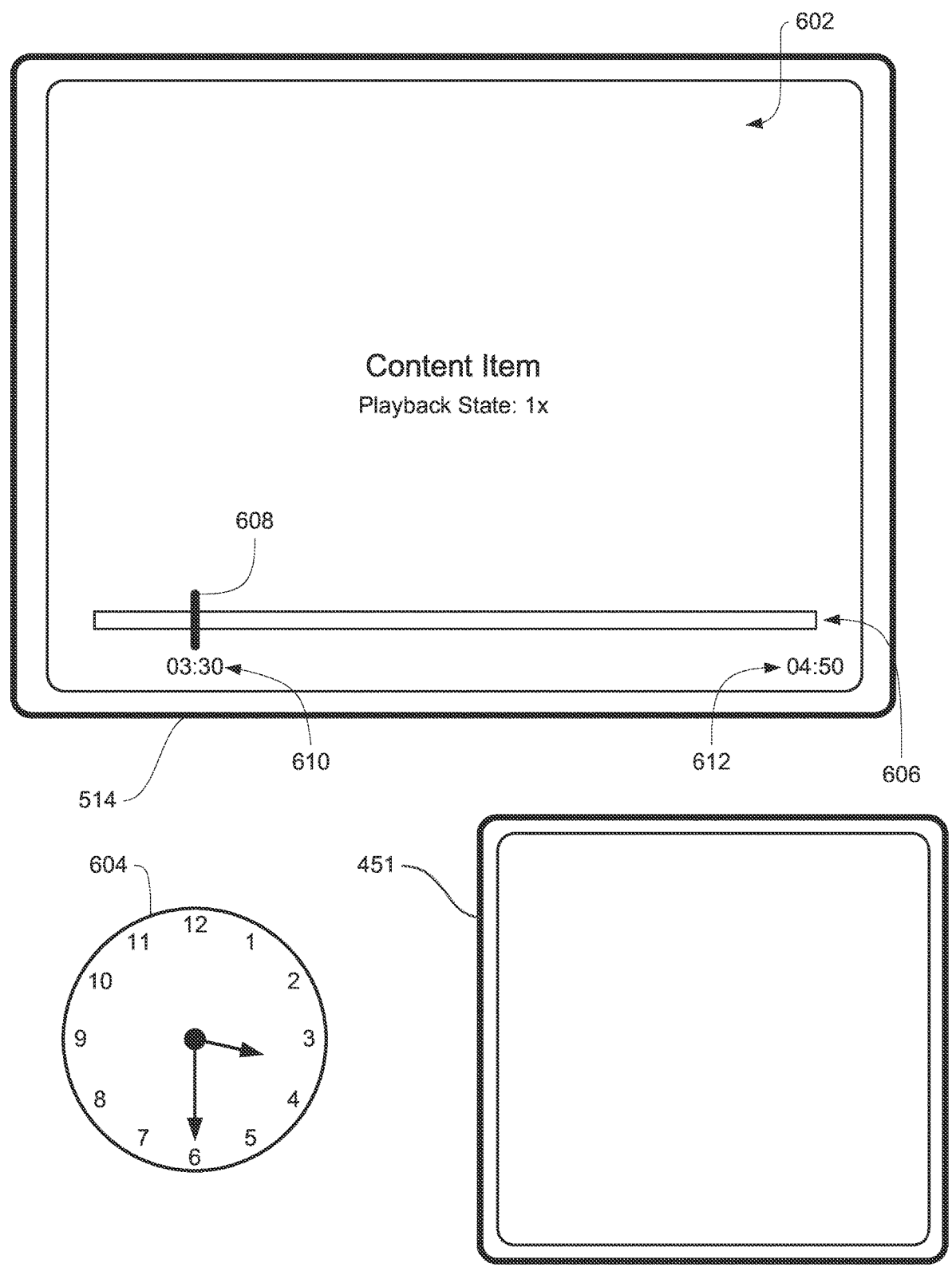
Figure 6F:
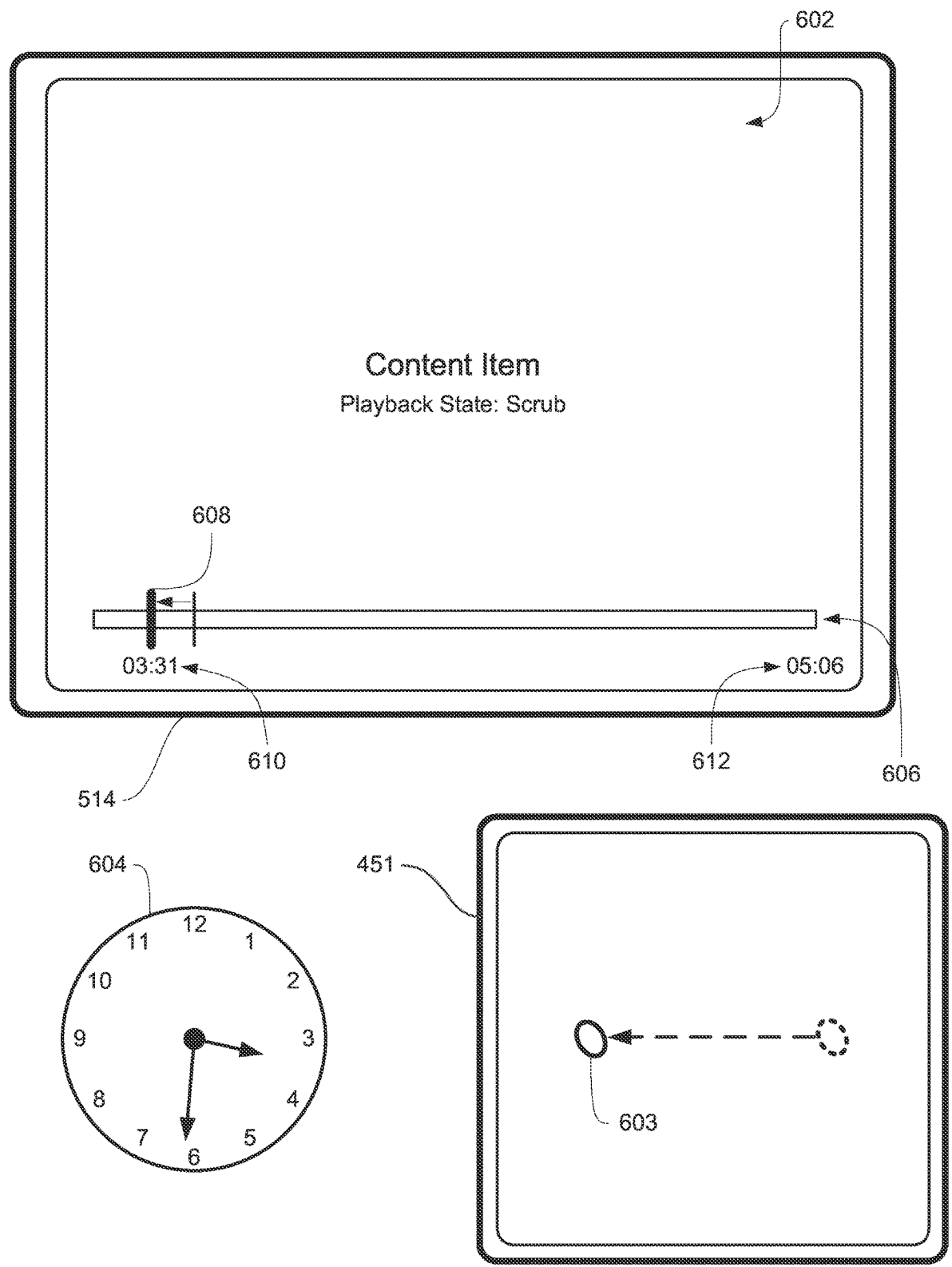
Figure 6G:
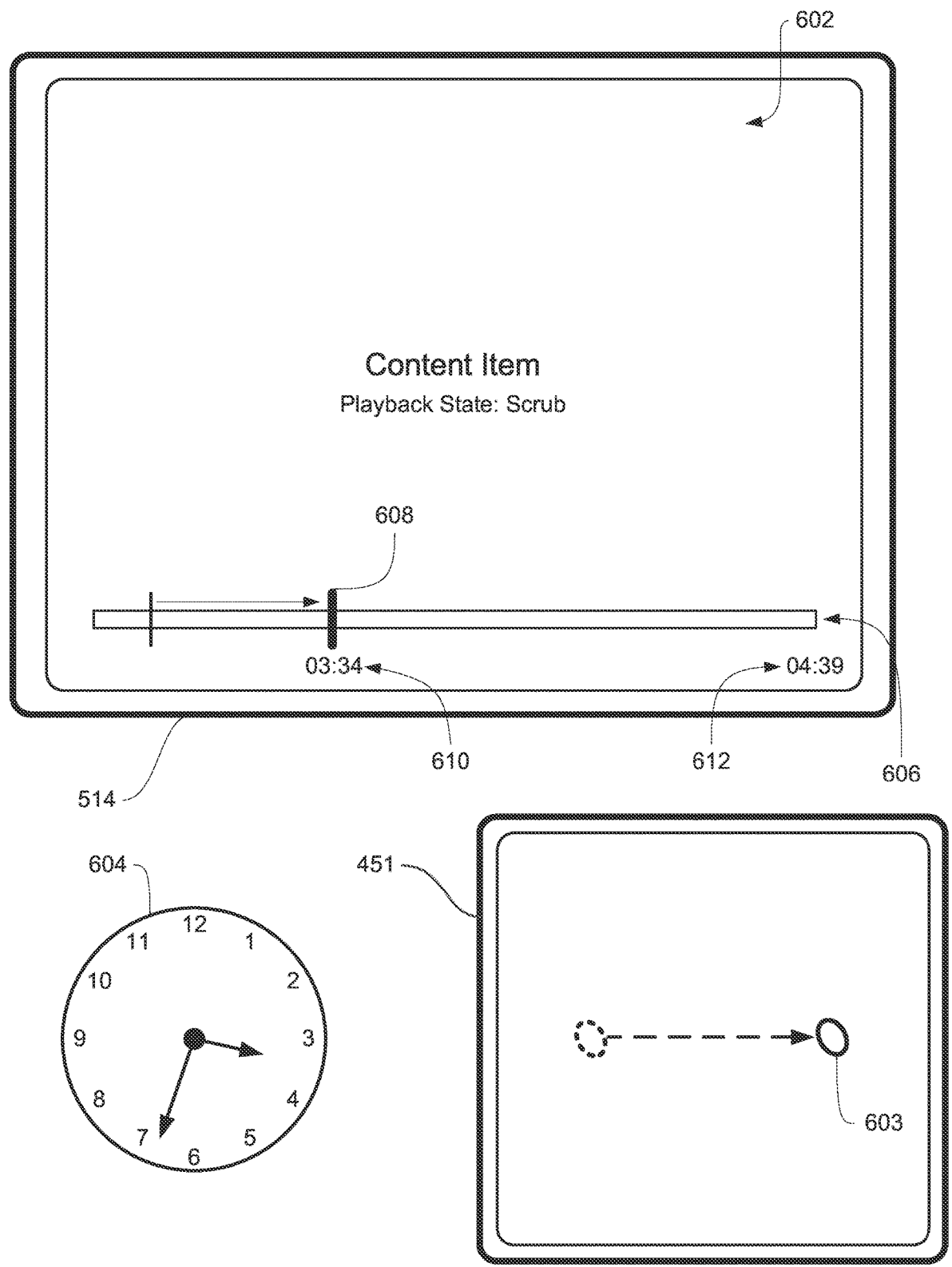
Figure 6H:
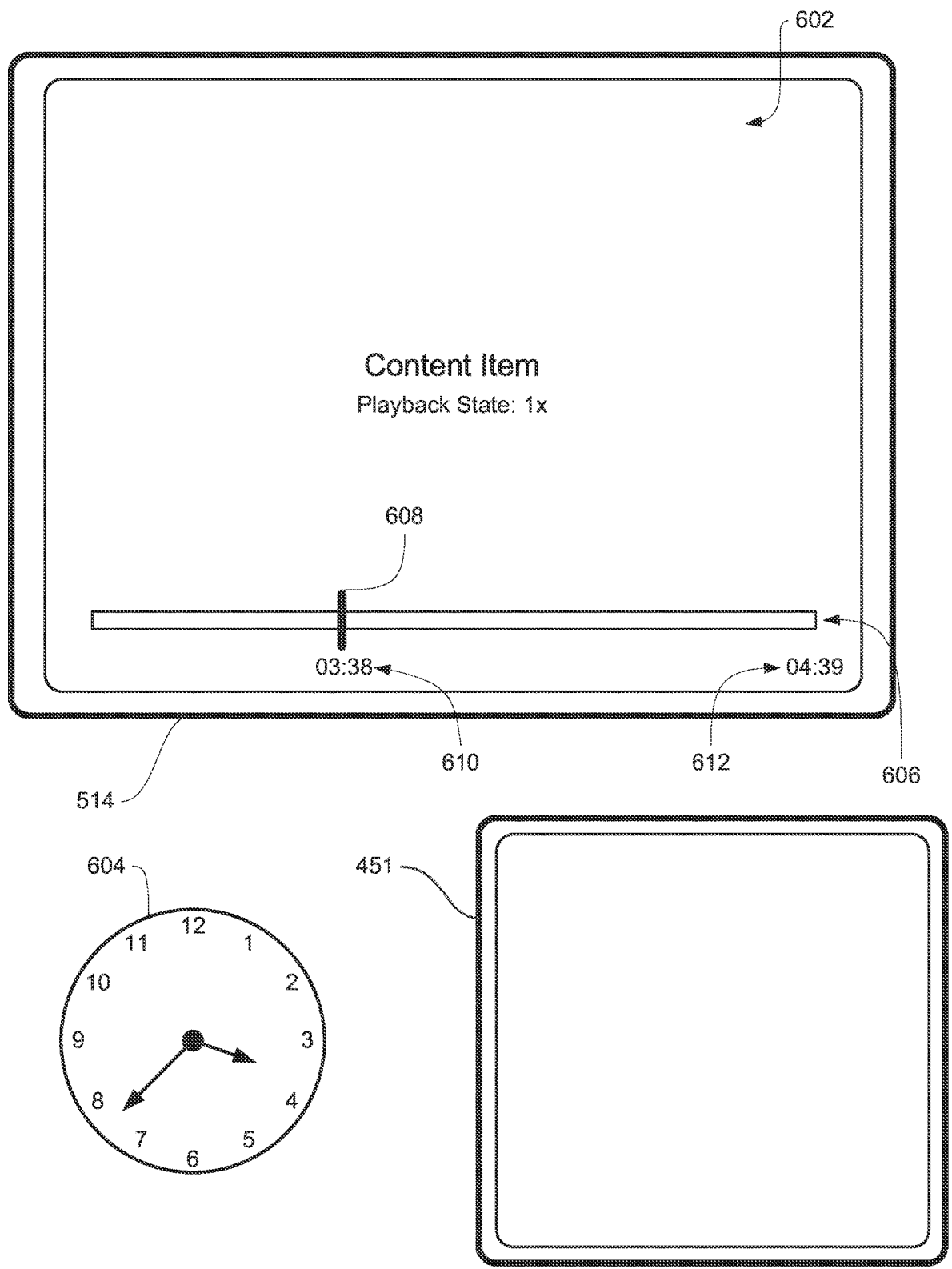
Figure 6I:
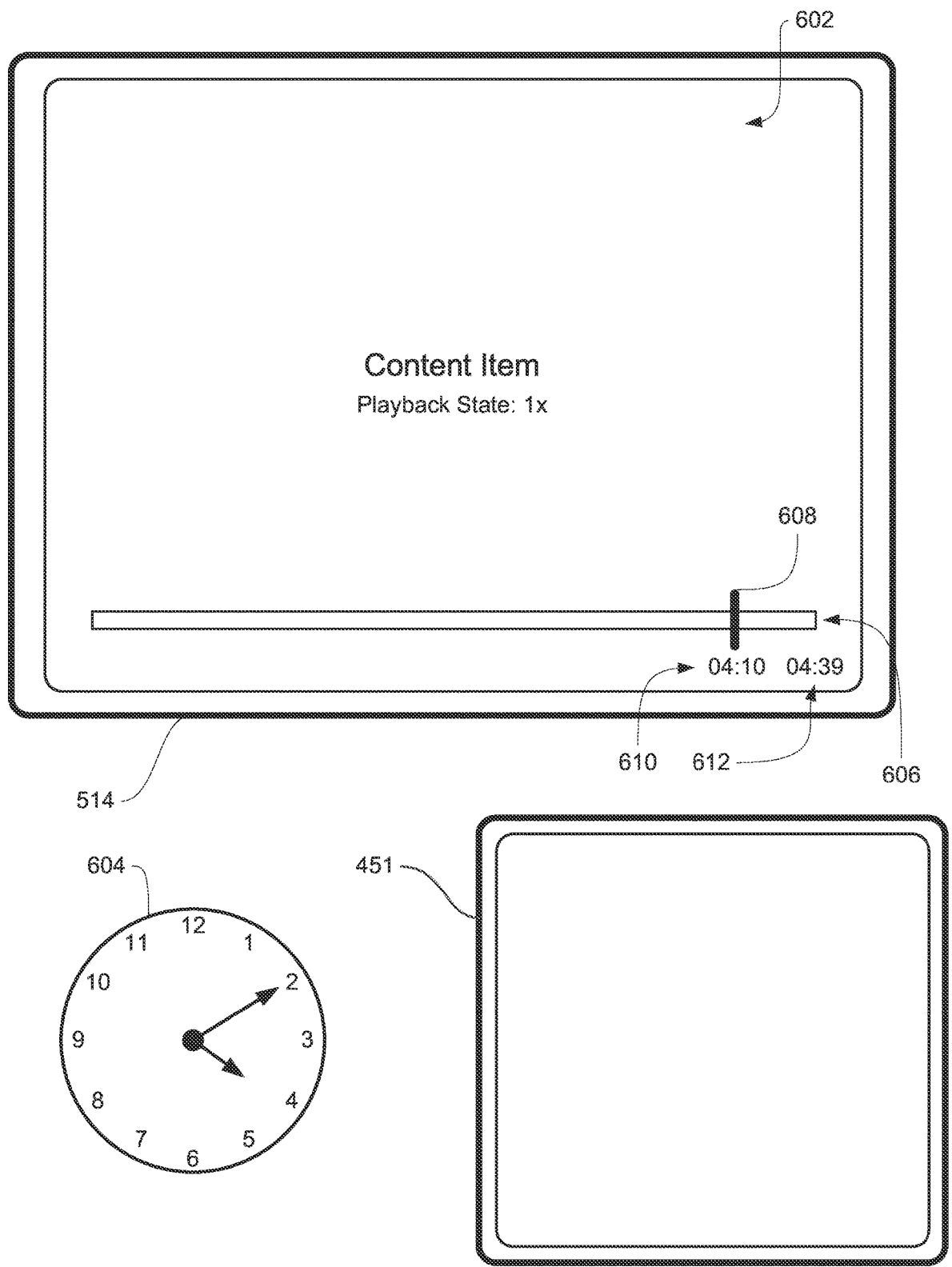
Figure 6J:
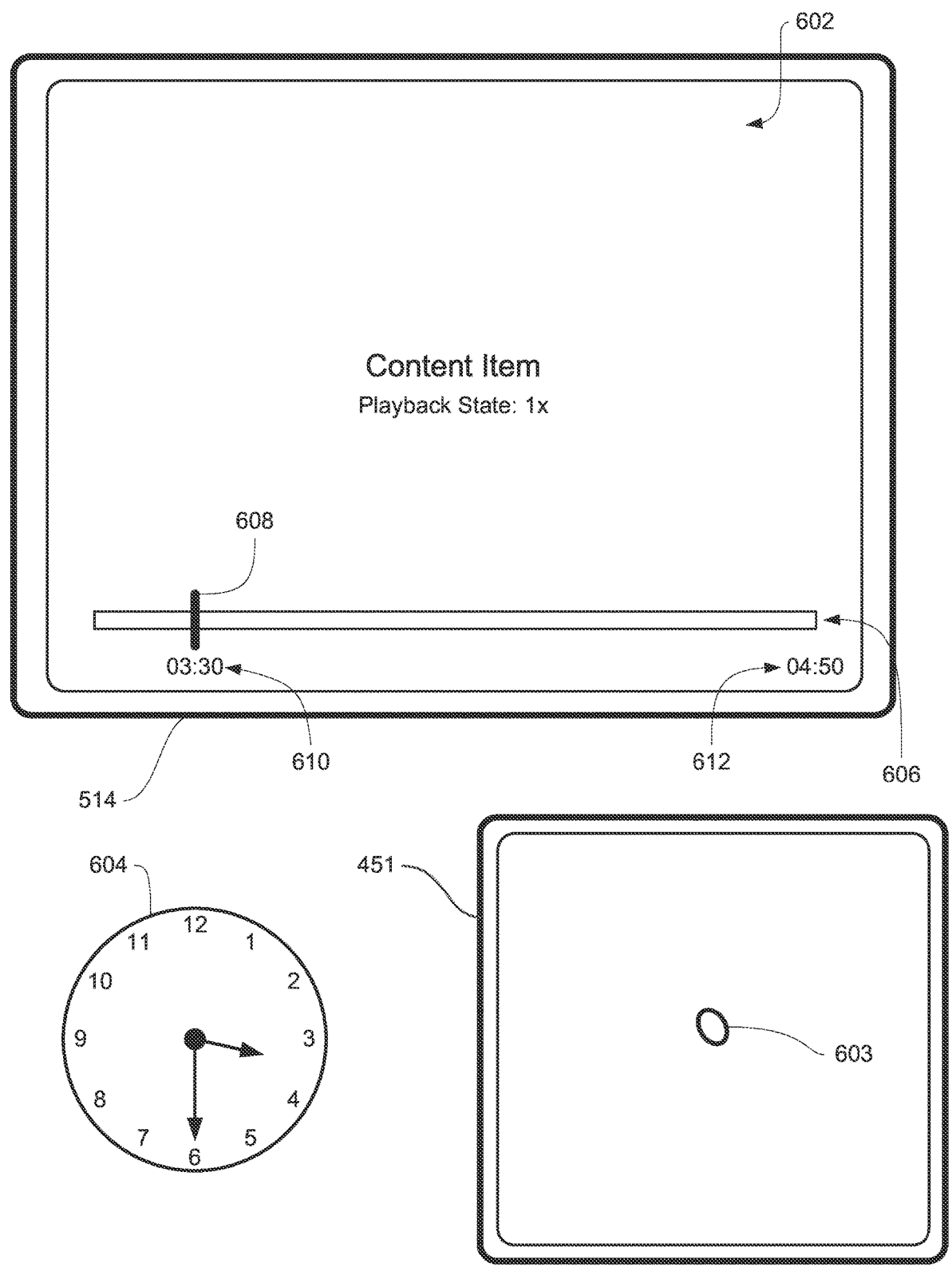
Figure 6K:
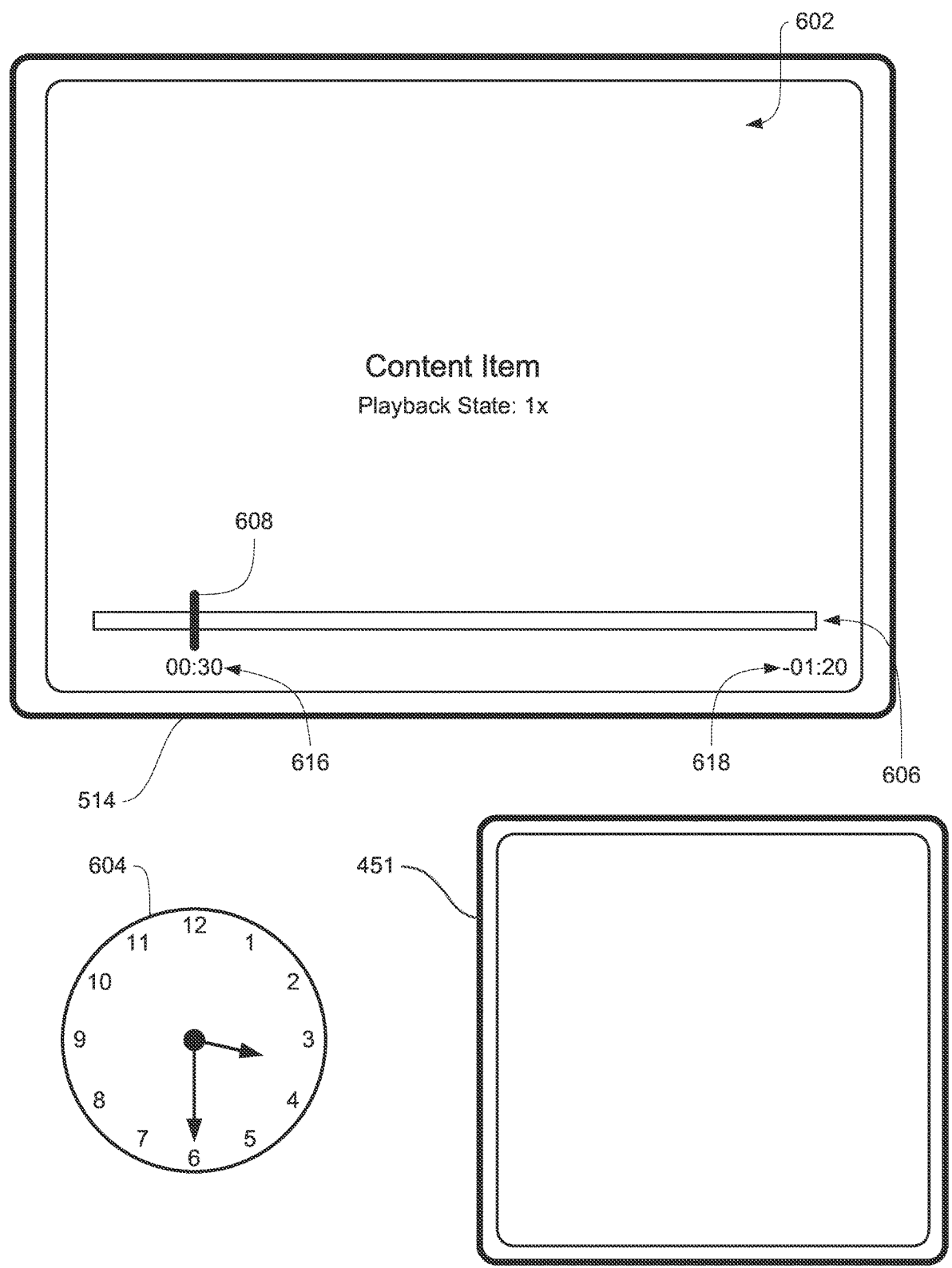
Figure 6L:
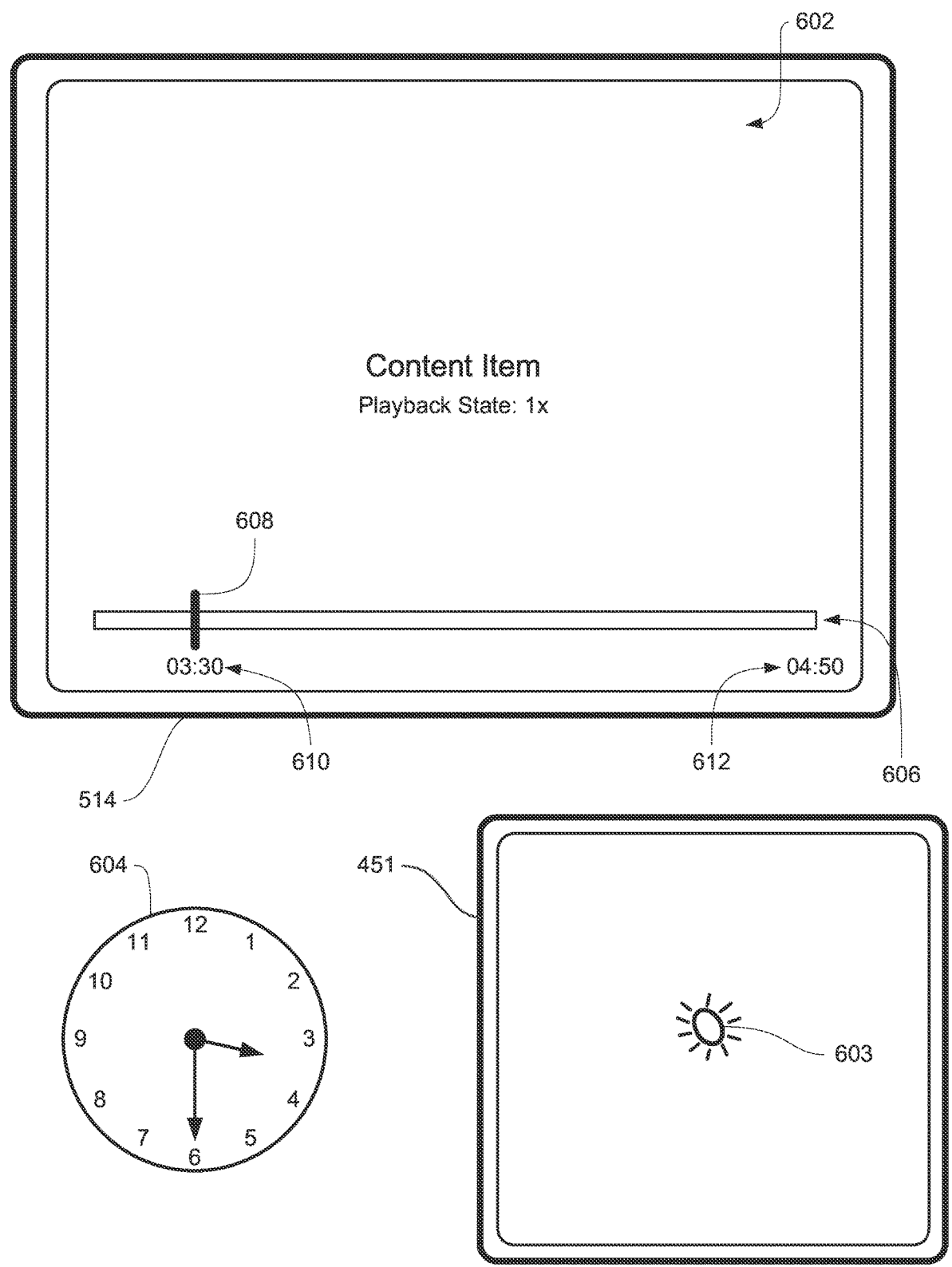
Figure 6M:
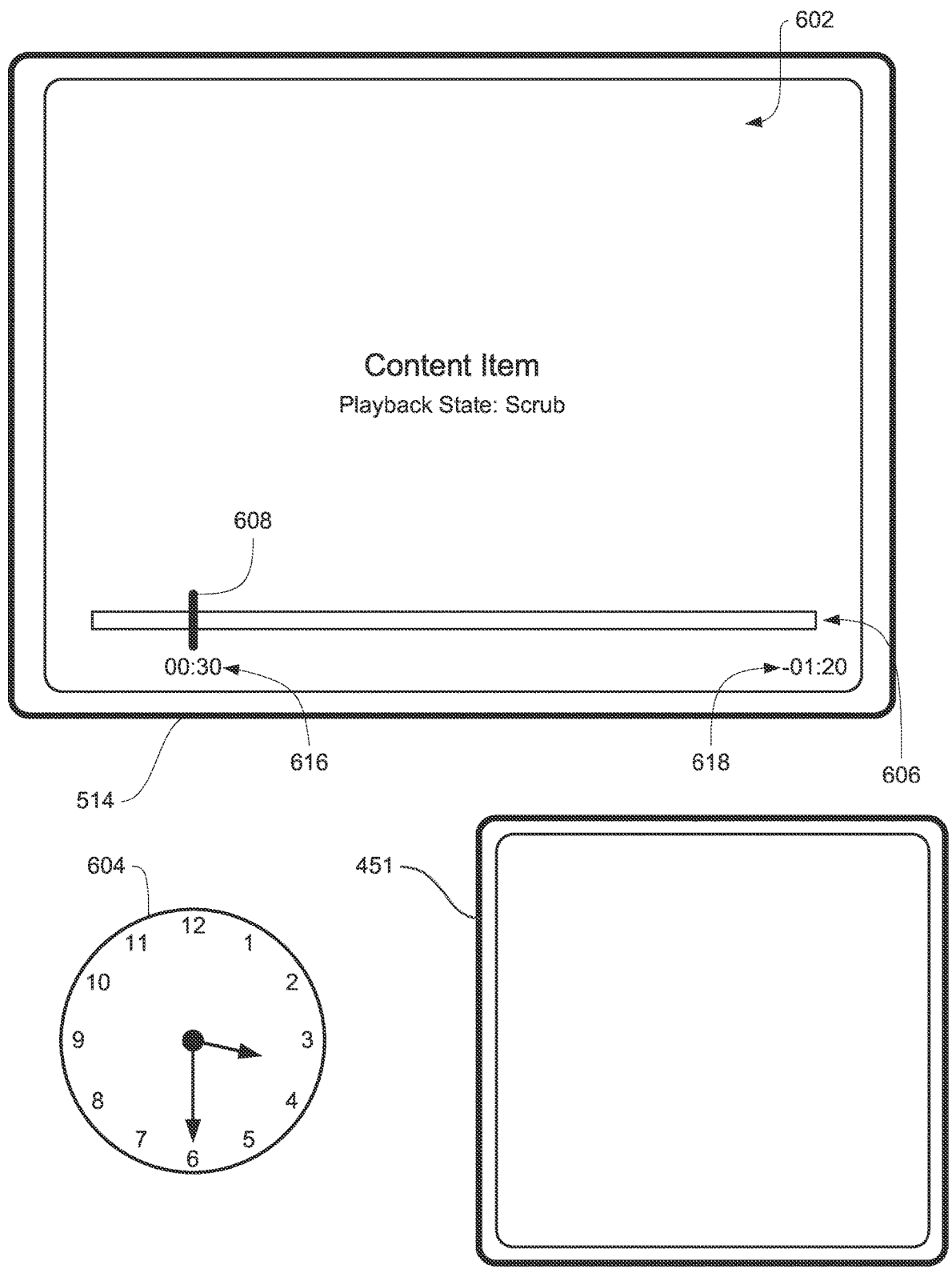
Figure 6N:
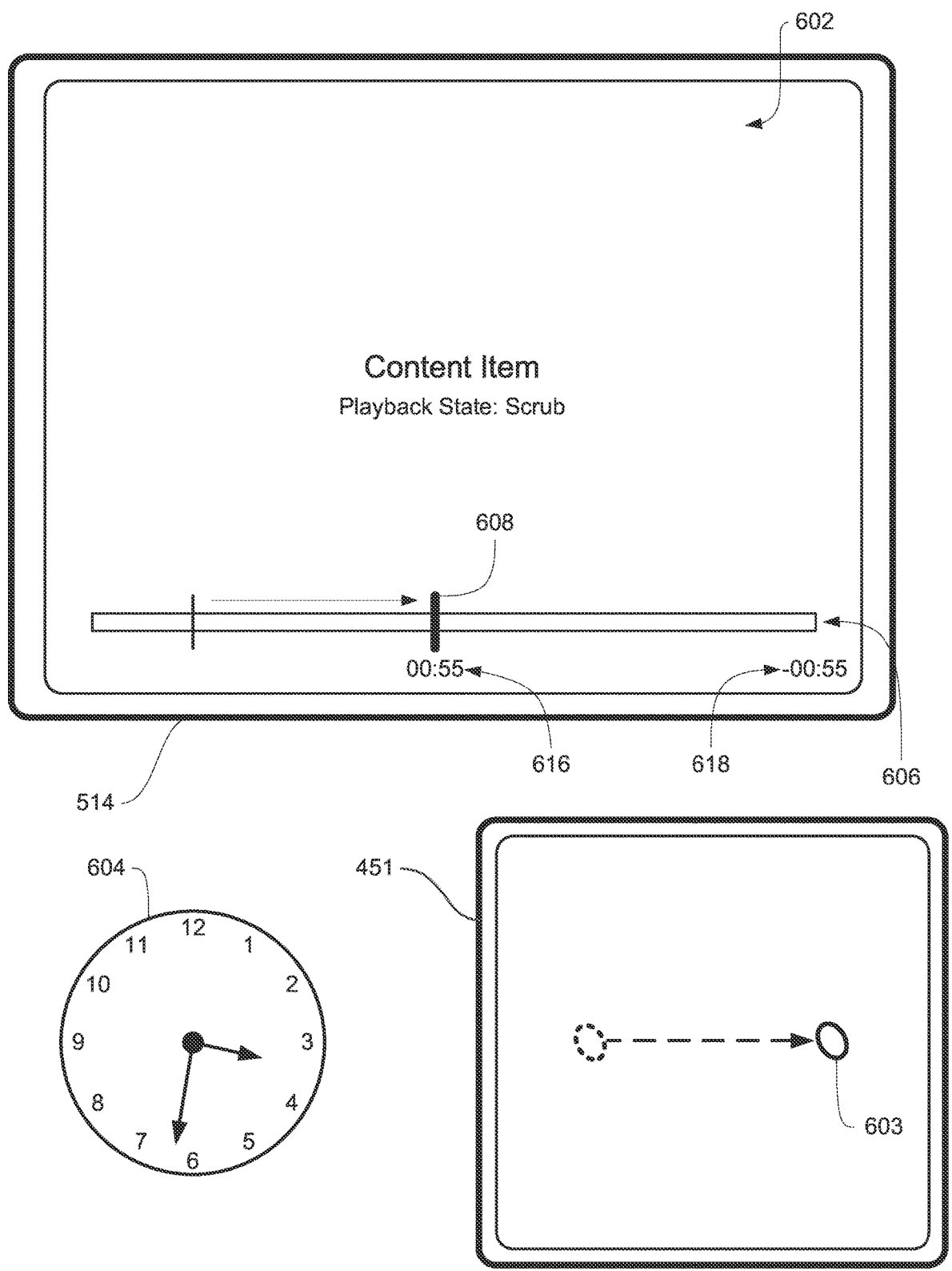
Figure 6O:
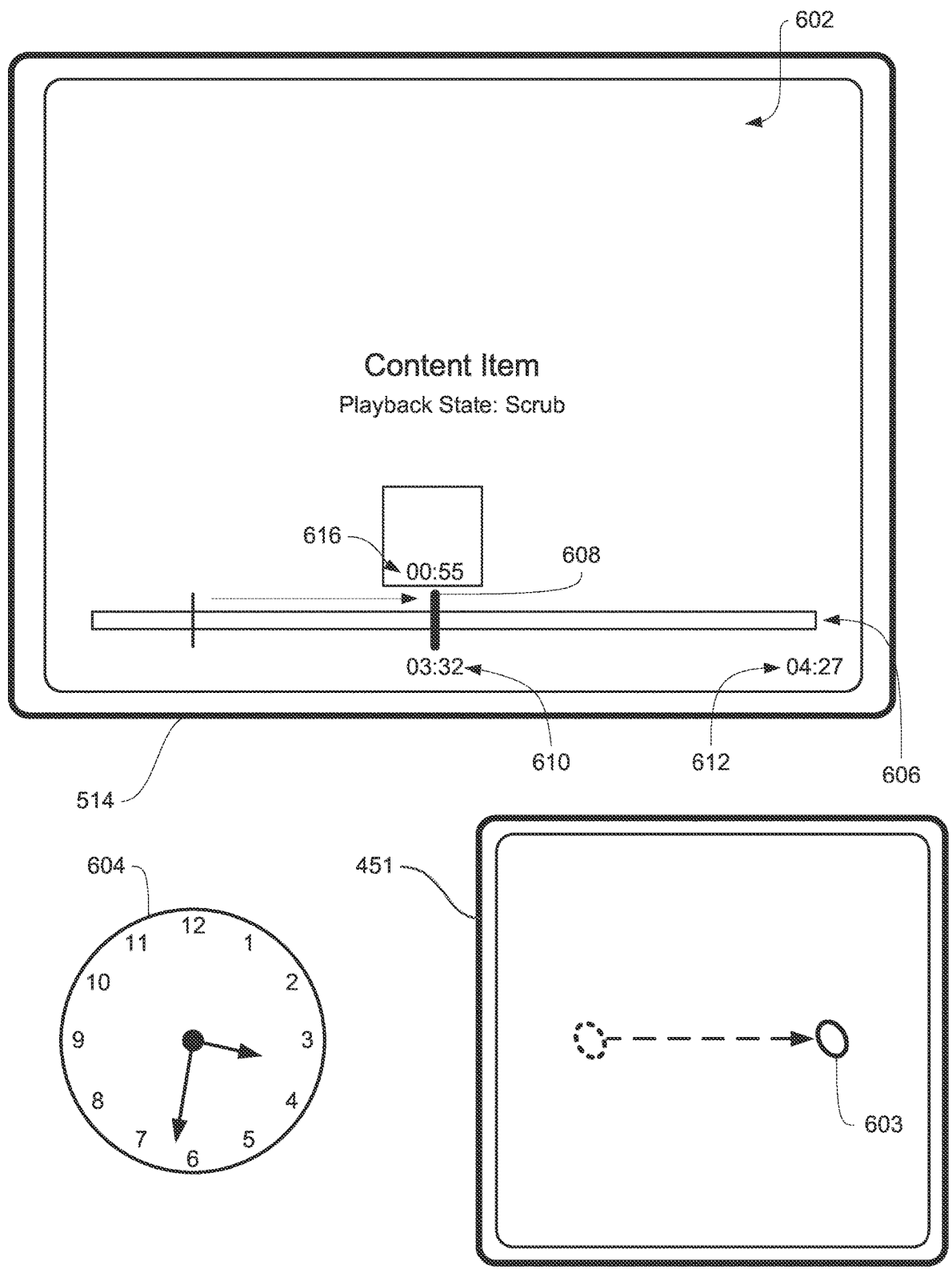
Figure 6P:
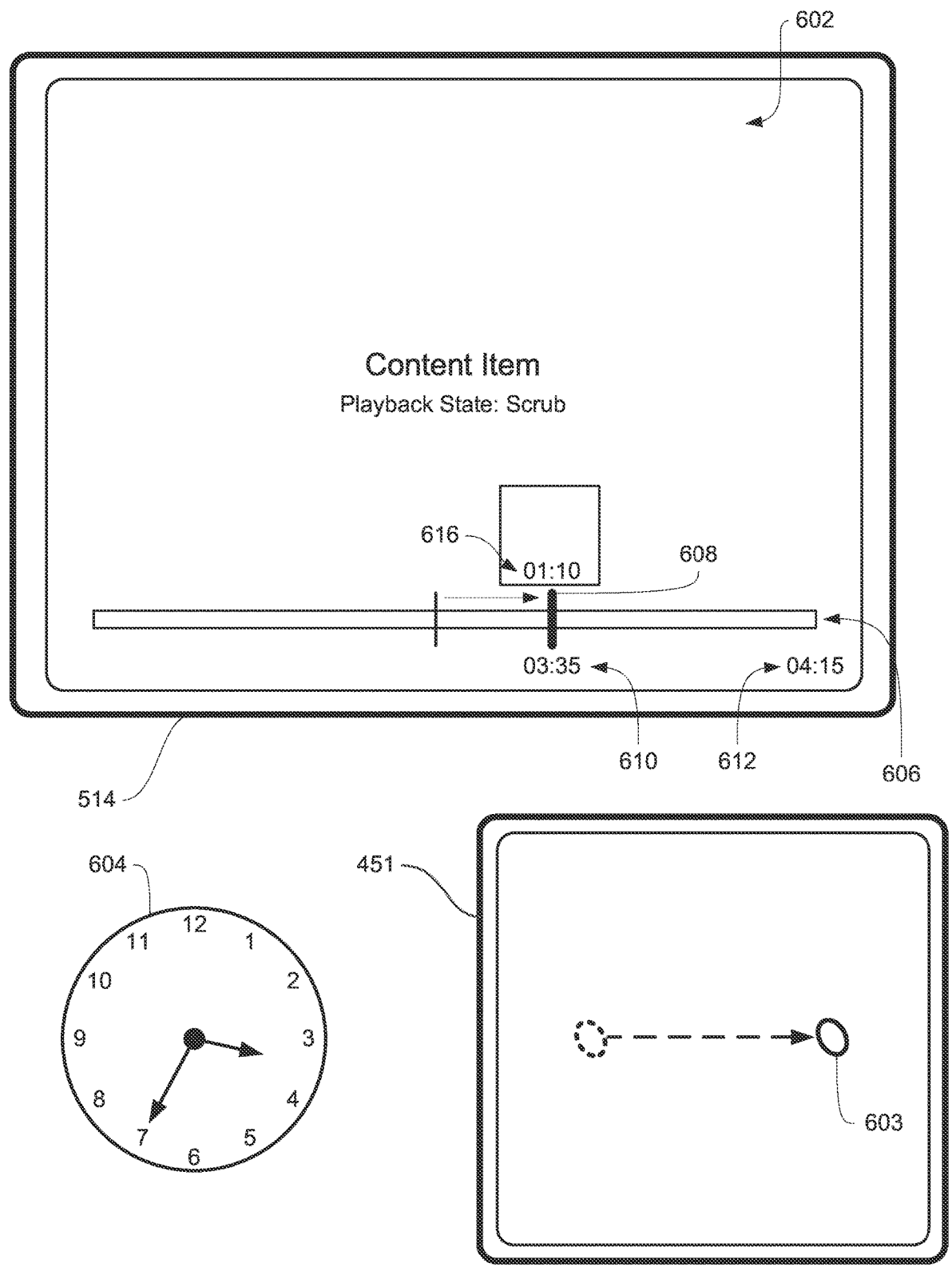
Figure 6Q:
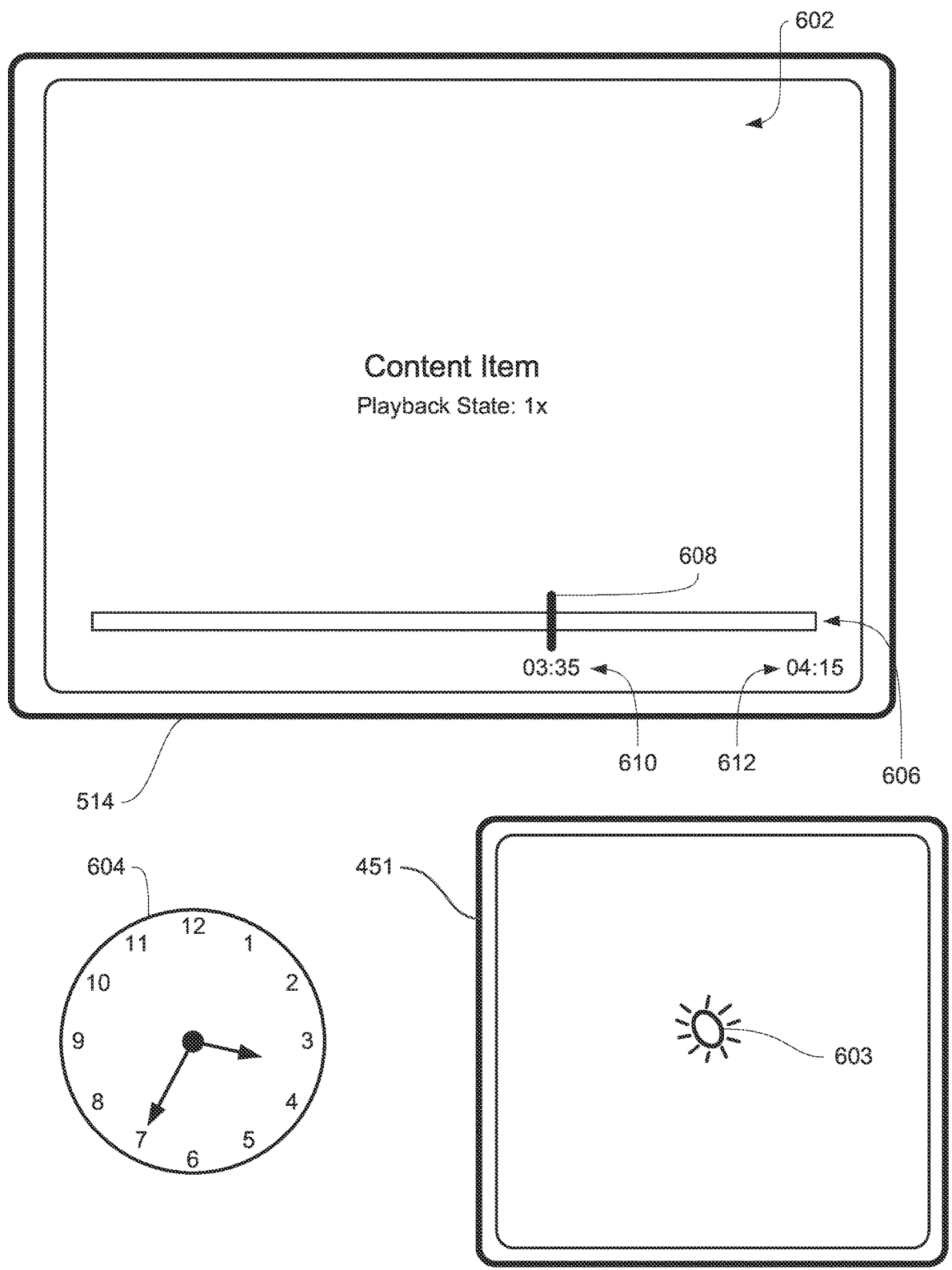
Figure 6R:
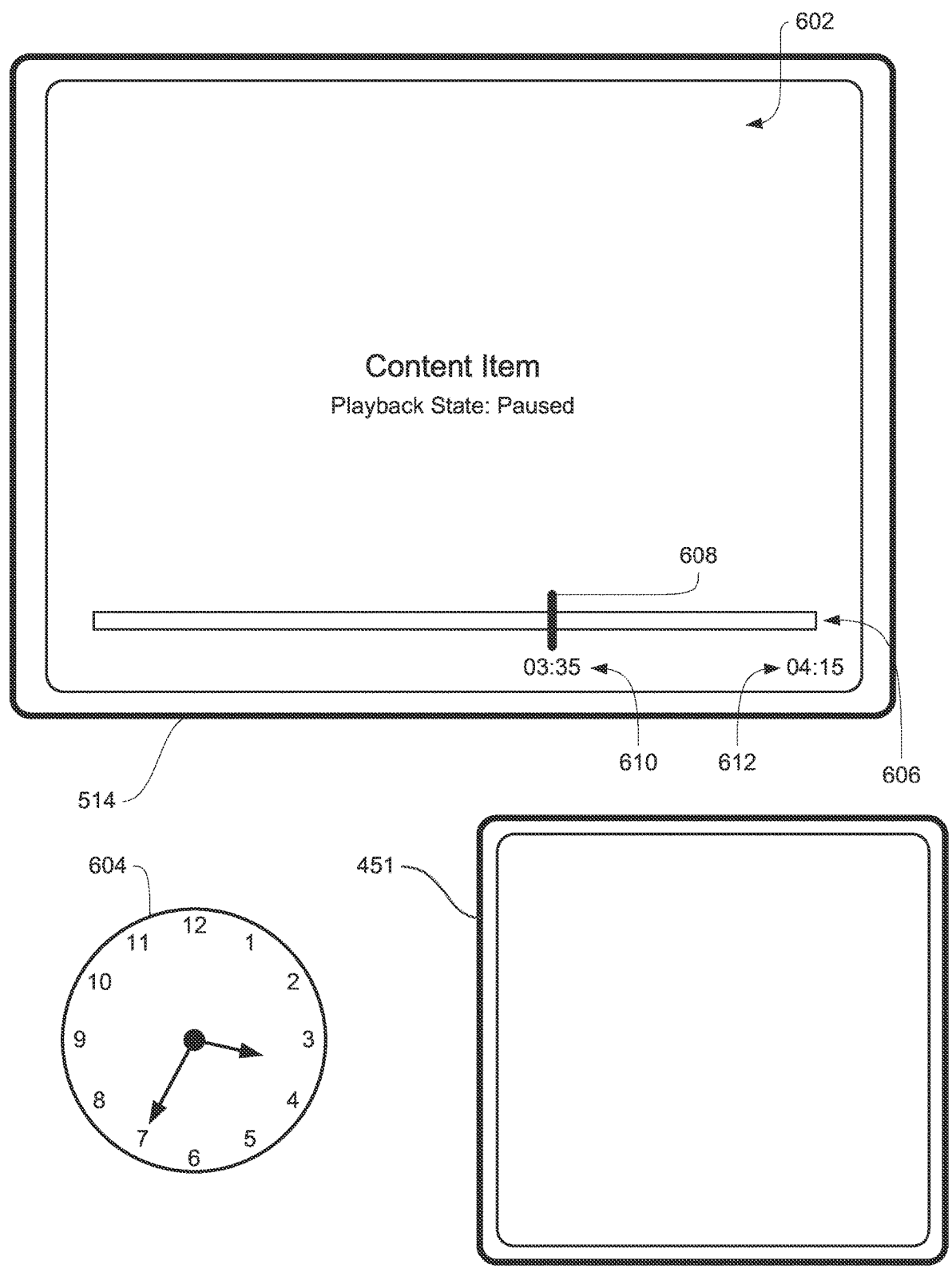
Figure 6S:
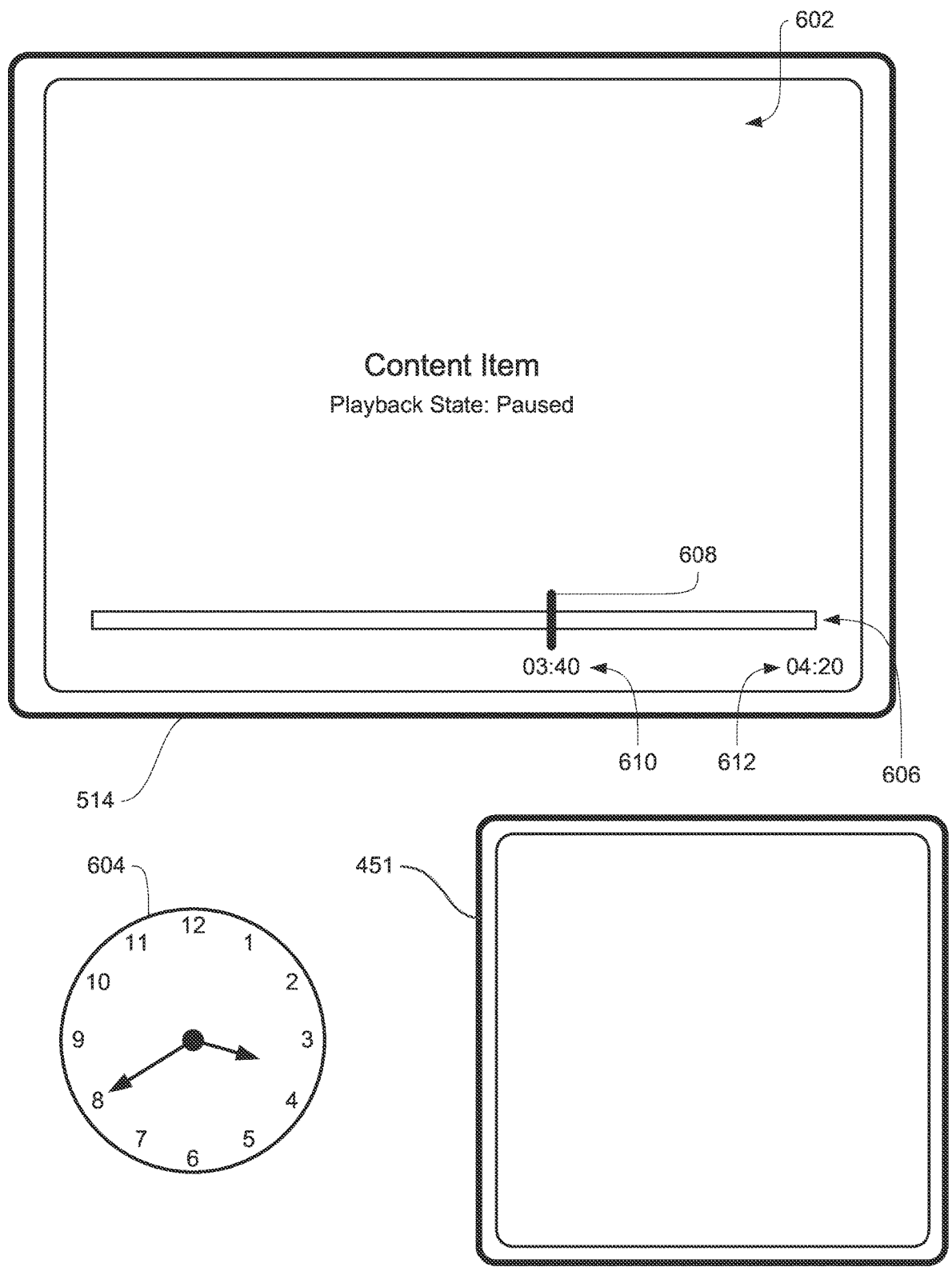
Figure 6T:
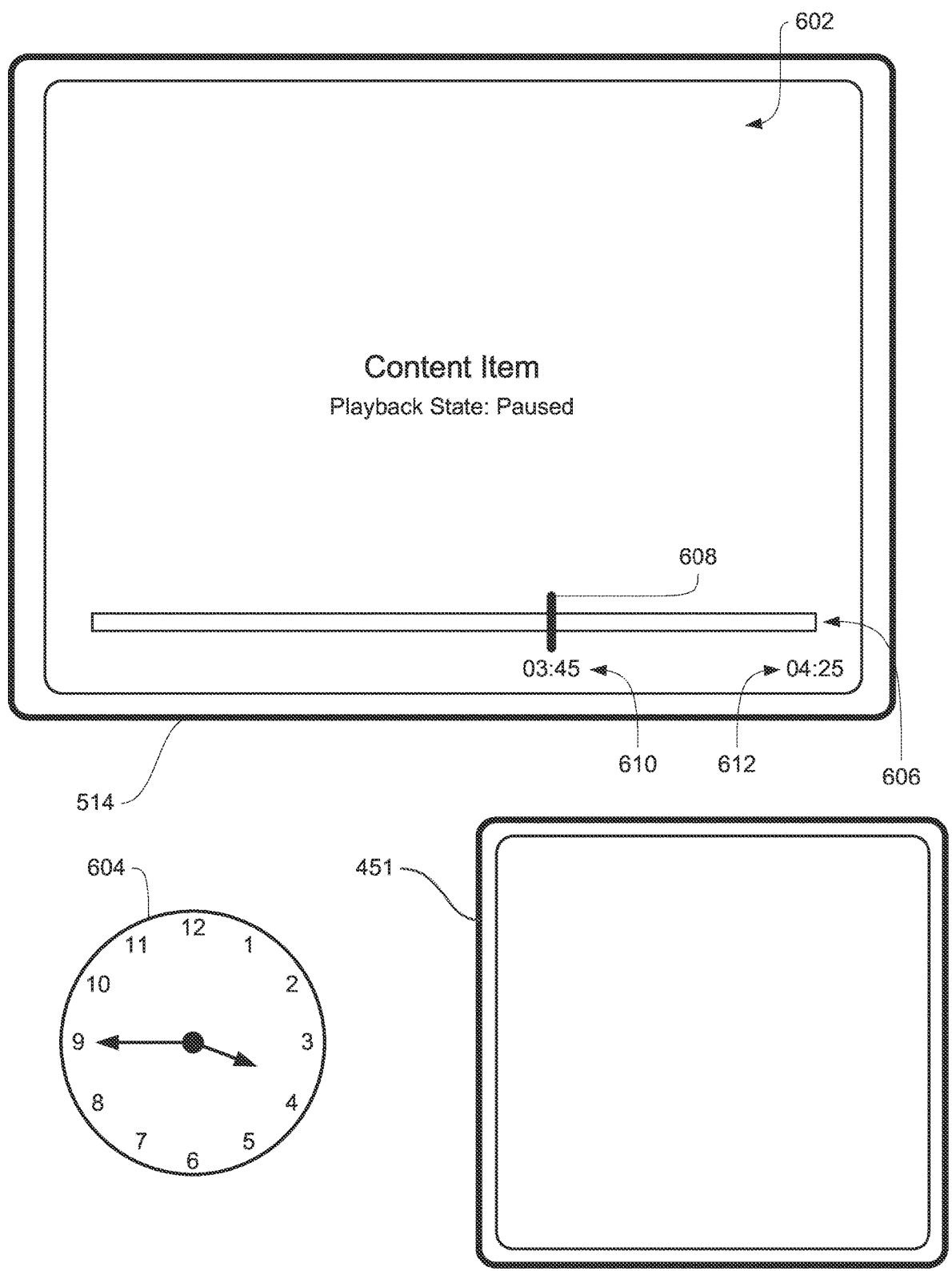
Figure 6U:
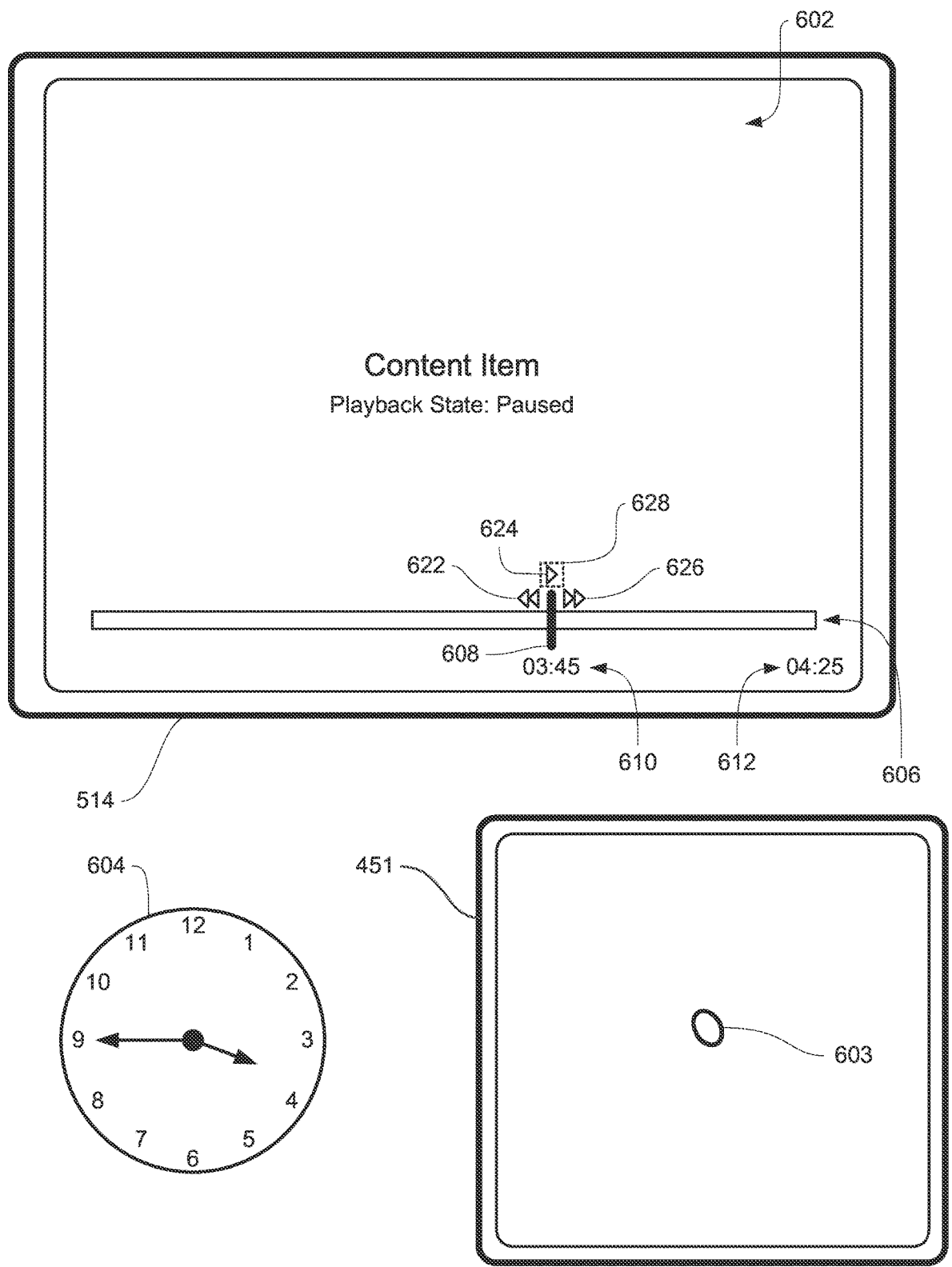
Figure 6V:
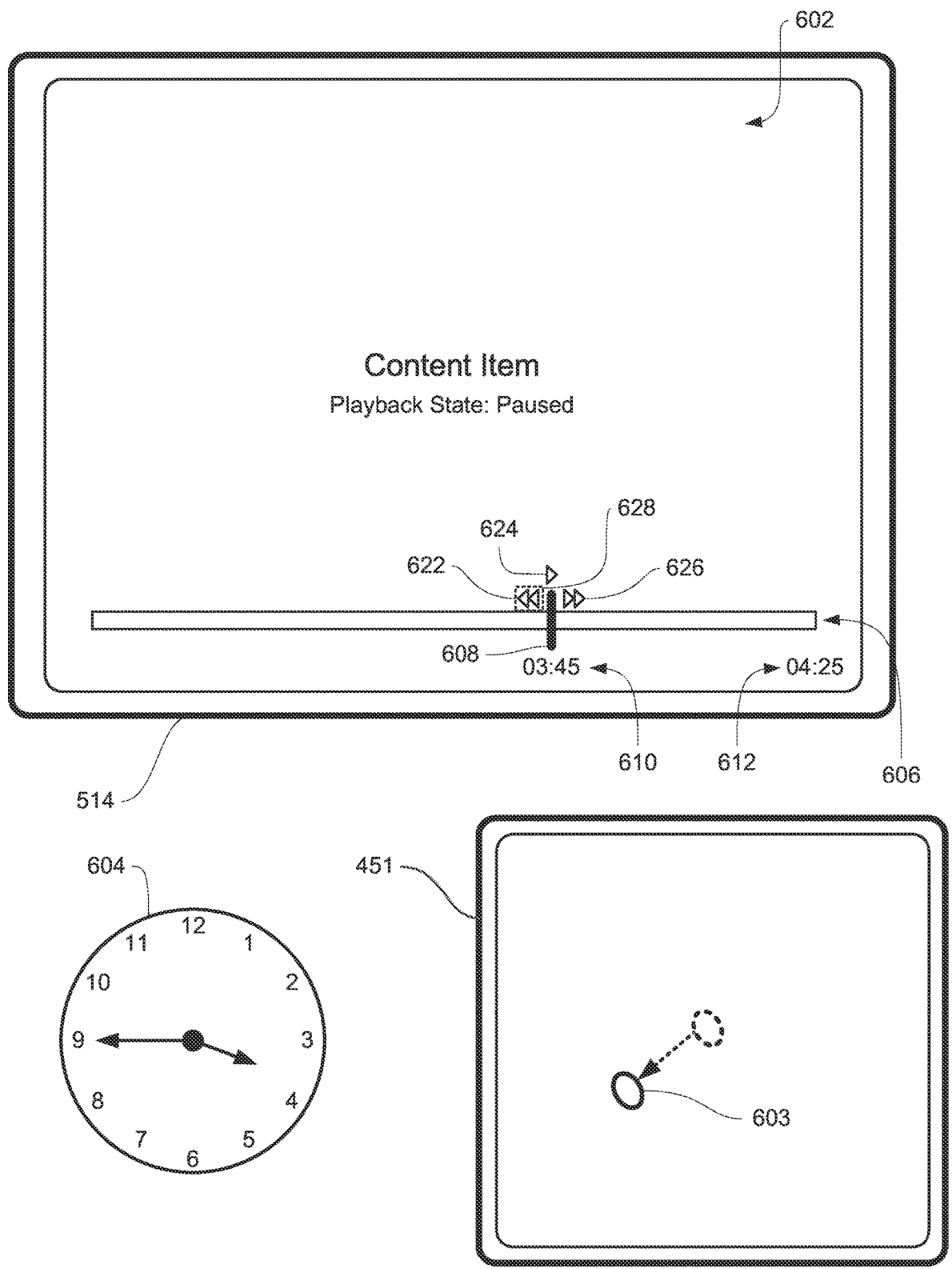
Figure 6W:
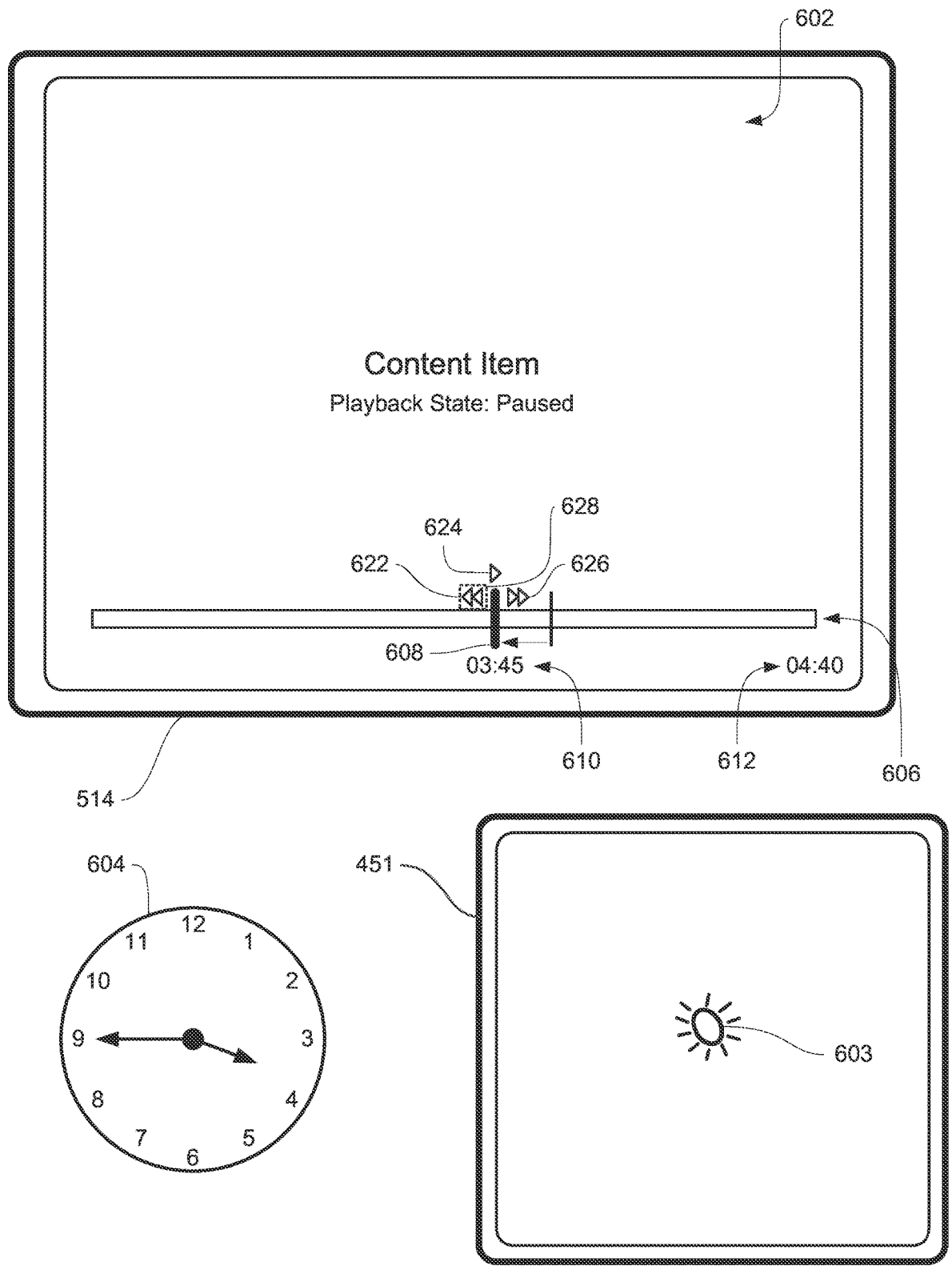
Figure 6X:
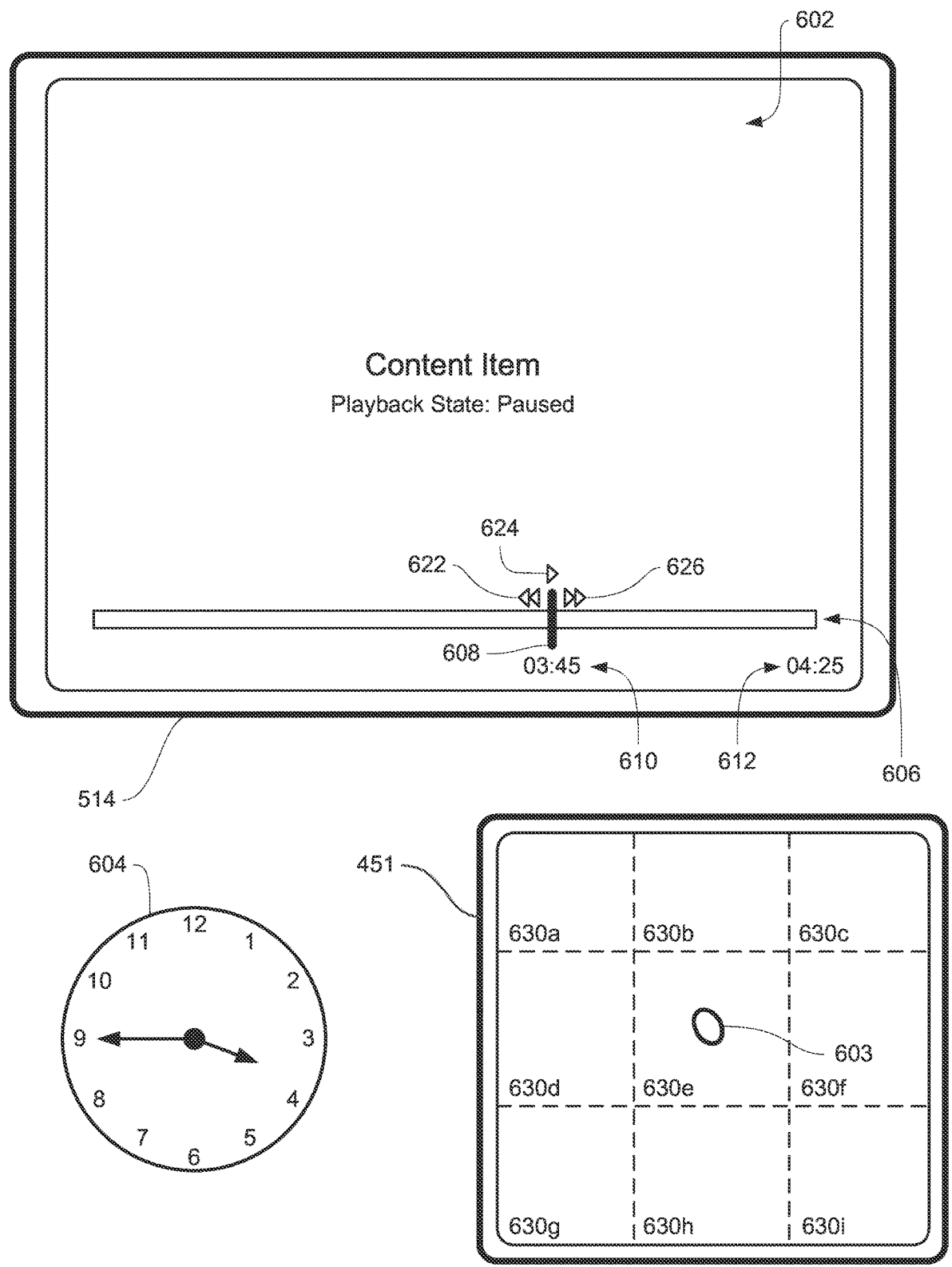
Figure 6Y:
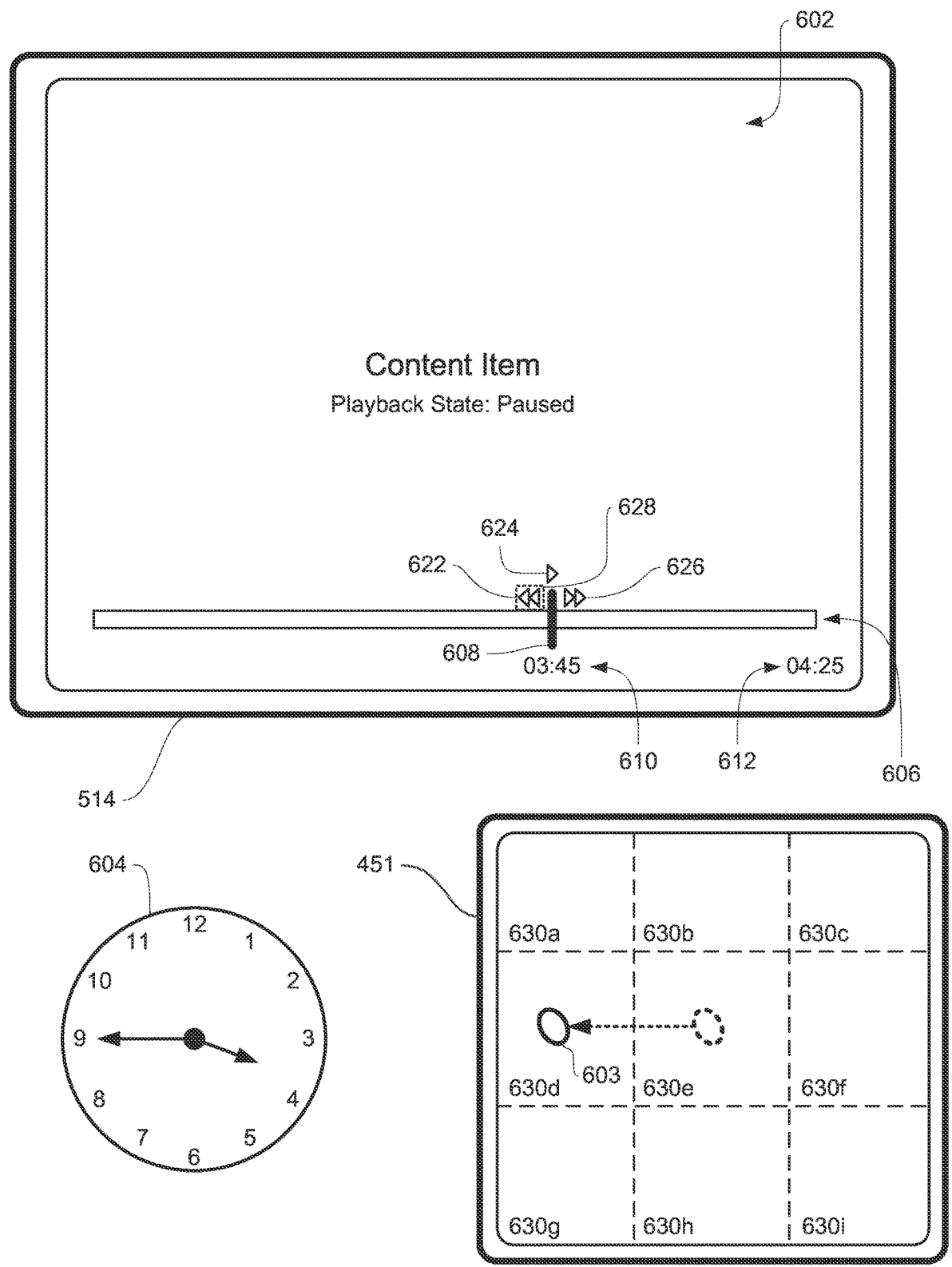
Figure 6Z:
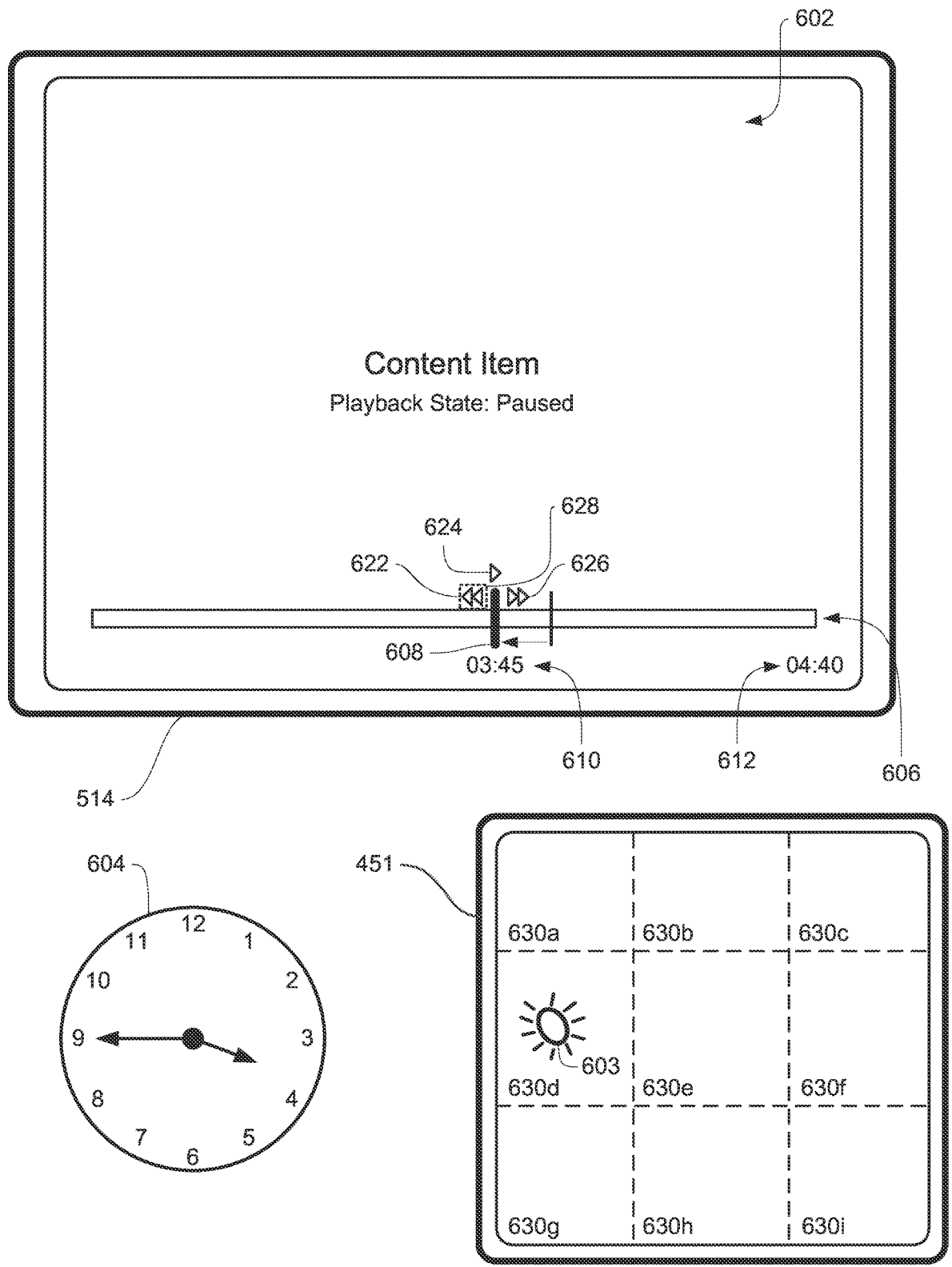
Figure 7A:
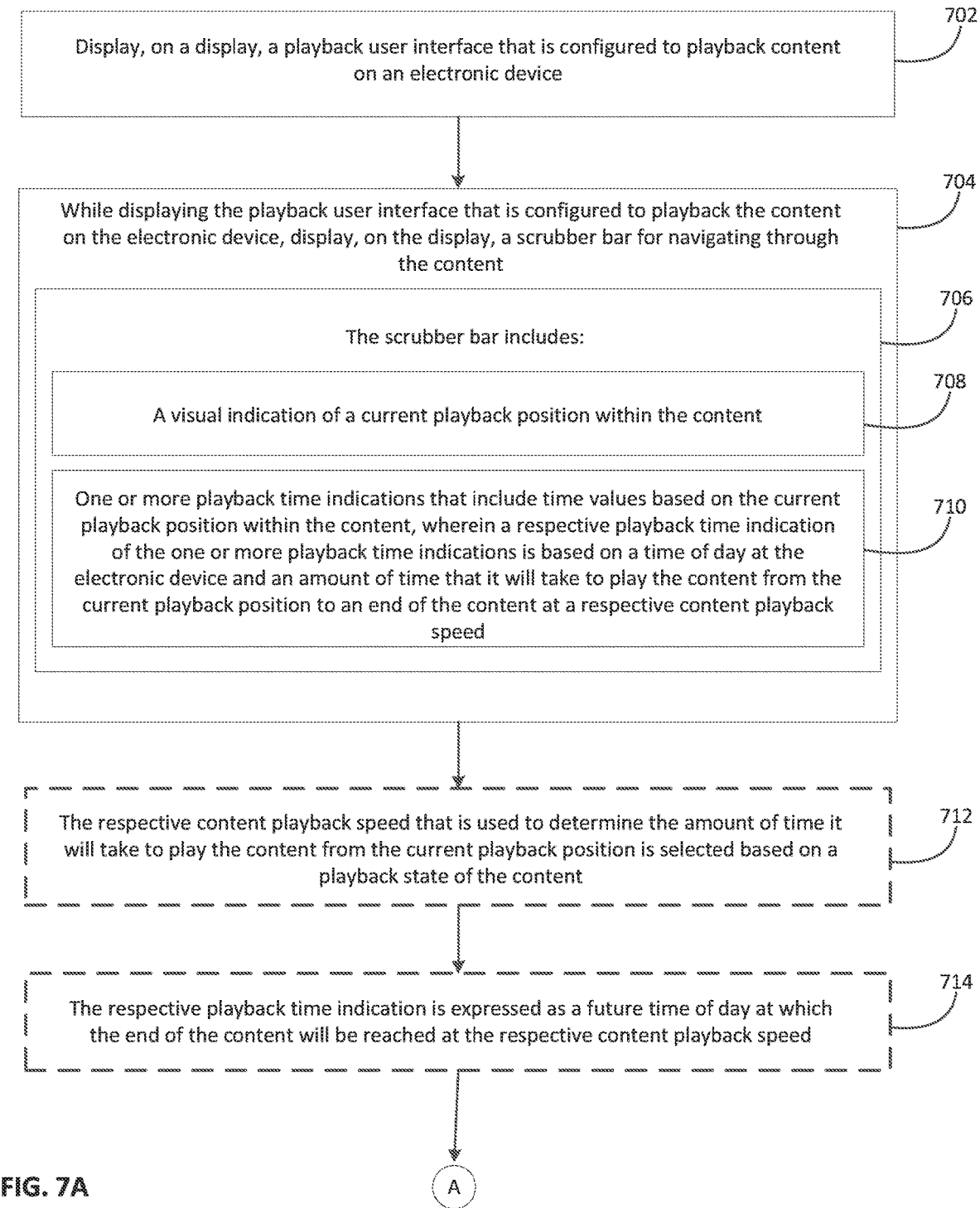
FIGS. 7A-7G are flow diagrams illustrating a method of presenting a scrubber bar with "real world" playback time indications in accordance with some embodiments of the disclosure.
Figure 7B:
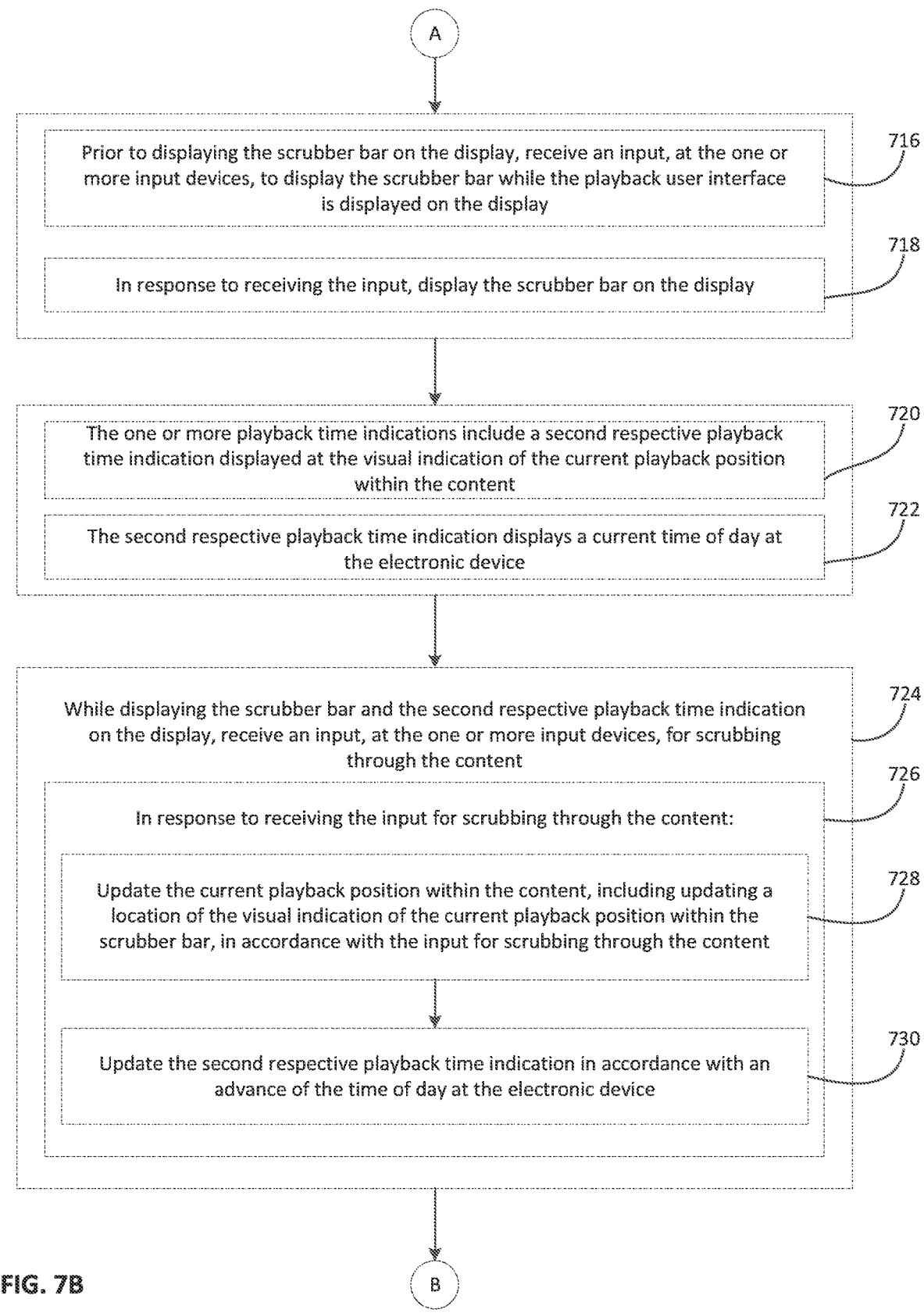
Figure 7C:
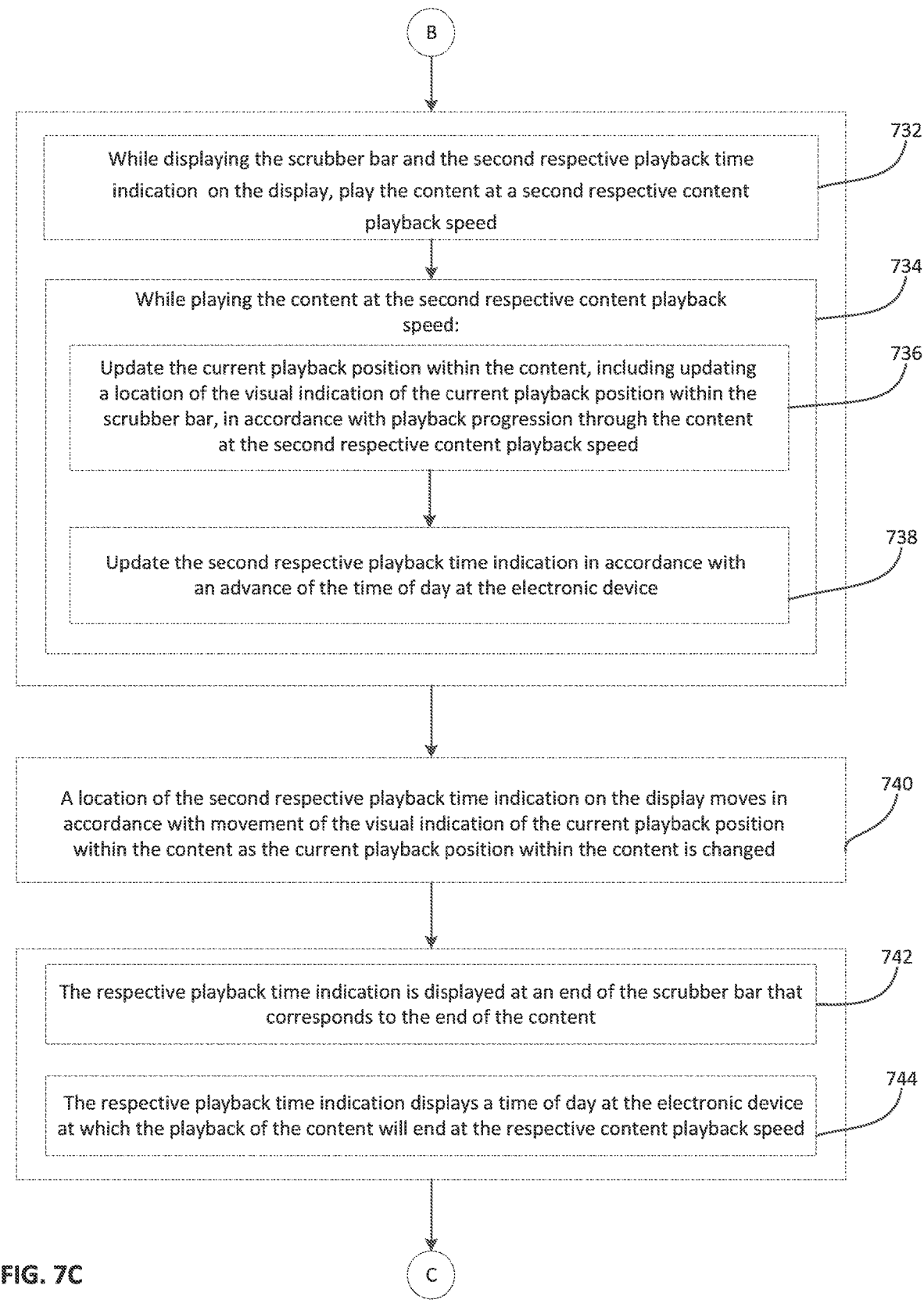
Figure 7D:
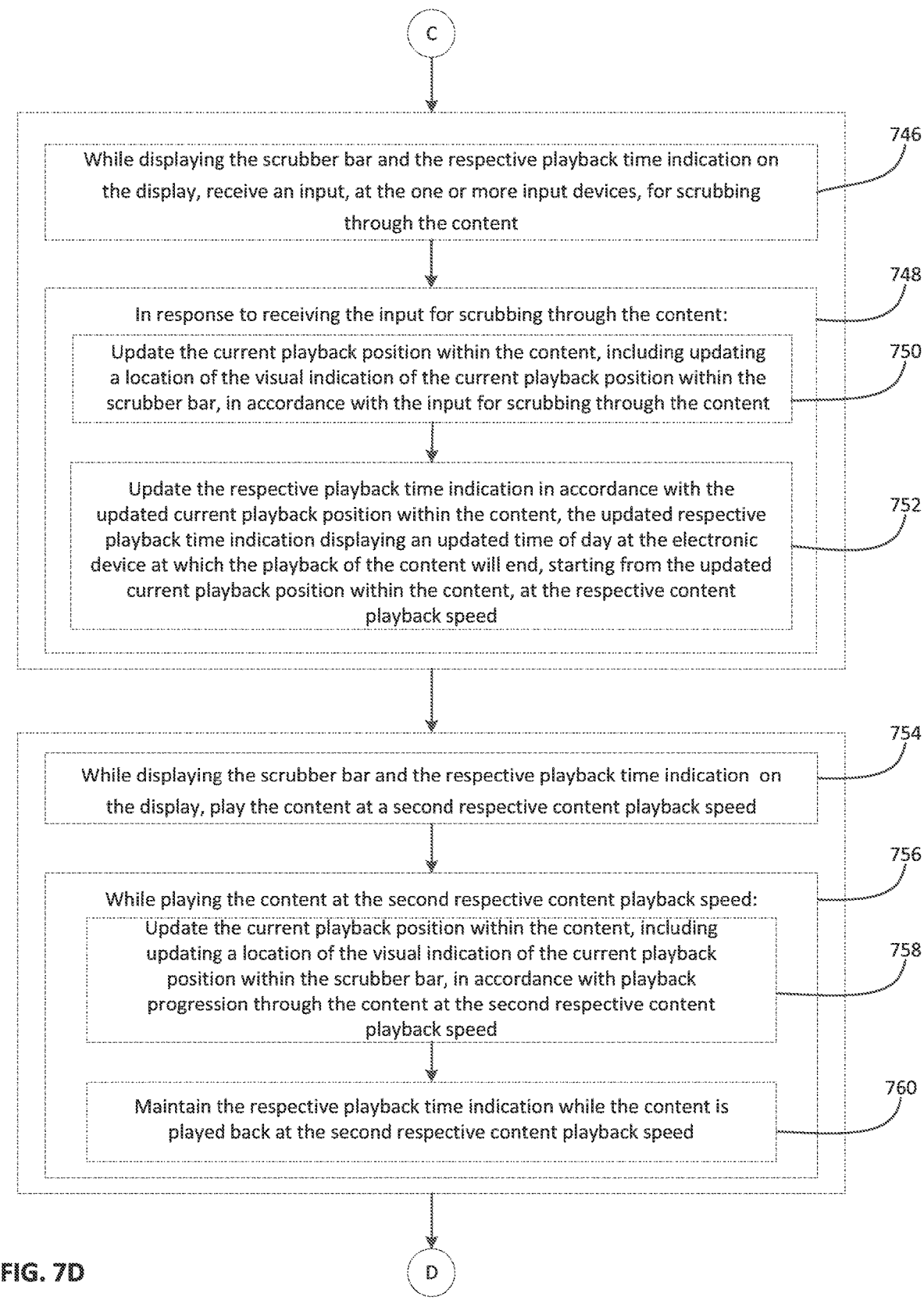
Figure 7E:
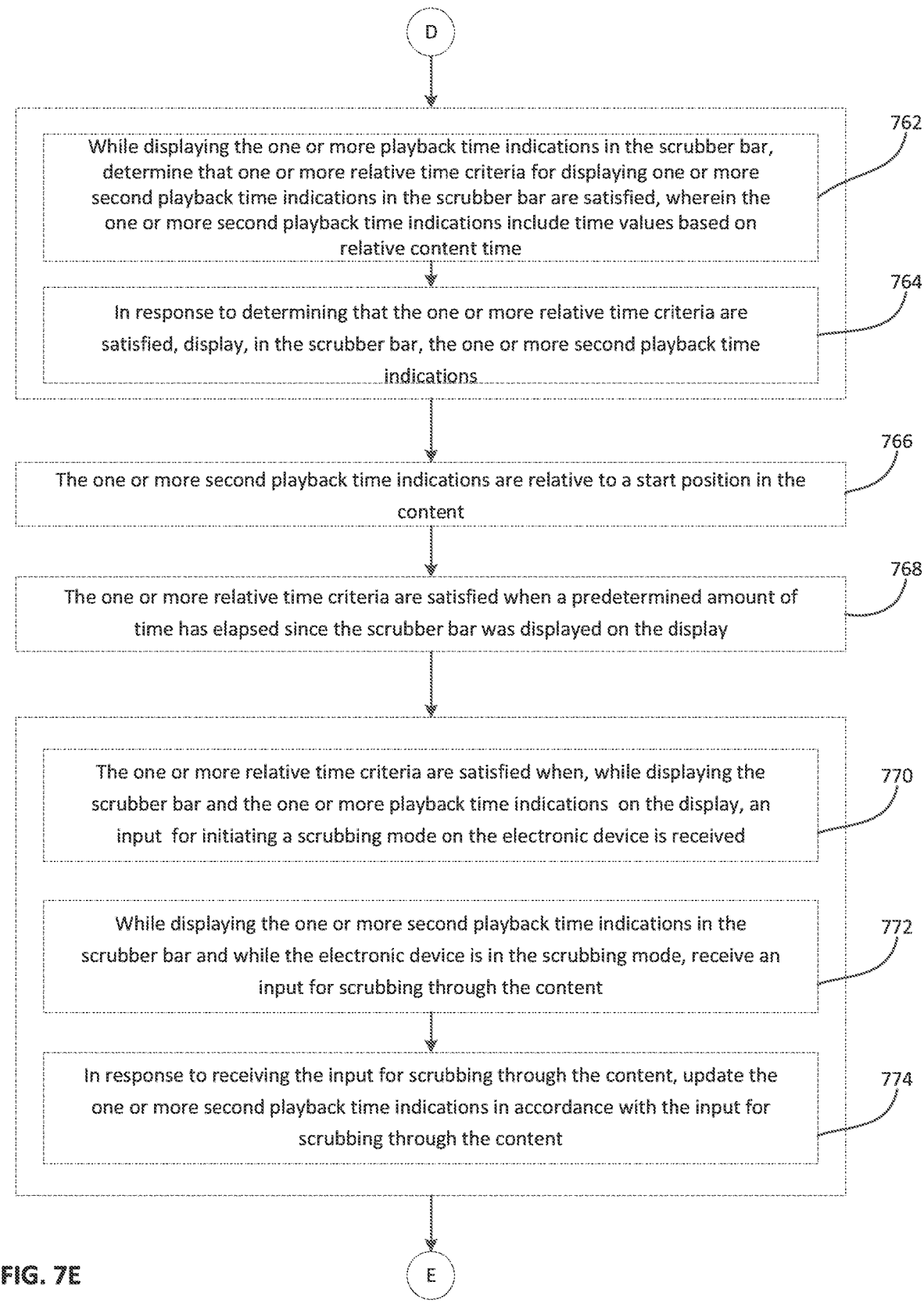
Figure 7F:
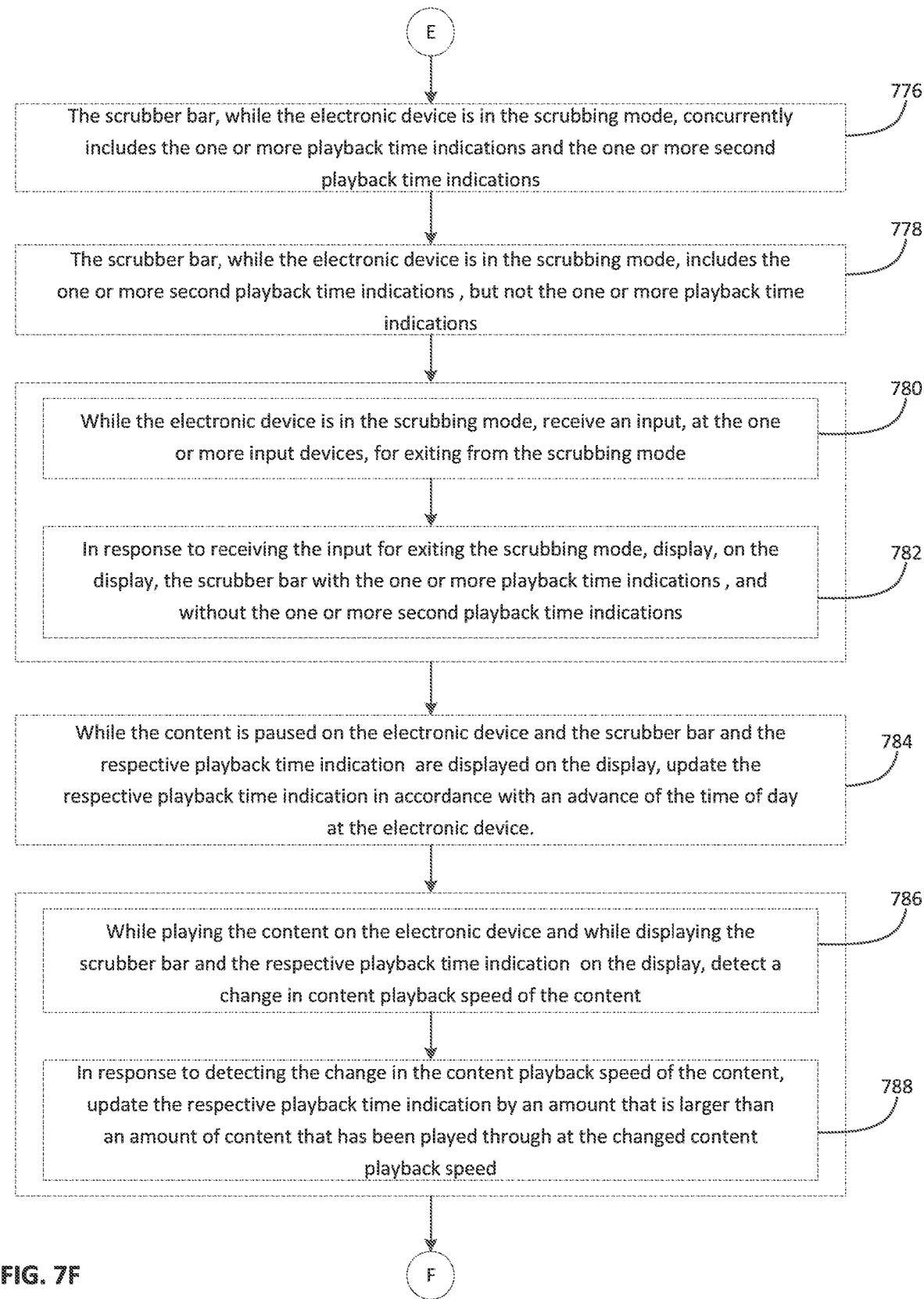
Figure 7G:
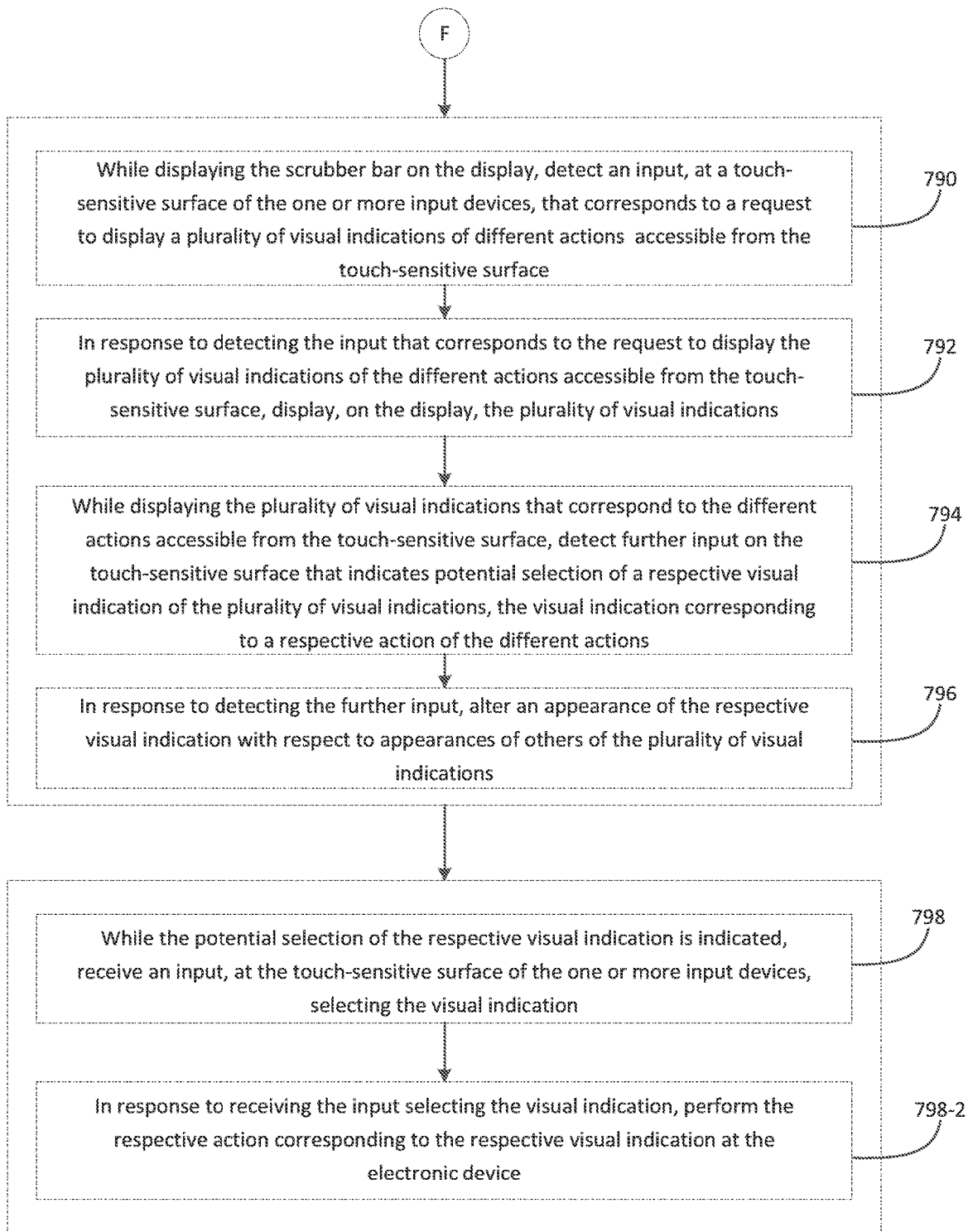

FIGS. 6A-6Z illustrate exemplary ways in which a scrubber bar is presented with "real world" playback time indications in accordance with some embodiments of the disclosure. The embodiments in these figures are used to illustrate the processes described below, including the processes described with reference to FIGS. 7A-7G.

It should be noted that the examples illustrated in FIGS. 6A-6Z are directed to electronic devices that display information on non-touch-sensitive displays, though it is understood that the electronic devices may instead display information on displays having touch-sensitive capability (e.g., touch screens). For example, the electronic devices may include touch screens, or the electronic devices may be capable of outputting display information for display on separate touch screens, as previously described in this disclosure—in such circumstances, the displays described below optionally correspond to the touch screens mentioned above, and the inputs described below are optionally detected on the touch screens.

FIG. 6A illustrates exemplary display 514. Display 514 optionally displays one or more user interfaces that include various content. In the example illustrated in FIG. 6A, display 514 displays a content playback application user interface 602 of a content playback application running on an electronic device (e.g., electronic device 500 of FIG. 5A) of which display 514 is a part, or to which display 514 is connected. The content playback user interface 602 is configured to playback one or more content items on the electronic device in various playback states (e.g., paused, rewinding, fast-forwarding, playing, etc.). In the example of FIG. 6A, the content playback user interface 602 is displaying a content item playing back at 1× playback speed.

Also illustrated in FIG. 6A is touch-sensitive surface 451 and clock 604. Touch-sensitive surface 451 is optionally a touch-sensitive surface on a second electronic device that is configured to control the electronic device, such as a remote control (e.g., remote 510 in FIGS. 5A-5B) or a multifunction device configured to control the electronic device (e.g., device 100 in FIG. 1A, 300 in FIG. 3 and/or 500 in FIG. 5A), though, as previously mentioned, touch-sensitive surface 451 is optionally combined with display 514 in circumstances in which display 514 is a touch screen (e.g., touch screen 112 in FIG. 2). Clock 604 optionally represents the "real world" time at the electronic device (e.g., the current time of day at the electronic device), and is not displayed by the electronic device. In FIG. 6A, the "real world" time at the electronic device is 3:30 pm.

FIG. 6B illustrates display of scrubber bar 606 on display 514. Specifically, contact 603 is detected on touch-sensitive surface 451. Contact 603 optionally corresponds to a tap (in some embodiments, a click) of a finger on touch-sensitive surface 451. In response to detecting contact 603 on touch-sensitive surface 451, the electronic device displays scrubber bar 606 overlaid on the content item on display 514. Scrubber bar 606 includes playhead 608, which is a visual indication of the current playback position within the content item. Scrubber bar 606 also includes one or more playback time indications that include time values based on the current playback position within the content item, and that are relative to the time of day at the electronic device (e.g., the "real world" time at the electronic device), rather than, for example, being relative to the start/end times of the content item, itself. Specifically, scrubber bar 606 includes playback time indication 610, which is displayed at playhead 608, and includes a time value that reflects the current time of day at the electronic device—3:30 pm, in the example of FIG. 6B—rather than a relative time with respect to the start/end times of the content item. Scrubber bar 606 also includes playback time indication 612, which is displayed at the right end of scrubber bar 606, and includes a time value that reflects the "real world" time at which playback of the content item will end at the current playback speed of 1×. In FIG. 6B, playback of the content item at 1× speed will optionally end in 80 minutes from the current time, and thus playback time indication 612 displays 4:50 pm (e.g., 80 minutes from the current time of 3:30 pm). In some circumstances, some scrubber bars display such playback time indications with time relative to the current playback position in the content item (e.g., playback time indication 612 might indicate 80 minutes rather than indicating 4:50 pm)—however, displaying playback time indication 612 as a "real world" time, as described with reference to FIG. 6B, quickly and easily indicates to the user at what time the content item will end, rather than requiring the user to make such a determination on their own enabling the user to more easily make plans around watching the content item (e.g., determining whether they have enough time to watch a content item before they have to leave or go to bed) which creates a more efficient human-machine interface and enables the user to use the device more quickly and efficiently.

Because the "real world" time at which the content item will end optionally depends on the playback speed of the content item, changes in the playback speed of the content item causes playback time indication 612 to change. FIG. 6C illustrates the playback speed of the content item changing from 1× speed (in FIG. 6B) to 2× speed (in FIG. 6C). Other changes in playback state are similarly contemplated (e.g., changing from 1× speed to 0.5× speed, changing from 1× speed to being paused, etc.). In response, playback time indication 612 is optionally updated. Specifically, in FIG. 6C, the time left in the content item at 2× playback speed is 40 minutes (e.g., 80 minutes at 1× speed, and 40 minutes at 2× speed). As such, playback of the content item will optionally end 40 minutes from the current time at the electronic device, which is 3:30 pm in FIG. 6C. Therefore, playback time indication 612 is updated to indicate 4:10 pm—the updated "real world" time at which playback of the content item will end at the current playback speed of 2×. As illustrated in FIG. 6C, in response to the change in playback speed from 1× to 2×, playback time indication 612 is changed by 40 minutes (e.g., moved back from 4:50 pm to 4:10 pm). This change in playback time indication 612 occurs immediately after the playback speed is changed, and is larger than the amount of time that has elapsed at the updated playback speed (e.g., less than one second).

As described above, in FIGS. 6B and 6C, the "real world" time value indicated by playback time indication 612 is based on the playback speed of the content item (e.g., 1× speed in FIG. 6B, and 2× speed in FIG. 6C). In some examples, the "real world" time value indicated by playback time indication 612 is based more generally on the playback state of the content item (e.g., different playback states are associated with their own manner—unique or not—of determining the time value indicated by playback time indication 612). For example, a 1× speed playback state causes playback time indication 612 to be determined assuming the content item will be played back at 1× speed from the current playback position, a 2× speed playback state causes playback time indication 612 to be determined assuming the content item will be played back at 2× speed from the current playback position, and a paused playback state causes playback time indication 612 to be determined assuming the content item will be played back at 1× speed from the current playback position despite the content item currently being paused, as illustrated in FIG. 6D. Specifically, in FIG. 6D, playback of the content item has been paused, and playback time indication 612 has been updated to indicate 4:50 pm as the "real world" time at which playback of the content item will end (e.g., the same as playback time indication 612 in FIG. 6B, and different from playback time indication 612 in FIG. 6C), because, as previously mentioned, 80 minutes of the content item remain at 1× playback speed, and in some embodiments, playback time indication 612 is determined assuming the content item will be played back at 1× playback speed when the content item is paused.

The behavior of playback time indications 610 and 612 during scrubbing operations will be described with reference to FIGS. 6E-6G. In FIG. 6E, the content item is being played at 1× speed, and the time of day at the electronic device is 3:30 pm. Scrubber bar 606 is displayed, playback time indication 610 displays 3:30 pm, and playback time indication 612 displays 4:50 pm, as described previously with reference to FIG. 6B.

In FIG. 6F, input for scrubbing backward through the content item is detected at touch-sensitive surface 451. For example, a swipe of contact 603 from right to left is detected on touch-sensitive surface 451, as illustrated in FIG. 6F. In response, the current playback position in the content item is moved backward in accordance with the detected swipe. As shown in FIG. 6F, playhead 608 is moved leftward in scrubber bar 606 in accordance with the swipe, and playback time indication 610 follows the movement of playhead 608 along scrubber bar 606. Playback time indication 610 is updated to move ahead in time to 3:31 pm, because, as indicated by clock 604, the time of day at the electronic device has advanced from 3:30 pm to 3:31 pm. Finally, playback time indication 612 is also updated to move ahead in time—in the example of FIG. 6F, from 4:50 pm to 5:06 pm—because the current playback position in the content item has been moved back (e.g., it will now take longer to reach the end of the content item at the playback speed of 1× that was in effect when the scrubbing was initiated). Specifically, the swipe detected on touch-sensitive surface 451 moves the current playback position in the content item back by 15 minutes. Thus, playback time indication 612 is updated to reflect the remaining playback time of 80 minutes+15 minutes from the current time at the electronic device; specifically, playback time indication 612 is updated to indicate 5:06 pm.

In FIG. 6G, input for scrubbing forward through the content item is detected at touch-sensitive surface 451. For example, a swipe of contact 603 from left to right is detected on touch-sensitive surface 451, as illustrated in FIG. 6G. In response, the current playback position in the content item is moved forward in accordance with the detected swipe. Additionally, playhead 608 is moved rightward in scrubber bar 606 in accordance with the swipe, and playback time indication 610 follows the movement of playhead 608 along scrubber bar 606. Playback time indication 610 is updated to move ahead in time to 3:34 pm, because, as indicated by clock 604, the time of day at the electronic device has advanced from 3:31 pm to 3:34 pm. Finally, playback time indication 612 is updated to move backward in time—in the example of FIG. 6G, from 5:06 pm to 4:39 pm—because the current playback position in the content item has been moved ahead in the content item (e.g., it will now take less time to reach the end of the content item at the playback speed of 1× that was in effect when the scrubbing was initiated). Specifically, the swipe detected on touch-sensitive surface 451 moves the current playback position in the content item ahead by 30 minutes. Thus, playback time indication 612 is updated to reflect the remaining playback time of 95 minutes–30 minutes from the current time at the electronic device; specifically, playback time indication 612 is updated to indicate 4:39 pm.

The behavior of playback time indications 610 and 612 during playback operations will be described with reference to FIGS. 6H-6I. In FIG. 6H, the electronic device has exited the scrubbing mode, and the content item is being played back at 1× speed. The time of day at the electronic device has advanced to 3:38 pm, as indicated by clock 604, and playback time indication 610 has been updated to indicate 3:38 pm. Playback time indication 612 continues, from FIG. 6G, to indicate 4:39 pm, because playback of the content item has not been interrupted since the circumstances of FIG. 6G. In other words, playback of the content item will still end at 4:39 based on the current playback position in the content item, and the amount of time it will take for playback of the content item to end (e.g., 61 minutes in FIG. 6H).

In FIG. 6I, playback of the content item has continued from FIG. 6H, uninterrupted, at 1× speed for 32 minutes. The time of day at the electronic device has, thus, advanced to 4:10 pm, and playback time indication 610 has been updated to indicate 4:10 pm. Playhead 608 has also moved ahead in scrubber bar 606 by 32 minutes with respect to FIG. 6H, and playback time indication 610 follows the movement of playhead 608 along scrubber bar 606. Playback time indication 612 continues, from FIG. 6H, to indicate 4:39 pm, because playback of the content item has not been interrupted since the circumstances of FIG. 6H. In other words, playback of the content item will still end at 4:39 based on the current playback position in the content item, and the amount of time it will take for playback of the content item to end (e.g., 29 minutes in FIG. 6H).

In some embodiments, scrubber bar 606 alternates between displaying time indications that are with respect to "real world" time, and time indications that are with respect to content or relative time. This will be illustrated with reference to FIGS. 6J-6K. In FIG. 6J, scrubber bar 606 is displayed in response to contact 603 detected on touch-sensitive surface 451, as described with reference to FIG. 6B. Scrubber bar 606 includes playback time indication 610 and playback time indication 612, which are with respect to "real world" time, as described with reference to FIG. 6B.

In some embodiments, scrubber bar 606 switches from displaying "real world" playback time indications 610 and 612 to displaying "relative time" playback time indications after a predetermined amount of time (e.g., 3, 5 or 10 seconds) has elapsed since scrubber bar 606 was displayed on display 514. In FIG. 6K, this predetermined amount of time has elapsed since FIG. 6J. Now, in FIG. 6K, scrubber bar 606 is displayed with playback time indication 616 at playhead 608, and playback time indication 618 at the right end of scrubber bar 606. Playback time indications 616 and 618 are "relative" playback time indications, relative to one or more positions in the content item. For example, playback time indication 616 indicates the current playback position in the content item with a time value that is with respect to the start of the content item (e.g., how far into the content item the current playback position is). In FIG. 6K, the current playback position is 30 minutes into the content item, and thus, playback time indication 616 indicates 30 minutes. Playback time indication 618 indicates the end of the content item with a time value that is with respect to the current playback position in the content item (e.g., how far the end of the content item is from the current playback position). In FIG. 6K, the end of the content item is 80 minutes from the current playback position at 1× playback speed, and thus, playback time indication 618 indicates 1 hour and 20 minutes (e.g., 80 minutes).

In some embodiments, rather than alternating between displaying time indications that are with respect to "real world" time and time indications that are with respect to content or relative time based on the passage of a predetermined amount of time, scrubber bar 606 switches from displaying "real world" playback time indications to relative time indications when a scrubbing mode is initiated at the electronic device. This will be illustrated with reference to FIGS. 6L-6Q. In FIG. 6L, while scrubber bar 606 is displayed, an input for initiating a scrubbing mode on the electronic device is received. This input is a click of touch-sensitive surface 451, illustrated by contact 603 in FIG. 6L. In response to the detected click of touch-sensitive surface 451, the electronic device enters the scrubbing mode, as illustrated in FIG. 6M. In the scrubbing mode, scrubber bar 606 is displayed with "relative" playback time indications 616 and 618, as described with reference to FIG. 6K, rather than the "real world" playback time indications of FIG. 6L. In some embodiments, scrubber bar 606 only includes "relative" playback time indications 616 and 618 while the electronic device is in the scrubbing mode, and does not include any "real world" playback time indications while the electronic device is in the scrubbing mode.

In FIG. 6N, a left to right swipe of contact 603 has been detected on touch-sensitive surface 451 while the electronic device is in the scrubbing mode. In response, the current playback position in the content has been moved ahead by 25 minutes (e.g., from 30 minutes in FIG. 6M to 55 minutes in FIG. 6N). As a result, playback time indication 616 (e.g., indicating a current playback time) has been updated from indicating 30 minutes to indicating 55 minutes, and playback time indication 618 has been updated from indicating 80 minutes of remaining playback time (e.g., 1 hour and 20 minutes) to indicating 55 minutes of remaining playback time.

In some embodiments, while the electronic device is in the scrubbing mode, scrubber bar 606 includes both one or more "real world" playback time indications and one or more "relative" playback time indications. For example, in FIG. 6O, scrubber bar 606 includes "real world" playback time indications 610 (at playhead 608) and 612 (at the right end of scrubber bar 606). The characteristics of playback time indications 610 and 612 are as described above with reference to FIGS. 6A-6I. Additionally, scrubber bar 606 is displayed with "relative" playback time indication 616 at playhead 608 (e.g., above playhead 608, whereas playback time indication 610 is displayed below playhead 608), which has characteristics as described with reference to FIGS. 6K and 6M-6N. Playback time indication 616 is displayed within an image (e.g., a thumbnail) from the content item at the current playback position in the content.

In FIG. 6P, a further left to right swipe of contact 603 has been detected on touch-sensitive surface 451 while the electronic device is in the scrubbing mode. As a result, playhead 608 has been moved forward in scrubber bar 606, and the current playback position with the content has advanced, in accordance with the detected swipe on touch-sensitive surface 451. Playback time indication 610 has been updated in accordance with the passage of time at the electronic device (e.g., from 3:32 pm in FIG. 6O to 3:35 pm in FIG. 6P, as described with reference FIGS. 6F-6I), playback time indication 612 has been updated in accordance with the change in the current playback position resulting from the scrubbing (e.g., as described with reference FIGS. 6F-6G), and playback time indication 616 has been updated in accordance with the change in the current playback position resulting from the scrubbing (e.g., as described with reference FIGS. 6M-6N). Further, as illustrated in FIG. 6P, playback time indication 616, and the image within which playback time indication 616 is displayed, has moved with playhead 608 along scrubber bar 606.

In FIG. 6Q, an input for exiting the scrubbing mode of the electronic device has been detected at touch-sensitive surface 451. For example, a click of touch-sensitive surface 451 is detected, as indicated by contact 603. In response, scrubber bar 606 is displayed with "real world" playback time indications 610 and 612, without displaying "relative" playback time indications 616 or 618.

The behavior of playback time indications 610 and 612 while the content item is paused will be described with reference to FIGS. 6R-6T. In FIG. 6R, the content item is paused, and scrubber bar 606 is displayed with "real world" playback time indications 610 and 612, the characteristics of which are as described above with reference to FIGS. 6A-6I. The time of day at the electronic device is 3:35 pm, as indicated by clock 604. As such, playback time indication 610 displays 3:35 pm. Further, 40 minutes remain in the content item if it were to be played at 1× speed from its current playback position. Therefore, playback time indication 612 indicates 4:15 pm, which is 40 minutes from the current time of day at the electronic device.

In FIG. 6S, the content item has remained paused since the circumstances in FIG. 6R. Because the content item continues to be paused, the current play position in the content item has not changed, and playhead 608 has not moved. However, playback time indication 610 has been updated in accordance with the passage of time at the electronic device from 3:35 pm to 3:40 pm, as indicated by clock 604. As such, playback time indication 610 has been updated to indicate 3:40 pm. Playback time indication 612 has also been updated in accordance with the passage of time at the electronic device, because time has passed at the electronic device while no progress has been made in progressing through the content item. Specifically, playback time indication 612 has been updated from indicating 4:15 pm in FIG. 6R to indicating 4:20 pm in FIG. 6S, because the content item is now determined to end at 4:20 pm if playback of the content item at 1× playback speed is initiated.

In FIG. 6T, the content item has continued to remain paused since the circumstances in FIGS. 6R-6S. The current play position in the content item has not changed, and playhead 608 has not moved. However, as above, playback time indication 610 has been updated in accordance with the passage of time at the electronic device from 3:40 pm to 3:45 pm, as indicated by clock 604. As such, playback time indication 610 has been updated to indicate 3:45 pm. Playback time indication 612 has also been updated in accordance with the passage of time at the electronic device. Specifically, playback time indication 612 has been updated from indicating 4:20 pm in FIG. 6S to indicating 4:25 pm in FIG. 6T. Thus, as shown in FIGS. 6R-6T, "real world" playback time indications 610 and 612 are updated even when the content item is paused, whereas "relative" playback time indications (e.g., time indications 616 and 618 in FIG. 6K) would not be updated when the content item is paused (e.g., because "relative" or "content" time is not changing when the content item is paused).

In some embodiments, scrubber bar 606 includes hints of different actions that are accessible from touch-sensitive surface 451 as a way to provide a user information about the identities of those actions, and/or information about how to access those actions. This will be described with reference to FIGS. 6U-6Z. In FIG. 6U, scrubber bar 606 is displayed on display 514. While scrubber bar 606 is displayed, an input requesting display of visual indications of the actions accessible from touch-sensitive surface 451 is detected. For example, contact 603, which corresponds to a finger detected on touch-sensitive surface 451, is detected with less movement than a movement threshold (e.g., 0.5 or 1 mm), and for longer than a time threshold (e.g., 0.5, 1 or 2 seconds). In response, visual indications 622, 624 and 626 are displayed on display 514—in the example of FIG. 6U, visual indications 622, 624 and 626 are displayed at (e.g., surrounding and above) playhead 608. Visual indications 622, 624 and 626 correspond to different actions accessible from touch-sensitive surface 451. For example, visual indication 622 corresponds to a reverse skip action (e.g., 15 second reverse skip), visual indication 624 corresponds to a play action (e.g., because the content item is currently paused—if the content item were currently playing, visual indication 624 would correspond to a pause action), and visual indication 626 corresponds to a forward skip action (e.g., 15 second forward skip). Additional or alternative actions accessible from touch-sensitive surface 451 are also within the scope of this disclosure, and would correspond to visual indications displayed on display 514.

In some embodiments, visual indications 622, 624 and 626 are selectable by navigating a current selection cursor (indicated by dashed box 628) to one of the visual indications using directional inputs detected on touch-sensitive surface 451, followed by a selection input detected on touch-sensitive surface 451 (e.g., a click of touch-sensitive surface 451). In FIG. 6U, current selection cursor 628 is on visual indication 624. When a visual indication has the current selection, its appearance is altered to be different from the appearances of the visual indications that do not have the current selection. For example, visual indication 624 is highlighted, while visual indications 622 and 626 are not highlighted. In FIG. 6V, a downward, leftward swipe is detected on touch-sensitive surface 451 (e.g., indicated by the movement of contact 603), which causes current selection cursor 628 to move to visual indication 622. In FIG. 6W, a click of touch-sensitive surface 451 is detected. As a result, the action corresponding to visual indication 622 (e.g., a rewind or reverse skip action) is performed at the electronic device, and the current playback position is skipped backward in the content item (e.g., by 15 minutes in FIG. 6W). Playhead 608 moves backward along scrubber bar 606 in accordance with the backward skip in the content item, and playback time indication 612 is updated to reflect the backward skip in the content item. Visual indications 622, 624 and 626 move with playhead 608 as it moves, as illustrated in FIG. 6W. In FIG. 6W, the current playback position in the content item has moved backward by 15 minutes in response to the selection of visual indication 622. As a result, playback time indication 612 has been updated to indicate 4:40 pm (as opposed to 4:25 pm in FIG. 6V). Others of visual indications 622, 624 and 626 are analogously selectable via directional and click inputs detected on touch-sensitive surface 451. In this way, actions accessible from touch-sensitive surface 451 are made known to, and selected by, the user of the electronic device.

In some embodiments, rather than being selectable as a result of navigating current selection cursor 628 to them, the actions accessible from touch-sensitive surface 451 are associated with and selectable from corresponding regions on touch-sensitive surface 451. This is illustrated in FIGS. 6X-6Z. In FIG. 6X, touch-sensitive surface 451 includes a plurality of predefined regions 630. One or more of the predefined regions 630 correspond to actions accessible from touch-sensitive surface 451, as will be described below. Scrubber bar 606 is displayed on display 514. While scrubber bar 606 is displayed, an input requesting display of visual indications of the actions accessible from touch-sensitive surface 451 is detected. For example, contact 603, which corresponds to a finger detected on touch-sensitive surface 451, is detected with less movement than a movement threshold (e.g., 0.5 or 1 mm), with less force than a force threshold (e.g., a tap and hold, not a click and hold), and for longer than a time threshold (e.g., 0.5, 1 or 2 seconds). In response, visual indications 622, 624 and 626 are displayed on display 514, as described with reference to FIG. 6U. In some embodiments, contact 603 must be detected in a particular region (e.g., region 630e) of touch-sensitive surface 451 to cause the display of visual indications 622, 624 and 626; otherwise, visual indications 622, 624 and 626 are not displayed.

In the examples of FIGS. 6X-6Z, the actions associated with visual indications 622, 624 and 626 are associated with corresponding regions on touch-sensitive surface 451, such that selection of a particular region on touch-sensitive surface 451 selects and causes performance of a particular action corresponding to that selected region on touch-sensitive surface. For example, looking at FIG. 6X, region 630d corresponds to visual indication 622, and consequently a reverse skip action; region 630b corresponds to visual indication 624, and consequently a play action (or, a pause action, if the content item were playing rather than paused); and region 630f corresponds to visual indication 626, and consequently a forward skip action. As such, selection (e.g., a click) of region 630d causes a backward skip through the content item, selection (e.g., a click) of region 630b causes the content item to start playing, and selection (e.g., a click) of region 630f causes a forward skip through the content item.

A contact detected in one of regions 630d, 630b and 630f causes the corresponding visual indication to be highlighted (e.g., have the current selection) to indicate to a user of the electronic device that selection (e.g., clicking) of the region that the user is touching will cause performance of the action corresponding to the highlighted visual indication, as illustrated in FIG. 6Y. Specifically, in FIG. 6Y, contact 603 has moved from region 630e to region 630d on touch-sensitive surface. As a result, visual indication 622 becomes highlighted (e.g., has the current selection), as indicated by dashed box 628. In FIG. 6Z, a click of touch-sensitive surface 451 has been detected while contact 603 is in region 630d. As a result, the current playback position has been moved backward in the content item, and scrubber bar 606 (and its associated elements, such as playhead 608, playback time indication 612, etc.) is updated as described with reference to FIG. 6W. Visual indications 624 and 626 are analogously highlighted and/or selected as a result of detection of contact 603 in regions 630b and 630f, respectively, and/or clicking of touch-sensitive surface 451.

In some embodiments, time passes while a scrubbing or other content navigation operation is being performed, and the relative time indicator is adjusted based both on the passage of time and the navigation through the content (e.g., the real world time advances by 1 minute and the user scrubs backward in the content by 30 minutes of content, resulting in an addition of 31 minutes to the estimated end time of playback of the content at a 1× playback rate; or the real world time advances by 5 minutes and the user scrubs forward by 30 minutes of content, resulting in reduction in 25 minutes to the estimated end time of playback of the content at a 1× playback rate). Similarly, adjustments in the estimated end time of playback of the content can be calculated based on a combination of a change in playback rate combined with navigation through the content and/or the passage of time. By taking into account the various factors that affect the end time of playback of the content and displaying an estimated end time for playback of the content, the device creates a more efficient human-machine interface by enabling the user to see the estimated end time for playback of the content and adjust their use of the device accordingly.

FIGS. 7A-7G are flow diagrams illustrating a method 700 of displaying a scrubber bar with one or more time indications that are relative to real world time at the electronic device in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of displaying a scrubber bar with one or more time indications that are relative to real world time at the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., a set-top box, a computer, such as device 100, device 300 or device 500 as described above with reference to FIGS. 1A-1B, 2-3 and 5A-5B) that is in communication with a display (e.g., a television, a computer monitor, such as display 514 in FIG. 6A) and one or more input devices (e.g., a remote control, a smartphone configured to control the electronic device, a wearable device configured to control the electronic device, etc., such as touch-sensitive surface 451 in FIG. 6A). In some embodiments, the method is performed at an electronic device that includes the display and/or the one or more input devices, such as an electronic device with a touch screen (e.g., a tablet computer, a smartphone, etc.), or an electronic device (e.g., a computer) that includes a display and is in communication with an input device, such as a mouse or a trackpad. In some embodiments, the electronic device displays (702), on the display, a playback user interface (e.g., a content player, such as a movie player) that is configured to playback content, such as in FIG. 6A (e.g., a movie, a television show, music, etc.) on the electronic device (e.g., while the content is playing, paused, fast-forwarding, rewinding, etc. in the playback user interface). In some embodiments, while displaying the playback user interface that is configured to playback the content on the electronic device, the electronic device displays (706), on the display, a scrubber bar for navigating through the content, such as in FIG. 6B.

In some embodiments, the scrubber bar includes (704) a visual indication (708) of a current playback position within the content (e.g., a user interface element that visually depicts the location of the current playback position in the content, such as a playhead or thumbnail that includes a preview of content at the location of the content that corresponds to the location of the playhead along the scrubber bar) and one or more playback time indications (710) that include time values based on the current playback position within the content, wherein a respective playback time indication of the one or more playback time indications is based on a time of day at the electronic device (e.g., the "real world time" at the electronic device; for example, if the current time at the electronic device is 8:30 pm, the respective playback time indication is determined based on 8:30 pm, rather than, for example, a relative time with respect to the start/end times of the content, itself) and an amount of time that it will take to play the content from the current playback position to an end of the content at a respective content playback speed (e.g., a current playback speed such as 1×, 2× if the content is being played back, or at a standard 1× playback speed if the content is paused, or optionally at a 1× playback speed without regard to whether the content is paused or playing back at any speed), such as in FIG. 6B. In this way, a user is able to easily and quickly determine the real world time at which playback of the content will end, contributing to a more efficient human-machine interface. In some embodiments, the respective playback time indication is displayed at the end of the scrubber bar corresponding to the end of the content, and displays the "real world time" at which playback of the content will end, such as in FIG. 6B (e.g., 8:45 pm, if the current time is 8:30 pm, and 15 minutes remain in the content). In this way, a user of the electronic device is easily able to determine the time of day at which playback of the content will end if the content is played back at the current playback speed (or a 1× playback speed), or if the content is paused, the time of day at which playback of the content will end if playback of the content is started at the current time.

In some embodiments, the respective content playback speed that is used to determine the amount of time it will take to play the content from the current playback position is selected (712) based on a playback state of the content, such as in FIGS. 6B-6D (e.g., a current playback speed such as 1× if the content is being played back at 1× speed, or 2× if the content is being played back at 2× speed, or 1× playback speed if the content is paused). This way, the electronic device indicates an accurate playback end time to the user, because the end time will change depending on the playback speed of the content, contributing to a more efficient human-machine interface. In some embodiments, the respective playback time indication is expressed (714) as a future time of day at which the end of the content will be reached at the respective content playback speed, such as in FIGS. 6B-6D (e.g., if the current time at the electronic device is 5 pm, and the end of the content will be reached at 6 pm at the respective content playback speed, the respective playback time indication optionally indicates 6 pm in the scrubber bar). In this way, a user is able to easily and quickly determine the real world time at which playback of the content will end, contributing to a more efficient human-machine interface. The respective playback time indication is optionally displayed at or near an end of the scrubber bar corresponding to the end of the content, such as in FIG. 6B.

In some embodiments, prior to displaying the scrubber bar on the display, the electronic device receives (716) an input, at the one or more input devices, to display the scrubber bar while the playback user interface is displayed on the display (e.g., a tap detected on a touch-sensitive surface of the one or more input devices, a click of the touch-sensitive surface, or a contact with intensity greater than an intensity threshold detected on the touch-sensitive surface, etc.). In some embodiments, in response to receiving the input, the electronic device displays (718) the scrubber bar on the display, such as in FIG. 6B.

In some embodiments, the one or more playback time indications include (720) a second respective playback time indication displayed at the visual indication of the current playback position within the content, such as in FIG. 6B. In some embodiments, the second respective playback time indication displays (722) a current time of day at the electronic device, such as in FIG. 6B (e.g., the current playback position indicator includes display of the current time at the electronic device). Thus, the user is able to quickly and easily determine the current time, and compare it with the future time at which playback of the content will end, contributing to a more efficient human-machine interface. In some embodiments, while displaying the scrubber bar and the second respective playback time indication (e.g., the indication of the current time of day at the electronic device displayed at the visual indication of the current playback position) on the display, the electronic device receives (724) an input, at the one or more input devices, for scrubbing through the content, such as in FIGS. 6F-6G (e.g., an input for moving forward or backward through the content, such as left or right swipes detected on a touch-sensitive surface of the one or more input devices). In some embodiments, in response (726) to receiving the input for scrubbing through the content: the electronic device updates (728) the current playback position within the content, including updating a location of the visual indication of the current playback position within the scrubber bar, in accordance with the input for scrubbing through the content (e.g., going forward or backward through the content based on the input detected) and updates (730) the second respective playback time indication in accordance with an advance of the time of day at the electronic device, such as in FIGS. 6F-6G (e.g., advancing the real world time displayed at the current playback position indicator in accordance with the passage of time at the electronic device, independent of the magnitude and the direction of the scrubbing). Thus, the user is able to quickly and easily determine the current time at the electronic device, and the electronic device maintains an accurate representation of the current time at the electronic device, contributing to a more efficient human-machine interface.

In some embodiments, while displaying the scrubber bar and the second respective playback time indication (e.g., the indication of the current time of day at the electronic device displayed at the visual indication of the current playback position) on the display, the electronic device plays (732) the content at a second respective content playback speed, such as in FIG. 6H (e.g., 1× speed, 2× speed, paused, etc., the same as, or different from, the respective content playback speed). In some embodiments, while playing (734) the content at the second respective content playback speed, the electronic device updates (736) the current playback position within the content, including updating a location of the visual indication of the current playback position within the scrubber bar, in accordance with playback progression through the content at the second respective content playback speed (e.g., going forward or backward through the content based on the playback speed of the content) and updates (738) the second respective playback time indication in accordance with an advance of the time of day at the electronic device, such as in FIGS. 6H-6I (e.g., advancing the real world time displayed at the current playback position indicator in accordance with the passage of time at the electronic device, independent of the playback and/or the playback speed of the content). Thus, the user is able to quickly and easily determine the current time at the electronic device, and the electronic device maintains an accurate representation of the current time at the electronic device, contributing to a more efficient human-machine interface.

In some embodiments, a location of the second respective playback time indication on the display moves (740) in accordance with movement of the visual indication of the current playback position within the content as the current playback position within the content is changed, such as in FIGS. 6F-6I (e.g., movement of the visual indication of the current playback position in response to scrubbing inputs, or playback of the content). The second respective playback time indication optionally stays with the visual indication of the current playback position within the content, such as in FIGS. 6F-6I. In some embodiments, the respective playback time indication (e.g., the indication that displays the "real world time" at which playback of the content will end) is displayed (742) at an end of the scrubber bar that corresponds to the end of the content, such as in FIG. 6B. Thus, the user is able to quickly and easily correlate the respective playback time indication with the end of playback of the content, contributing to a more efficient human-machine interface. In some embodiments, the respective playback time indication displays (744) a time of day at the electronic device at which the playback of the content will end at the respective content playback speed, such as in FIG. 6B (e.g., the respective playback time indication is displayed at the far right end of the scrubber bar).

In some embodiments, while displaying the scrubber bar and the respective playback time indication (e.g., the indication that displays the "real world time" at which playback of the content will end) on the display, the electronic device receives (746) an input, at the one or more input devices, for scrubbing through the content, such as in FIGS. 6F-6G (e.g., an input for moving forward or backward through the content, such as left or right swipes detected on a touch-sensitive surface of the one or more input devices). In some embodiments, in response to receiving (748) the input for scrubbing through the content, the electronic device updates (750) the current playback position within the content, including updating a location of the visual indication of the current playback position within the scrubber bar, in accordance with the input for scrubbing through the content (e.g., going forward or backward through the content based on the input detected) and updates (752) the respective playback time indication in accordance with the updated current playback position within the content, the updated respective playback time indication displaying an updated time of day at the electronic device at which the playback of the content will end, starting from the updated current playback position within the content, at the respective content playback speed, such as in FIGS. 6F-6G (e.g., updating the time of day at which playback of the content will end if started from the new position in the content resulting from the scrubbing). Thus, the user is able to quickly and easily see the effect of various playback state changes, including changing of the current playback position, on the time at which the playback of the content will end, creating a more efficient human-machine interface. If the scrubbing is backward through the content, the respective playback time indication optionally moves forward in time, such as in FIG. 6F (e.g., the playback of the content will end at a later time of day because of moving the current playback position backward through the content). If the scrubbing is forward through the content, the respective playback time indication optionally moves backward in time, such as in FIG. 6G (e.g., the playback of the content will end at an earlier time of day because of moving the current playback position forward through the content).

In some embodiments, while displaying the scrubber bar and the respective playback time indication (e.g., the indication that displays the "real world time" at which playback of the content will end) on the display, the electronic device plays (754) the content at a second respective content playback speed, such as in FIGS. 6H-6I (e.g., 1× speed, 2× speed, paused, etc., the same as, or different from, the respective content playback speed). In some embodiments, while playing (756) the content at the second respective content playback speed, the electronic device updates (758) the current playback position within the content, including updating a location of the visual indication of the current playback position within the scrubber bar, in accordance with playback progression through the content at the second respective content playback speed (e.g., going forward or backward through the content based on the playback speed of the content) and maintains (760) the respective playback time indication while the content is played back at the second respective content playback speed, such as in FIGS. 6H-6I (e.g., the respective playback time indication optionally does not change as long as the playback of the content continues at the respective content playback speed, because the time at which playback of the content will end, which the respective playback time indication reflects, optionally does not change). If playback of the content is interrupted in some way (e.g., paused, change of speed, etc.), the respective playback time indication is optionally updated to reflect the updated time of day at which the playback of the content will end in light of the interrupted playback of the content, such as in FIG. 6C. Thus, the user is able to quickly and easily determine the time at which the playback of the content will end, contributing to a more efficient human-machine interface.

In some embodiments, while displaying the one or more playback time indications in the scrubber bar, the electronic device determines (762) that one or more relative time criteria for displaying one or more second playback time indications in the scrubber bar are satisfied, wherein the one or more second playback time indications include time values based on relative content time, such as in FIGS. 6J-6K (e.g., a relative time with respect to the start/end times of the content, rather than, for example, the "real world" time at the electronic device). In some embodiments, in response to determining that the one or more relative time criteria are satisfied, the electronic device displays (764), in the scrubber bar, the one or more second playback time indications, such as in FIG. 6K (e.g., time indications displayed at the visual indication of the current playback position and/or the end of the scrubber bar corresponding to time values associated with the current playback position in the content and the end of the content, respectively). One second playback time indication is optionally displayed at the visual indication of the current playback position in the content, and displays the time that has elapsed in the content from the start of the content to the current playback position in the content, such as in FIG. 6K. Another second playback time indication is optionally displayed at the far right end of the scrubber bar, and displays the time remaining from the current playback position in the content to the end of the content, such as in FIG. 6K.

In some embodiments, the one or more second playback time indications (766) are relative to a start position in the content (e.g., the current play position shows how far in content time the current play position is from the start of the content, and the end position shows how far in content time the end of the content is from the current play position in the content (e.g., how much time is left in the content)). In some embodiments, the one or more relative time criteria are satisfied (768) when a predetermined amount of time (e.g., 3, 5 or 10 seconds) has elapsed since the scrubber bar was displayed on the display, such as in FIGS. 6J-6K (e.g., the electronic device alternates between displaying real-world time and relative time in the scrubber bar). In some embodiments, after another predetermined amount of time (e.g., 3, 5 or 10 seconds) has elapsed since the display of the "relative time" second playback time indications, the electronic device optionally redisplays the "real world time" playback indications in the scrubber bar.

In some embodiments, the one or more relative time criteria are satisfied (770) when, while displaying the scrubber bar and the one or more playback time indications (e.g., the "real world time" indications) on the display, an input (e.g., a click or tap of a touch-sensitive surface of the one or more input devices) for initiating a scrubbing mode on the electronic device is received, such as in FIG. 6L (e.g. the electronic device switches from displaying the scrubber bar with "real world" playback time indications to displaying the scrubber bar with "relative time" time indications when the electronic device enters the scrubbing mode). In some embodiments, while displaying the one or more second playback time indications (e.g., the "relative time" indications) in the scrubber bar and while the electronic device is in the scrubbing mode, the electronic device receives (772) an input for scrubbing through the content, such as in FIGS. 6N-6O (e.g., an input for moving forward or backward through the content, such as left or right swipes detected on the touch-sensitive surface of the one or more input devices). In some embodiments, in response to receiving the input for scrubbing through the content, the electronic device updates (774) the one or more second playback time indications in accordance with the input for scrubbing through the content, such as in FIGS. 6N-6O (e.g., updating the current position and end position relative times in the scrubber bar based on the new position in the content resulting from the scrubbing). If the scrubbing is backward through the content, the current position time indication optionally gets smaller (e.g., indicating the current position is now at an earlier time in the content), and the end position time indication optionally gets larger (e.g., indicating the end of the content is now a larger amount of time away from the current position in the content). Analogously, if the scrubbing is forward through the content, the current position time indication optionally gets larger, and the end position time indication optionally gets smaller, such as in FIG. 6N.

In some embodiments, the scrubber bar, while the electronic device is in the scrubbing mode, concurrently includes (776) the one or more playback time indications (e.g., "real world" playback time indications at the current play position and the end position in the content) and the one or more second playback time indications, such as in FIG. 6O (e.g., a relative "content time" indication displayed at the current scrub position and indicating the relative content time at the current scrub position in the content, optionally displayed in an image from the content at the current scrub position in the content). In some embodiments, the scrubber bar, while the electronic device is in the scrubbing mode, includes (778) the one or more second playback time indications (e.g., "relative time" time indications at the current play position and the end position in the content), but not the one or more playback time indications (e.g., "real world" playback time indications), such as in FIG. 6N. Thus, in some embodiments, the scrubber bar is displayed with only "relative time" time indications while scrubbing, so that a user can quickly and easily determine various relative time quantities within the content (e.g., how far the current play position is from the start of the content), which are optionally of most interest to the user while scrubbing through the content to locate a given position in the content, creating a more efficient human-machine interface.

In some embodiments, while the electronic device is in the scrubbing mode, the electronic device receives (780) an input, at the one or more input devices, for exiting from the scrubbing mode, such as in FIG. 6Q (e.g., a click or tap of a touch-sensitive surface of the one or more input devices). In some embodiments, in response to receiving the input for exiting the scrubbing mode, the electronic device displays (782), on the display, the scrubber bar with the one or more playback time indications (e.g., "real world" playback time indications at the current play position and the end position in the content), and without the one or more second playback time indications (e.g., "relative time" time indications), such as in FIG. 6Q. In some embodiments, after exiting the scrubbing mode, the electronic device reverts back to displaying the scrubber bar with the "real world" playback time indications, and not the "relative time" time indications, such as in FIG. 6Q. Thus, the user can, again, quickly and easily determine the time at which the playback of the content will end, contributing to a more efficient human-machine interface.

In some embodiments, while the content is paused on the electronic device and the scrubber bar and the respective playback time indication (e.g., the indication that displays the "real world time" at which playback of the content will end) are displayed on the display, the electronic device updates (784) the respective playback time indication in accordance with an advance of the time of day at the electronic device, such as in FIGS. 6R-6T (e.g., update the current play position time indication and/or the end position time indication, despite the content being paused, because the current play position and/or end position indications are with respect to real world time, which advances even when the content is paused, rather than being with respect to relative content time, which does not advance when the content is paused). Thus, the electronic device maintains the accuracy of the time at which the playback of the content will end, contributing to a more efficient human-machine interface.

In some embodiments, while playing the content on the electronic device (e.g., at 1× speed, 2× speed, etc.) and while displaying the scrubber bar and the respective playback time indication (e.g., the indication that displays the "real world time" at which playback of the content will end) on the display, the electronic device detects (786) a change in content playback speed of the content, such as in FIG. 6C (e.g., a decrease in playback speed, an increase in playback speed, resulting from an input detected at the one or more input devices). In some embodiments, in response to detecting the change in the content playback speed of the content, the electronic device updates (788) the respective playback time indication by an amount that is larger than an amount of content that has been played through at the changed content playback speed, such as in FIG. 6C (e.g., if the playback speed changes from 1× to 2×, and the respective playback time indication showed 6 pm—e.g., 60 minutes from the current time—before the change in the playback speed, the respective playback time indication is optionally updated to show 5:30 pm—reduced by 30 minutes—which is larger than the amount of content that has been played through at the changed content playback speed—optionally on the order of seconds). Thus, the electronic device maintains the accuracy of the time at which the playback of the content will end, contributing to a more efficient human-machine interface.

In some embodiments, while displaying the scrubber bar on the display, the electronic device detects (790) an input, at a touch-sensitive surface of the one or more input devices (e.g., a touch-sensitive surface of a remote control, separate from the electronic device and the display), that corresponds to a request to display a plurality of visual indications of different actions (e.g., rewind the content, skip backward in the content by a predetermined amount such as 10, 20 or 30 seconds, fast-forward through the content, skip forward in the content by a predetermined amount such as 10, 20 or 30 seconds, pause the content if the content is playing, play the content if the content is paused, etc.) accessible from the touch-sensitive surface, such as in FIG. 6U (e.g., a resting finger detected on the touch-sensitive surface of the one or more input devices with less movement than a movement threshold, and for longer than a time threshold). In some embodiments, in response to detecting the input that corresponds to the request to display the plurality of visual indications of the different actions accessible from the touch-sensitive surface, the electronic device displays (792), on the display (e.g., in the scrubber bar; in some embodiments, at the visual indication of the current playback position in the content) the plurality of visual indications, such as in FIG. 6U. In this way, the user is able to quickly and easily determine the actions accessible from the touch-sensitive surface, contributing to a more efficient human-machine interface. In some embodiments, the different actions are associated with corresponding regions on the touch-sensitive surface, such that selection of a particular region on the touch-sensitive surface selects and causes performance of a particular action corresponding to that selected region on the touch-sensitive surface, such as in FIG. 6X.

In some embodiments, the plurality of visual indications are navigable using directional inputs detected on the touch-sensitive surface (e.g., inputs that move a current selection from one visual indication to another), and when a selection input is detected at the touch-sensitive surface when a particular visual indication is currently selected (e.g., independent of any region of the touch-sensitive surface in which the selection input is detected), the particular action corresponding to that selected visual indication is performed by the electronic device, such as in FIG. 6U. In some embodiments, while displaying the plurality of visual indications that correspond to the different actions accessible from the touch-sensitive surface, the electronic device detects (794) further input on the touch-sensitive surface that indicates potential selection of a respective visual indication of the plurality of visual indications, the visual indication corresponding to a respective action of the different actions (e.g., detecting a finger in a region of the touch-sensitive surface that corresponds to the respective visual indication and/or the respective action, or detecting a navigational input at the touch-sensitive surface, such as up/down/left/right swipes, that moves a current selection to the respective visual indication). In some embodiments, in response to detecting the further input, the electronic device alters (796) an appearance of the respective visual indication with respect to appearances of others of the plurality of visual indications, such as in FIGS. 6U-6V and 6Y (e.g., highlighting the visual indication that is currently selected to indicate to the user that a selection input at the touch-sensitive surface will cause performance of the respective action corresponding to the respective visual indication). The other visual indications are optionally not highlighted or otherwise displayed differently than the currently-selected visual indication, such as in FIGS. 6U-6V and 6Y (e.g., the other visual indications are all displayed without highlighting, whereas the currently-selected visual indication is displayed with highlighting). In this way, the user is able to quickly and easily determine the action that is currently-selected from the touch-sensitive surface (e.g., the action that will be performed in response to a selection input detected on the touch-sensitive surface), contributing to a more efficient human-machine interface.

In some embodiments, while the potential selection of the respective visual indication is indicated (e.g., while the finger is in the region of the touch-sensitive surface that corresponds to the respective visual indication and/or the respective action, or while the respective visual indication has the current selection), the electronic device receives (798) an input, at the touch-sensitive surface of the one or more input devices, selecting the visual indication, such as in FIGS. 6W and 6Z (e.g., a click of the touch-sensitive surface while the user's finger is in the region of the touch-sensitive surface corresponding to the respective visual indication, or a click of the touch-sensitive surface (e.g., anywhere on the touch-sensitive surface) while the respective visual indication has the current selection). In some embodiments, in response to receiving the input selecting the visual indication, the electronic device performs (798-2) the respective action corresponding to the respective visual indication at the electronic device, such as in FIGS. 6W and 6Z.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, the operations in the information processing methods described above are, optionally, implemented by running one or more functional modules in an information processing apparatus such as general purpose processors (e.g., as described with respect to FIGS. 1A, 3, 5A and 8) or application specific chips. Further, the operations described above with reference to FIGS. 7A-7G are, optionally, implemented by components depicted in FIGS. 1A-1B. For example, displaying operations 702, 704 and 718, and receiving operation 716 are, optionally, implemented by event sorter 170, event recognizer 180, and event handler 190. Event monitor 171 in event sorter 170 detects a contact on touch-sensitive surface 451, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8:
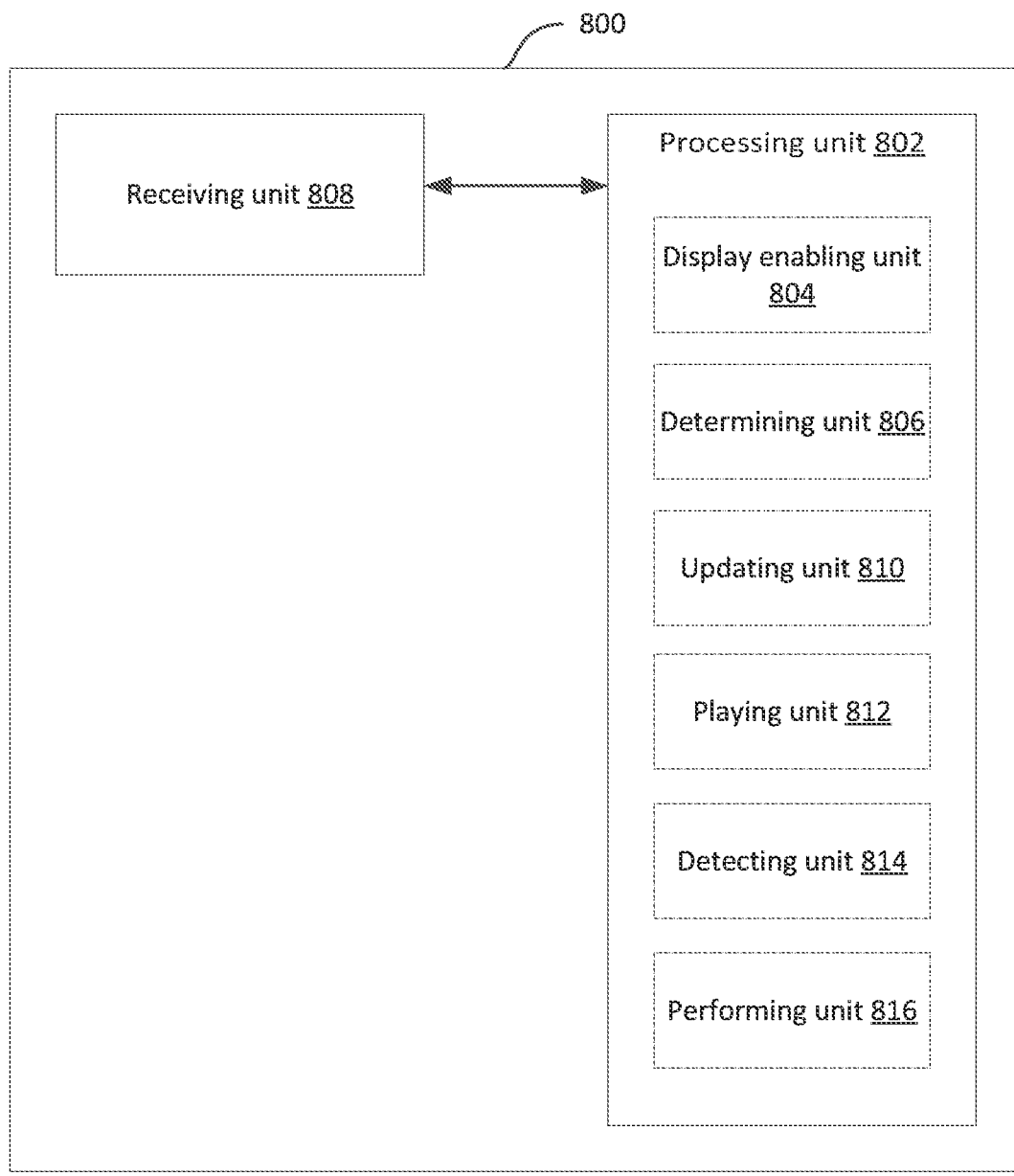
FIG. 8 is a functional block diagram of an electronic device in accordance with some embodiments of the disclosure.

In accordance with some embodiments, FIG. 8 shows a functional block diagram of an electronic device 800 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 optionally includes a receiving unit 808 configured to receive inputs, and a processing unit 802 coupled to the receiving unit 808. In some embodiments, the processing unit 802 includes a display enabling unit 804, a determining unit 806, an updating unit 810, a playing unit 812, a detecting unit 814 and a performing unit 816.

In some embodiments, the processing unit (802) is configured to display (e.g., with display enabling unit 804), on a display, a playback user interface that is configured to playback content on the electronic device. In some embodiments, the processing unit is configured to, while displaying the playback user interface that is configured to playback the content on the electronic device, display (e.g., with display enabling unit 804), on the display, a scrubber bar for navigating through the content. In some embodiments, the scrubber bar includes a visual indication of a current playback position within the content; and one or more playback time indications that include time values based on the current playback position within the content. In some embodiments, a respective playback time indication of the one or more playback time indications is based on a time of day at the electronic device and an amount of time that it will take to play the content from the current playback position to an end of the content at a respective content playback speed. In some embodiments, the respective content playback speed that is used to determine (e.g., with determining unit 806) the amount of time it will take to play the content from the current playback position is selected based on a playback state of the content. In some embodiments, the respective playback time indication is expressed as a future time of day at which the end of the content will be reached at the respective content playback speed.

In some embodiments, the receiving unit (808) is configured to, prior to displaying (e.g., with display enabling until 804) the scrubber bar on the display, receive an input to display the scrubber bar while the playback user interface is displayed on the display. In some embodiments, the processing unit (802) is further configured to, in response to receiving (e.g., with receiving unit 808) the input, display (e.g., with display enabling unit 804) the scrubber bar on the display. In some embodiments, the one or more playback time indications include a second respective playback time indication displayed (e.g., with display enabling unit 804) at the visual indication of the current playback position within the content, the second respective playback time indication displaying a current time of day at the electronic device.

In some embodiments, the receiving unit (808) is further configured to, while displaying (e.g., with display enabling unit 804) the scrubber bar and the second respective playback time indication on the display, receive an input for scrubbing through the content. In some embodiments, the processing unit (802) is further configured to, in response to receiving (e.g., with receiving unit 808) the input for scrubbing through the content: update (e.g., with updating unit 810) the current playback position within the content, including updating a location of the visual indication of the current playback position within the scrubber bar, in accordance with the input for scrubbing through the content; and update (e.g., with updating unit 810) the second respective playback time indication in accordance with an advance of the time of day at the electronic device.

In some embodiments, the processing unit (802) is further configured to, while displaying (e.g., with display enabling unit 804) the scrubber bar and the second respective playback time indication on the display, play (e.g., with playing unit 812) the content at a second respective content playback speed. In some embodiments, the processing unit (802) is further configured to, while playing (e.g., with playing unit 812) the content at the second respective content playback speed, update (e.g., with updating unit 810) the current playback position within the content, including updating a location of the visual indication of the current playback position within the scrubber bar, in accordance with playback progression through the content at the second respective content playback speed and update (e.g., with updating unit 810) the second respective playback time indication in accordance with an advance of the time of day at the electronic device.

In some embodiments, a location of the second respective playback time indication on the display moves in accordance with movement of the visual indication of the current playback position within the content as the current playback position within the content is changed. In some embodiments, the respective playback time indication is displayed at an end of the scrubber bar that corresponds to the end of the content, and the respective playback time indication displays a time of day at the electronic device at which the playback of the content will end at the respective content playback speed.

In some embodiments, the receiving unit (808) is further configured to, while displaying the scrubber bar and the respective playback time indication on the display, receive an input for scrubbing through the content. In some embodiments, the processing unit (802) is further configured to, in response to receiving (e.g., with receiving unit 808) the input for scrubbing through the content, update (e.g., with updating unit 810) the current playback position within the content, including updating a location of the visual indication of the current playback position within the scrubber bar, in accordance with the input for scrubbing through the content, and update (e.g., with updating unit 810) the respective playback time indication in accordance with the updated current playback position within the content. In some embodiments, the updated respective playback time indication displays an updated time of day at the electronic device at which the playback of the content will end, starting from the updated current playback position within the content, at the respective content playback speed.

In some embodiments, the processing unit (802) is further configured to, while displaying (e.g., with display enabling unit 804) the scrubber bar and the respective playback time indication on the display, play (e.g., with playing unit 812) the content at a second respective content playback speed. In some embodiments, the processing unit (802) is further configured to, while playing (e.g., with playing unit 812) the content at the second respective content playback speed, update (e.g., with updating unit 810) the current playback position within the content, including updating a location of the visual indication of the current playback position within the scrubber bar, in accordance with playback progression through the content at the second respective content playback speed; and maintains (e.g., with display enabling unit 804) the respective playback time indication while the content is played back at the second respective content playback speed.

In some embodiments, the processing unit (802) is further configured to, while displaying (e.g., with display enabling unit 804) the one or more playback time indications in the scrubber bar, determine (e.g., with determining unit 806) that one or more relative time criteria for displaying one or more second playback time indications in the scrubber bar are satisfied, wherein the one or more second playback time indications include time values based on relative content time. In some embodiments, the processing unit (802) is further configured to, in response to determining (e.g., with determining unit 806) that the one or more relative time criteria are satisfied, display (e.g., with display enabling unit 804), in the scrubber bar, the one or more second playback time indications. In some embodiments, the one or more second playback time indications are relative to a start position in the content. In some embodiments, the one or more relative time criteria are satisfied when a predetermined amount of time has elapsed since the scrubber bar was displayed on the display. In some embodiments, the one or more relative time criteria are satisfied when, while displaying (e.g., with display enabling unit 804) the scrubber bar and the one or more playback time indications on the display, an input for initiating a scrubbing mode on the electronic device is received (e.g., with receiving unit 808).

In some embodiments, the receiving unit (808) is further configured to, while displaying (e.g., with display enabling unit 804) the one or more second playback time indications in the scrubber bar and while the electronic device (800) is in the scrubbing mode, receive an input for scrubbing through the content. In some embodiments, the processing unit (802) is further configured to, in response to receiving the input for scrubbing through the content, update (e.g., with updating unit 810) the one or more second playback time indications in accordance with the input for scrubbing through the content. In some embodiments, the scrubber bar, while the electronic device (800) is in the scrubbing mode, concurrently includes the one or more playback time indications, and the one or more second playback time indications. In some embodiments, the scrubber bar, while the electronic device (800) is in the scrubbing mode, includes the one or more second playback time indications, but not the one or more playback time indications.

In some embodiments, the receiving unit (808) is further configured to, while the electronic device (800) is in the scrubbing mode, receive an input for exiting from the scrubbing mode, and the processing unit (802) is further configured to, in response to receiving the input for exiting the scrubbing mode, display (e.g., with display enabling unit 804), on the display, the scrubber bar with the one or more playback time indications, and without the one or more second playback time indications. In some embodiments, the processing unit (802) is further configured to, while the content is paused on the electronic device and the scrubber bar and the respective playback time indication are displayed (e.g., with display enabling unit 804) on the display, update (e.g., with updating unit 810) the respective playback time indication in accordance with an advance of the time of day at the electronic device (800).

In some embodiments, the processing unit (802) is further configured to, while playing (e.g., with playing unit 812) the content on the electronic device and while displaying (e.g., with display enabling unit 804) the scrubber bar and the respective playback time indication on the display, detect (e.g., with detecting unit 814) a change in content playback speed of the content. In some embodiments, the processing unit (802) is further configured to, in response to detecting (e.g., with detecting unit 814) the change in the content playback speed of the content, update (e.g., with updating unit 810) the respective playback time indication by an amount that is larger than an amount of content that has been played through at the changed content playback speed.

In some embodiments, the receiving unit (808) is further configured to, while displaying (e.g., with display enabling unit 804) the scrubber bar on the display, detect an input, at a touch-sensitive surface, that corresponds to a request to display (e.g., with display enabling unit 804) a plurality of visual indications of different actions accessible from the touch-sensitive surface. In some embodiments, the processing unit (802) is further configured to, in response to detecting the input that corresponds to the request to display the plurality of visual indications of the different actions accessible from the touch-sensitive surface, display (e.g., with display enabling unit 804), on the display, the plurality of visual indications. In some embodiments, the receiving unit (808) is further configured to, while displaying (e.g., with display enabling unit 804) the plurality of visual indications that correspond to the different actions accessible from the touch-sensitive surface, detect further input on the touch-sensitive surface that indicates potential selection of a respective visual indication of the plurality of visual indications, the visual indication corresponding to a respective action of the different actions. In some embodiments, the processing unit (802) is further configured to, in response to detecting the further input, alter (e.g., with display enabling unit 804) an appearance of the respective visual indication with respect to appearances of others of the plurality of visual indications.

In some embodiments, the receiving unit (808) is further configured to, while the potential selection of the respective visual indication is indicated (e.g., with display enabling unit 804), receive an input, at the touch-sensitive surface, selecting the visual indication. In some embodiments, the processing unit (802) is further configured to, in response to receiving (e.g., with receiving unit 808) the input selecting the visual indication, perform (e.g., with performing unit 816) the respective action corresponding to the respective visual indication at the electronic device.

The operations described above with reference to FIGS. 7A-7G are, optionally, implemented by components depicted in FIGS. 1A-1B or FIG. 8. For example, displaying operations 702, 704 and 718, and receiving operation 716 are, optionally, implemented by event sorter 170, event recognizer 180, and event handler 190. Event monitor 171 in event sorter 170 detects a contact on a touch-sensitive surface or touch screen, and event dispatcher module 174 delivers the event information to application 136-1. A respective event recognizer 180 of application 136-1 compares the event information to respective event definitions 186, and determines whether a first contact at a first location on the touch-sensitive surface or touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or FIG. 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, via the display, a playback user interface that is configured to playback content on the electronic device, the playback user interface displaying a scrubber bar for navigating through the content, wherein the scrubber bar includes:
a visual indication of a current playback position within a content item currently displayed in the playback user interface; and
one or more playback time indications, wherein:
a respective playback time indication of the one or more playback time indications displays a current time of day at the electronic device; and
the respective playback time indication is displayed at a location corresponding to the visual indication of the current playback position within the content item;
while displaying the playback user interface that is configured to playback content on the electronic device, receiving, via the one or more input devices, an input corresponding to a request to scrub through the content item; and
in response to receiving the input:
updating the current playback position within the content item in accordance with the input; and
in accordance with a determination that the current time of day at the electronic device has advanced since receiving the input, updating the respective playback time indication to display an updated current time of day in accordance with the advance of the current time of day at the electronic device independent from a change in the current playback position resulting from the received input, wherein the respective playback time indication is displayed at a location corresponding to the visual indication of the updated current playback position within the content item.

2. The method of claim 1, further comprising:
prior to displaying the scrubber bar on the display, receiving, via the one or more input devices, an input corresponding to a request to display the scrubber bar while the playback user interface is displayed on the display; and in response to receiving the input corresponding to a request to display the scrubber bar, displaying the scrubber bar on the display.

3. The method of claim 1, wherein updating the current playback position within the content item in accordance with the input comprises:
updating a location of the visual indication of the current playback position within the scrubber bar; and
updating a location of the respective playback time indication on the display in accordance with movement of the visual indication of the current playback position within the content item as the current playback position within the content item changes.

4. The method of claim 1, wherein the content item currently displayed in the playback user interface is played at a respective content playback speed, the method further comprising:
while displaying the scrubber bar and the respective playback time indication on the display, playing the content item at a second respective content playback speed, different from the respective content playback speed; and
while playing the content item at the second respective content playback speed:
updating the current playback position within the content item, including updating a location of the visual indication of the current playback position within the scrubber bar, in accordance with playback progression through the content item at the second respective content playback speed; and
updating the respective playback time indication in accordance with a second advance of the current time of day at the electronic device.

5. The method of claim 1, further comprising:
while displaying the one or more playback time indications in the scrubber bar, determining that one or more relative time criteria for displaying one or more second playback time indications in the scrubber bar are satisfied, wherein the one or more second playback time indications include time values based on relative content time; and
in response to determining that the one or more relative time criteria are satisfied, displaying, in the scrubber bar, the one or more second playback time indications.

6. The method of claim 5, wherein the one or more second playback time indications include a respective second playback time indication that corresponds to the current playback position within the content item relative to a start position in the content item.

7. The method of claim 6, wherein the respective second playback time indication is displayed within an image corresponding to the current playback position within the content item during the input corresponding to the request to scrub through the content item.

8. The method of claim 5, wherein the scrubber bar concurrently includes:
the one or more playback time indications; and
the one or more second playback time indications.

9. The method of claim 1, wherein:
the one or more playback time indications include a second respective playback time indication displayed at an end of the scrubber bar that corresponds to the end of the content item; and
the second respective playback time indication is based on:
the current time of day at the electronic device; and
a remaining duration of the content item, wherein the remaining duration comprises an amount of time that it will take to play the content item from the current playback position to an end of the content item at a respective content playback speed.

10. The method of claim 9, further comprising:
while displaying the scrubber bar and the second respective playback time indication on the display, receiving, via the one or more input devices, a second input for scrubbing through the content item; and
in response to receiving the second input for scrubbing through the content item:
updating the current playback position within the content item, including updating a location of the visual indication of the current playback position within the scrubber bar, in accordance with the second input for scrubbing through the content item;
updating the respective playback time indication in accordance with a second advance of the current time of day at the electronic device; and
updating the second respective playback time indication in accordance with the updated current playback position within the content item, the updated second respective playback time indication displaying an updated time of day at the electronic device at which the playback of the content item will end, starting from the updated current playback position within the content item, at the respective content playback speed.

11. The method of claim 9, further comprising:
while playing the content item on the electronic device and while displaying the scrubber bar and the respective playback time indication on the display, detecting a change in content playback speed of the content item; and
in response to detecting the change in the content playback speed of the content item:
updating the second respective playback time indication by an amount that is larger than an amount of content that has been played through at the changed content playback speed; and
updating the respective playback time indication in accordance with a second advance of the current time of day at the electronic device.

12. The method of claim 9, further comprising:
while the content item is paused on the electronic device and the scrubber bar and the respective playback time indication are displayed on the display, updating the respective playback time indication and the second respective playback time indication in accordance with a second advance of the current time of day at the electronic device.

13. The method of claim 1, further comprising:
while the content item is paused on the electronic device and the scrubber bar and the respective playback time indication are displayed on the display, updating the respective playback time indication in accordance with a second advance of the current time of day at the electronic device.

14. An electronic device, comprising:
one or more processors;
memory; and
one or more programs, wherein the one or more programs are stored in the memory and configured to be executed by the one or more processors, the one or more programs including instructions for:

displaying, via a display, a playback user interface that is configured to playback content on the electronic device, the playback user interface displaying a scrubber bar for navigating through the content, wherein the scrubber bar includes:
- a visual indication of a current playback position within a content item currently displayed in the playback user interface; and
- one or more playback time indications, wherein:
  - a respective playback time indication of the one or more playback time indications displays a current time of day at the electronic device; and
  - the respective playback time indication is displayed at a location corresponding to the visual indication of the current playback position within the content item;

while displaying the playback user interface that is configured to playback content on the electronic device, receiving, via one or more input devices, an input corresponding to a request to scrub through the content item; and in response to receiving the input:
- updating the current playback position within the content item in accordance with the input; and
- in accordance with a determination that the current time of day at the electronic device has advanced since receiving the input, updating the respective playback time indication to display an updated current time of day in accordance with the advance of the current time of day at the electronic device independent from a change in the current playback position resulting from the received input, wherein the respective playback time indication is displayed at a location corresponding to the visual indication of the updated current playback position within the content item.

15. The electronic device of claim 14, wherein the one or more programs include instructions for:
- prior to displaying the scrubber bar on the display, receiving, via the one or more input devices, an input corresponding to a request to display the scrubber bar while the playback user interface is displayed on the display; and
- in response to receiving the input corresponding to a request to display the scrubber bar, displaying the scrubber bar on the display.

16. The electronic device of claim 14, wherein updating the current playback position within the content item in accordance with the input comprises:
- updating a location of the visual indication of the current playback position within the scrubber bar; and
- updating a location of the respective playback time indication on the display in accordance with movement of the visual indication of the current playback position within the content item as the current playback position within the content item changes.

17. The electronic device of claim 14, wherein the content item currently displayed in the playback user interface is played at a respective content playback speed, and wherein the one or more programs include instructions for:
- while displaying the scrubber bar and the respective playback time indication on the display, playing the content item at a second respective content playback speed, different from the respective content playback speed; and
- while playing the content item at the second respective content playback speed:
  - updating the current playback position within the content item, including updating a location of the visual indication of the current playback position within the scrubber bar, in accordance with playback progression through the content item at the second respective content playback speed; and
  - updating the respective playback time indication in accordance with a second advance of the current time of day at the electronic device.

18. The electronic device of claim 14, wherein the one or more programs include instructions for:
- while displaying the one or more playback time indications in the scrubber bar, determining that one or more relative time criteria for displaying one or more second playback time indications in the scrubber bar are satisfied, wherein the one or more second playback time indications include time values based on relative content time; and
- in response to determining that the one or more relative time criteria are satisfied, displaying, in the scrubber bar, the one or more second playback time indications.

19. The electronic device of claim 18, wherein the one or more second playback time indications include a respective second playback time indication that corresponds to the current playback position within the content item relative to a start position in the content item.

20. The electronic device of claim 19, wherein the respective second playback time indication is displayed within an image corresponding to the current playback position within the content item during the input corresponding to the request to scrub through the content item.

21. The electronic device of claim 18, wherein the scrubber bar concurrently includes:
- the one or more playback time indications; and
- the one or more second playback time indications.

22. The electronic device of claim 14, wherein:
- the one or more playback time indications include a second respective playback time indication displayed at an end of the scrubber bar that corresponds to the end of the content item; and
- the second respective playback time indication is based on:
  - the current time of day at the electronic device; and
  - a remaining duration of the content item, wherein the remaining duration comprises an amount of time that it will take to play the content item from the current playback position to an end of the content item at a respective content playback speed.

23. The electronic device of claim 22, wherein the one or more programs include instructions for:
- while displaying the scrubber bar and the second respective playback time indication on the display, receiving, via the one or more input devices, a second input for scrubbing through the content item; and
- in response to receiving the second input for scrubbing through the content item:
  - updating the current playback position within the content item, including updating a location of the visual indication of the current playback position within the scrubber bar, in accordance with the second input for scrubbing through the content item;
  - updating the respective playback time indication in accordance with a second advance of the current time of day at the electronic device; and updating the second respective playback time indication in accordance with the updated current playback position within the content item, the updated second respective playback time indication displaying an updated time of day at the electronic device at which the playback of the content item will end, starting from the updated current playback position within the content item, at the respective content playback speed.

24. The electronic device of claim 22, wherein the one or more programs include instructions for:
while playing the content item on the electronic device and while displaying the scrubber bar and the respective playback time indication on the display, detecting a change in content playback speed of the content item; and
in response to detecting the change in the content playback speed of the content item:
updating the second respective playback time indication by an amount that is larger than an amount of content that has been played through at the changed content playback speed; and
updating the respective playback time indication in accordance with a second advance of the current time of day at the electronic device.

25. The electronic device of claim 22, wherein the one or more programs include instructions for:
while the content item is paused on the electronic device and the scrubber bar and the respective playback time indication are displayed on the display, updating the respective playback time indication and the second respective playback time indication in accordance with a second advance of the current time of day at the electronic device.

26. The electronic device of claim 14, wherein the one or more programs include instructions for:
while the content item is paused on the electronic device and the scrubber bar and the respective playback time indication are displayed on the display, updating the respective playback time indication in accordance with a second advance of the current time of day at the electronic device.

27. A non-transitory computer readable storage medium storing one or more programs, the one or more programs comprising instructions, which when executed by one or more processors of an electronic device, cause the electronic device to perform a method comprising:
displaying, via a display, a playback user interface that is configured to playback content on the electronic device, the playback user interface displaying a scrubber bar for navigating through the content, wherein the scrubber bar includes:
a visual indication of a current playback position within a content item currently displayed in the playback user interface; and
one or more playback time indications, wherein:
a respective playback time indication of the one or more playback time indications displays a current time of day at the electronic device; and
the respective playback time indication is displayed at a location corresponding to the visual indication of the current playback position within the content item;
while displaying the playback user interface that is configured to playback content on the electronic device, receiving, via one or more input devices, an input corresponding to a request to scrub through the content item; and
in response to receiving the input:
updating the current playback position within the content item in accordance with the input; and
in accordance with a determination that the current time of day at the electronic device has advanced since receiving the input, updating the respective playback time indication to display an updated current time of day in accordance with the advance of the current time of day at the electronic device independent from a change in the current playback position resulting from the received input, wherein the respective playback time indication is displayed at a location corresponding to the visual indication of the updated the current playback position within the content item.

28. The non-transitory computer readable storage medium of claim 27, wherein the method comprises:
prior to displaying the scrubber bar on the display, receiving, via the one or more input devices, an input corresponding to a request to display the scrubber bar while the playback user interface is displayed on the display; and
in response to receiving the input corresponding to a request to display the scrubber bar, displaying the scrubber bar on the display.

29. The non-transitory computer readable storage medium of claim 27, wherein updating the current playback position within the content item in accordance with the input comprises:
updating a location of the visual indication of the current playback position within the scrubber bar; and
updating a location of the respective playback time indication on the display in accordance with movement of the visual indication of the current playback position within the content item as the current playback position within the content item changes.

30. The non-transitory computer readable storage medium of claim 27, wherein the content item currently displayed in the playback user interface is played at a respective content playback speed, and wherein the method comprises:
while displaying the scrubber bar and the respective playback time indication on the display, playing the content item at a second respective content playback speed, different from the respective content playback speed; and
while playing the content item at the second respective content playback speed:
updating the current playback position within the content item, including updating a location of the visual indication of the current playback position within the scrubber bar, in accordance with playback progression through the content item at the second respective content playback speed; and
updating the respective playback time indication in accordance with a second advance of the current time of day at the electronic device.

31. The non-transitory computer readable storage medium of claim 27, wherein the method comprises:
while displaying the one or more playback time indications in the scrubber bar, determining that one or more relative time criteria for displaying one or more second playback time indications in the scrubber bar are satisfied, wherein the one or more second playback time indications include time values based on relative content time; and in response to determining that the one or more relative time criteria are satisfied, displaying, in the scrubber bar, the one or more second playback time indications.

32. The non-transitory computer readable storage medium of claim 31, wherein the one or more second playback time indications include a respective second playback time indication that corresponds to the current playback position within the content item relative to a start position in the content item.

33. The non-transitory computer readable storage medium of claim 32, wherein the respective second playback time indication is displayed within an image corresponding to the current playback position within the content item during the input corresponding to the request to scrub through the content item.

34. The non-transitory computer readable storage medium of claim 31, wherein the scrubber bar concurrently includes:
the one or more playback time indications; and
the one or more second playback time indications.

35. The non-transitory computer readable storage medium of claim 27, wherein:
the one or more playback time indications include a second respective playback time indication displayed at an end of the scrubber bar that corresponds to the end of the content item; and
the second respective playback time indication is based on:
the current time of day at the electronic device; and
a remaining duration of the content item, wherein the remaining duration comprises an amount of time that it will take to play the content item from the current playback position to an end of the content item at a respective content playback speed.

36. The non-transitory computer readable storage medium of claim 35, wherein the method comprises:
while displaying the scrubber bar and the second respective playback time indication on the display, receiving, via the one or more input devices, a second input for scrubbing through the content item; and
in response to receiving the second input for scrubbing through the content item:
updating the current playback position within the content item, including updating a location of the visual indication of the current playback position within the scrubber bar, in accordance with the second input for scrubbing through the content item;
updating the respective playback time indication in accordance with a second advance of the current time of day at the electronic device; and
updating the second respective playback time indication in accordance with the updated current playback position within the content item, the updated second respective playback time indication displaying an updated time of day at the electronic device at which the playback of the content item will end, starting from the updated current playback position within the content item, at the respective content playback speed.

37. The non-transitory computer readable storage medium of claim 35, wherein the method comprises:
while playing the content item on the electronic device and while displaying the scrubber bar and the respective playback time indication on the display, detecting a change in content playback speed of the content item; and
in response to detecting the change in the content playback speed of the content item:
updating the second respective playback time indication by an amount that is larger than an amount of content that has been played through at the changed content playback speed; and
updating the respective playback time indication in accordance with a second advance of the current time of day at the electronic device.

38. The non-transitory computer readable storage medium of claim 35, wherein the method comprises:
while the content item is paused on the electronic device and the scrubber bar and the respective playback time indication are displayed on the display, updating the respective playback time indication and the second respective playback time indication in accordance with a second advance of the current time of day at the electronic device.

39. The non-transitory computer readable storage medium of claim 27, wherein the method comprises:
while the content item is paused on the electronic device and the scrubber bar and the respective playback time indication are displayed on the display, updating the respective playback time indication in accordance with a second advance of the current time of day at the electronic device.

* * * * *